(12) United States Patent
Mukawa

(10) Patent No.: US 9,766,453 B2
(45) Date of Patent: *Sep. 19, 2017

(54) DISPLAY APPARATUS

(71) Applicant: Sony Corporation, Tokyo (JP)

(72) Inventor: Hiroshi Mukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 46 days.

This patent is subject to a terminal disclaimer.

(21) Appl. No.: 14/337,620

(22) Filed: Jul. 22, 2014

(65) Prior Publication Data

US 2014/0334010 A1    Nov. 13, 2014

Related U.S. Application Data

(63) Continuation of application No. 13/207,673, filed on Aug. 11, 2011, now Pat. No. 8,861,090.

(30) Foreign Application Priority Data

Aug. 18, 2010 (JP) .................................. 2010-182973

(51) Int. Cl.
  *G02B 27/14* (2006.01)
  *G02B 27/01* (2006.01)
  (Continued)

(52) U.S. Cl.
  CPC ..... *G02B 27/0101* (2013.01); *G02B 27/0103* (2013.01); *G02B 27/0172* (2013.01);
  (Continued)

(58) Field of Classification Search
  CPC ... G02C 7/02; G02C 7/00; G02C 3/00; G02B 27/0172; G02B 27/0101; G02B 2027/0178; G02B 2027/0132; G02B 2027/011
  (Continued)

(56) References Cited

U.S. PATENT DOCUMENTS 3,695,749 A   10/1972   Stapleton
5,579,026 A   11/1996   Tabata
(Continued)

FOREIGN PATENT DOCUMENTS

CN   1652575 A   8/2005
CN   1707308 A   12/2005
(Continued)

OTHER PUBLICATIONS

U.S. Appl. No. 12/624,576, filed Nov. 24, 2009, Tomita.
(Continued)

*Primary Examiner* — James Greece
(74) *Attorney, Agent, or Firm* — Wolf, Greenfield & Sacks, P.C.

(57) ABSTRACT

A display apparatus includes: a glass-type frame mounted to a head of an observer; and two image displaying devices for the left and right eyes that are attached to the frame. Each of the image displaying devices includes an image forming device, an optical system making light from the image forming device to be parallel light, and an optical device to which the light from the optical system is incident, and in which the light is guided so as to be output, at least one of the image displaying devices further includes a movement device relatively moving optical axes of the image forming device and the optical system in a horizontal direction, and a convergence angle is adjusted by relatively moving the optical axes of the image forming device and the optical system in the horizontal direction using the movement device depending on an observation position of an observer.

9 Claims, 33 Drawing Sheets

(51) Int. Cl.
  *G02B 27/22* (2006.01)
  *G02B 27/24* (2006.01)
  *H04N 13/00* (2006.01)
  *H04N 13/04* (2006.01)
  *G02B 6/00* (2006.01)

(52) U.S. Cl.
  CPC ......... *G02B 27/2228* (2013.01); *G02B 27/24* (2013.01); *H04N 13/007* (2013.01); *H04N 13/044* (2013.01); *G02B 6/00* (2013.01); *G02B 2027/0154* (2013.01); *G02B 2027/0178* (2013.01)

(58) Field of Classification Search
  USPC ........ 351/159.01, 159.73; 359/630, 632, 638
  See application file for complete search history.

(56) References Cited

U.S. PATENT DOCUMENTS

| | | | |
|---|---|---|---|
| 5,774,096 A * | 6/1998 | Usuki et al. | 345/8 |
| 5,781,165 A | 7/1998 | Tabata | |
| 5,825,456 A | 10/1998 | Tabata et al. | |
| 6,879,443 B2 * | 4/2005 | Spitzer et al. | 359/630 |
| 7,502,168 B2 | 3/2009 | Akutsu et al. | |
| 7,576,916 B2 | 8/2009 | Amitai | |
| 7,710,654 B2 | 5/2010 | Ashkenazi et al. | |
| 8,411,134 B2 | 4/2013 | Tomita | |
| 8,797,433 B2 | 8/2014 | Kaizu et al. | |
| 8,861,090 B2 * | 10/2014 | Mukawa | 359/630 |
| 8,976,453 B2 | 3/2015 | Akutsu et al. | |
| 8,988,315 B2 | 3/2015 | Mukawa et al. | |
| 9,164,221 B2 | 10/2015 | Akutsu et al. | |
| 2005/0174651 A1 | 8/2005 | Spitzer et al. | |
| 2005/0231599 A1 | 10/2005 | Yamasaki | |
| 2005/0248852 A1 | 11/2005 | Yamasaki | |
| 2007/0064310 A1 | 3/2007 | Mukawa et al. | |
| 2007/0070504 A1 | 3/2007 | Akutsu et al. | |
| 2007/0070859 A1 | 3/2007 | Hirayama | |
| 2009/0128919 A1 * | 5/2009 | Kim | 359/630 |
| 2010/0128107 A1 | 5/2010 | Tomita | |
| 2011/0241975 A1 | 10/2011 | Mukawa et al. | |
| 2011/0248904 A1 | 10/2011 | Miyawaki et al. | |
| 2012/0032874 A1 | 2/2012 | Mukawa | |
| 2012/0044571 A1 | 2/2012 | Mukawa | |
| 2012/0218426 A1 | 8/2012 | Kaizu et al. | |
| 2013/0128611 A1 | 5/2013 | Akutsu et al. | |
| 2013/0135749 A1 | 5/2013 | Akutsu et al. | |
| 2013/0242555 A1 | 9/2013 | Mukawa | |
| 2013/0300766 A1 | 11/2013 | Mukawa | |
| 2014/0340286 A1 | 11/2014 | Machida et al. | |
| 2014/0340550 A1 | 11/2014 | Kaizu et al. | |
| 2015/0109679 A1 | 4/2015 | Mukawa et al. | |
| 2015/0138647 A1 | 5/2015 | Akutsu et al. | |
| 2015/0226970 A1 | 8/2015 | Mukawa | |
| 2015/0229897 A1 | 8/2015 | Mukawa | |
| 2015/0235620 A1 | 8/2015 | Takahota et al. | |
| 2015/0260995 A1 | 9/2015 | Mukawa | |
| 2015/0277125 A1 | 10/2015 | Hirano et al. | |
| 2015/0277126 A1 | 10/2015 | Hirano et al. | |
| 2015/0338660 A1 | 11/2015 | Mukawa | |
| 2015/0346494 A1 | 12/2015 | Tanaka et al. | |
| 2015/0362735 A1 | 12/2015 | Akutsu et al. | |
| 2015/0370075 A1 | 12/2015 | Ato et al. | |
| 2016/0041394 A1 | 2/2016 | Tanaka et al. | |
| 2016/0062123 A1 | 3/2016 | Tanaka et al. | |
| 2016/0097931 A1 | 4/2016 | Takahota et al. | |
| 2016/0147069 A1 | 5/2016 | Tanaka et al. | |

FOREIGN PATENT DOCUMENTS

| | | |
|---|---|---|
| CN | 102375234 A | 3/2012 |
| CN | 1771454 A | 7/2012 |
| EP | 1564585 A1 | 8/2005 |
| EP | 2418520 A2 | 2/2012 |
| JP | 07-191277 A | 7/1995 |
| JP | 08-211332 | 8/1996 |
| JP | 08-322004 | 12/1996 |
| JP | 09-322197 | 12/1997 |
| JP | 10-262165 A | 9/1998 |
| JP | 2000-171751 A | 6/2000 |
| JP | 2001-344617 A | 12/2001 |
| JP | 2002-328330 A | 11/2002 |
| JP | 2003-334221 A | 11/2003 |
| JP | 2004-280127 A | 10/2004 |
| JP | 2005-284007 A | 10/2005 |
| JP | 2005-311754 A | 11/2005 |
| JP | 2006-033011 A | 2/2006 |
| JP | 2006-162767 A | 6/2006 |
| JP | 2007-094175 A | 4/2007 |
| JP | 2007-116538 A | 5/2007 |
| JP | 2008-083290 A | 4/2008 |
| JP | 2008-123257 A | 5/2008 |
| JP | 2010-011055 A | 1/2010 |
| JP | 2010-139589 A | 6/2010 |

OTHER PUBLICATIONS

U.S. Appl. No. 13/399,222, filed Feb. 17, 2012, Kaizu et al.
U.S. Appl. No. 14/326,963, filed Jul. 9, 2014, Kaizu et al.
U.S. Appl. No. 14/422,103, filed Feb. 17, 2015, Takahota et al.
U.S. Appl. No. 14/655,243, filed Jun. 24, 2015, Tanaka et al.
U.S. Appl. No. 14/762,615, filed Jul. 22, 2015, Ato et al.
U.S. Appl. No. 14/781,972, filed Oct. 2, 2015, Tanaka et al.
U.S. Appl. No. 14/889,502, filed Nov. 6, 2015, Takahota et al.
U.S. Appl. No. 14/889,502, filed Nov. 6, 2015 Takahota et al.
U.S. Appl. No. 14/903,639, filed Jan. 8, 2016 Tanaka et al.
U.S. Appl. No. 13/078,147, filed Apr. 1, 2011, Miyawaki et al.
Janin et al., Calibration of head-mounted displays for augmented reality applications, Virtual Reality Ann. Intl. Symp., 1993:246-255.
U.S. Appl. No. 13/053,657, filed Mar. 22, 2011, Mukawa et al.
U.S. Appl. No. 14/581,037, filed Dec. 23, 2014, Mukawa et al.
U.S. Appl. No. 13/677,410, filed Nov. 15, 2012, Akutsu et al.
U.S. Appl. No. 14/797,663, filed Jul. 13, 2015, Akutsu et al.
U.S. Appl. No. 13/678,604, filed Nov. 16, 2012, Akutsu et al.
U.S. Appl. No. 14/604,122, filed Jan. 23, 2015, Akutsu et al.
U.S. Appl. No. 13/779,008, filed Feb. 27, 2013, Mukawa.
U.S. Appl. No. 13/875,593, filed May 2, 2013, Mukawa.
U.S. Appl. No. 14/370,362, filed Jul. 2, 2014, Machida et al.
U.S. Appl. No. 14/758,818, filed Jul. 1, 2015, Mukawa.
U.S. Appl. No. 14/612,484, filed Feb. 3, 2015, Mukawa.
U.S. Appl. No. 14/612,710, filed Feb. 3, 2015, Mukawa.
U.S. Appl. No. 14/640,437, filed Mar. 6, 2015, Mukawa.
U.S. Appl. No. 14/659,784, filed Mar. 17, 2015, Hirano et al.
U.S. Appl. No. 14/659,943, filed Mar. 17, 2015, Hirano et al.
U.S. Appl. No. 14/782,054, filed Oct. 2, 2015, Tanaka et al.

* cited by examiner (EMBODIMENT 1)
FIG.1A
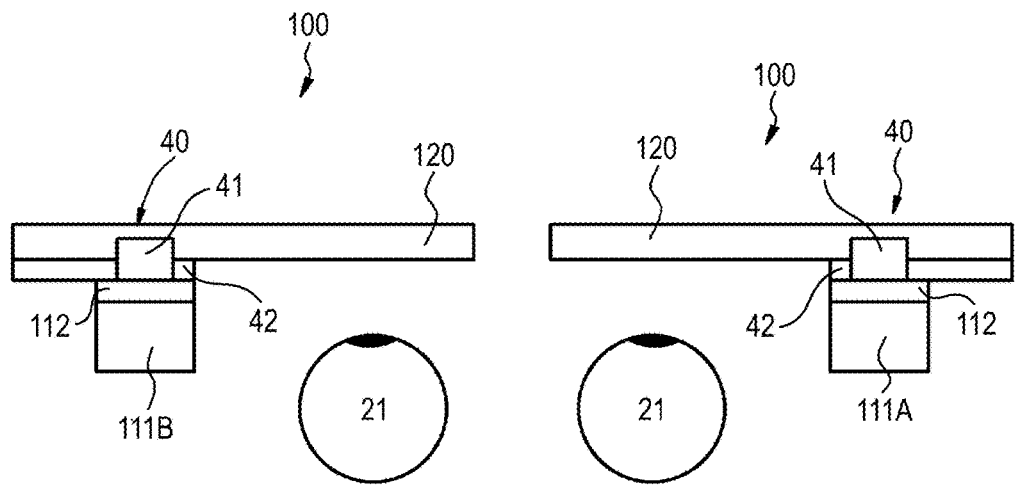
FIG.1B
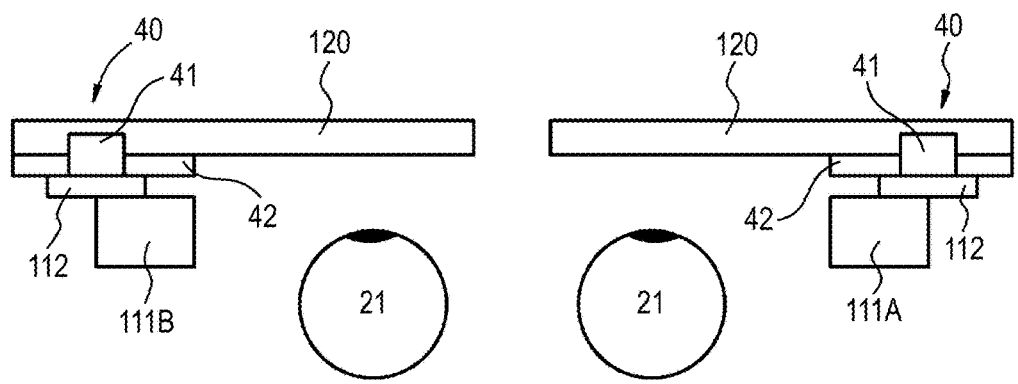
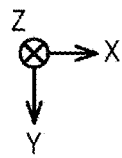  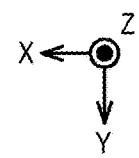

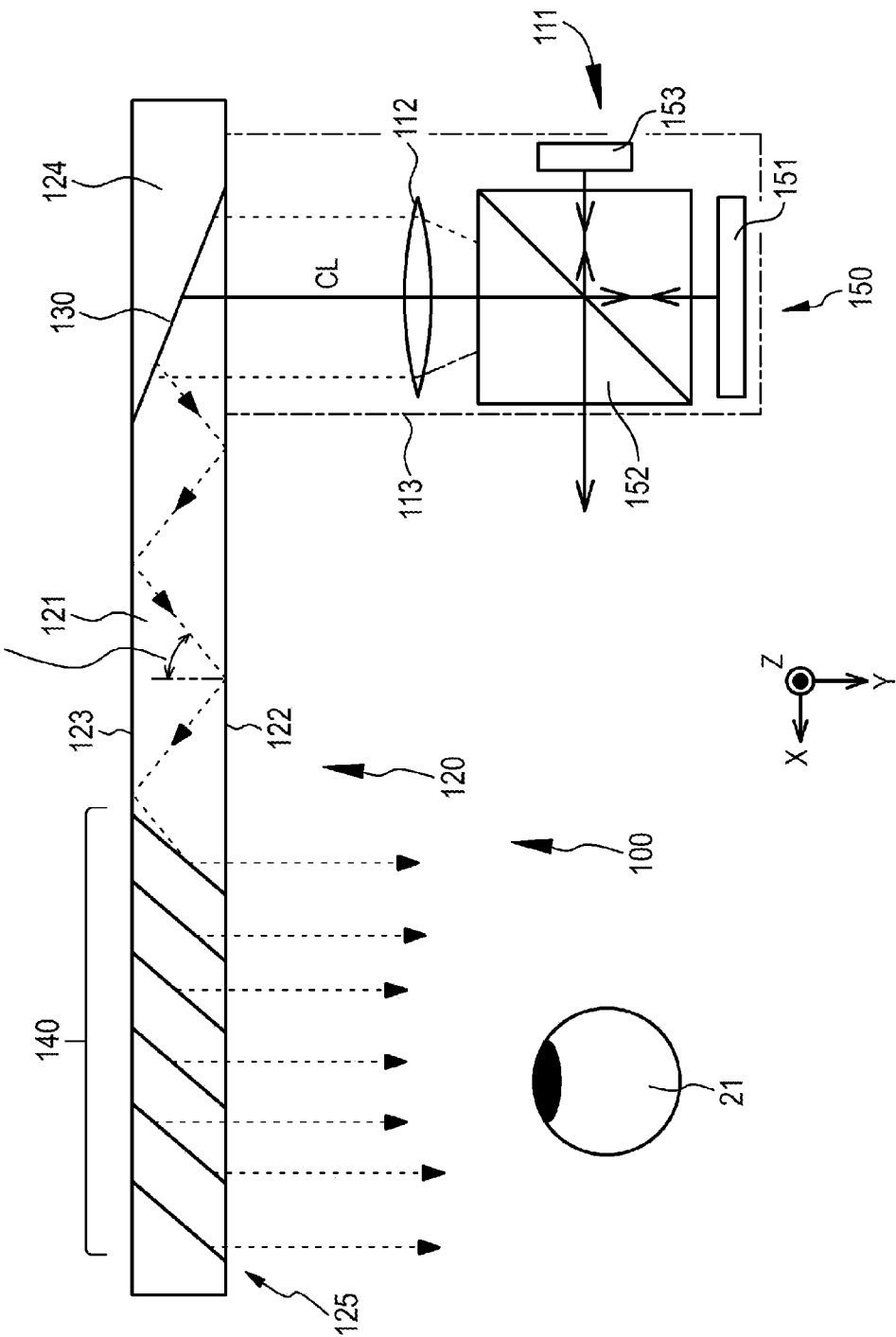

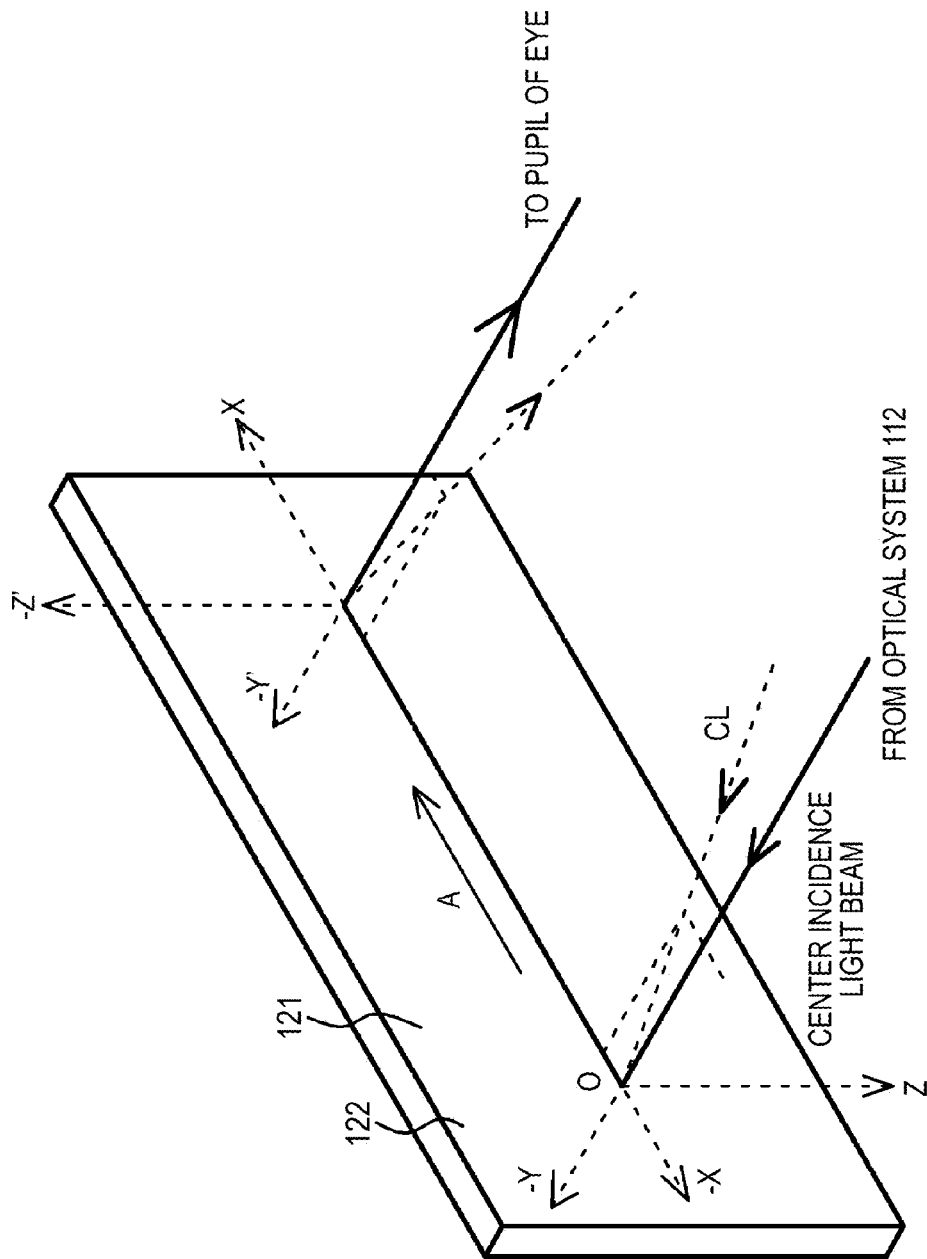

(EMBODIMENT 2)

[PRINCIPLE DIAGRAM]

PRINCIPLED LIQUID LENS

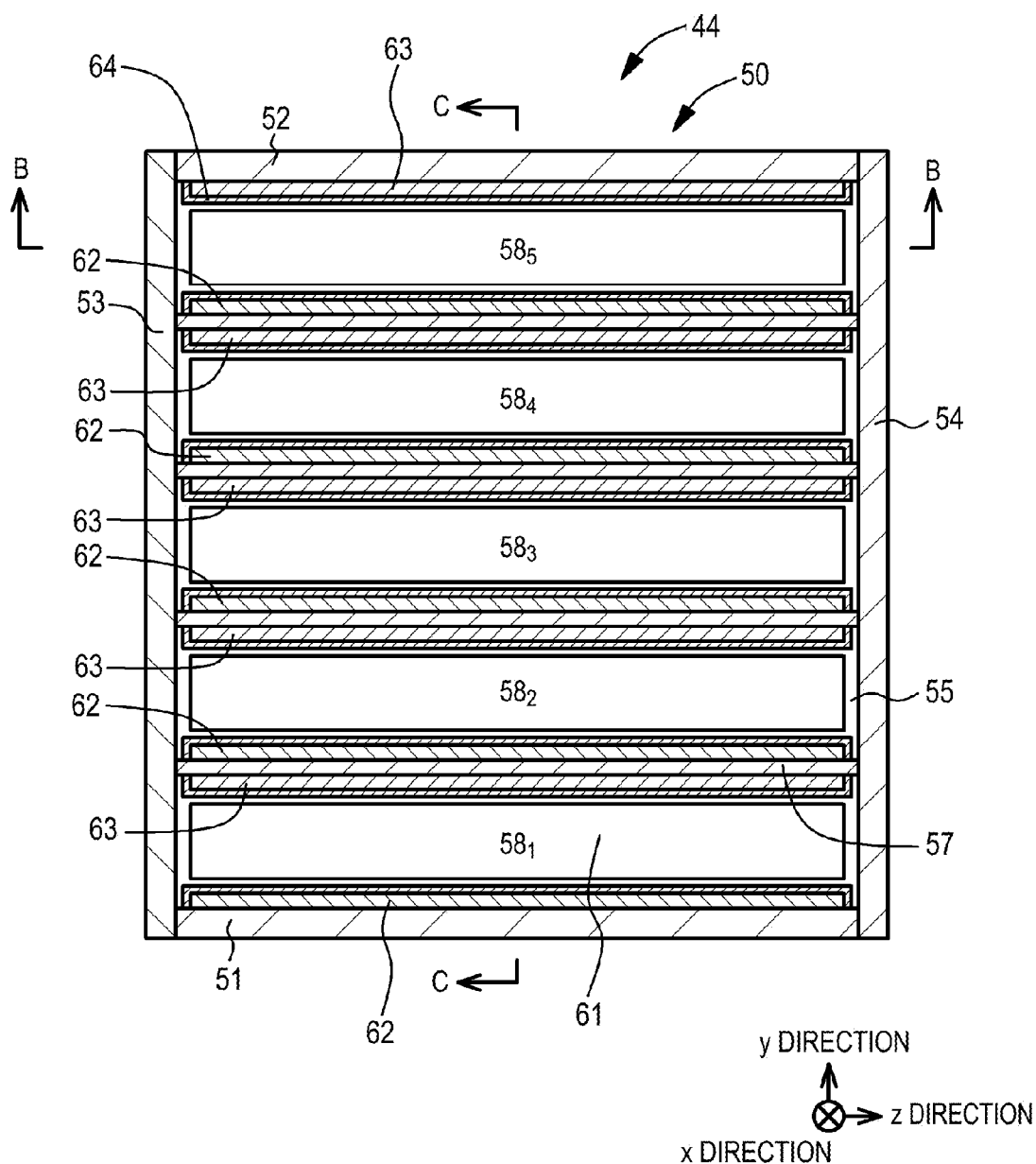

FIG.16A
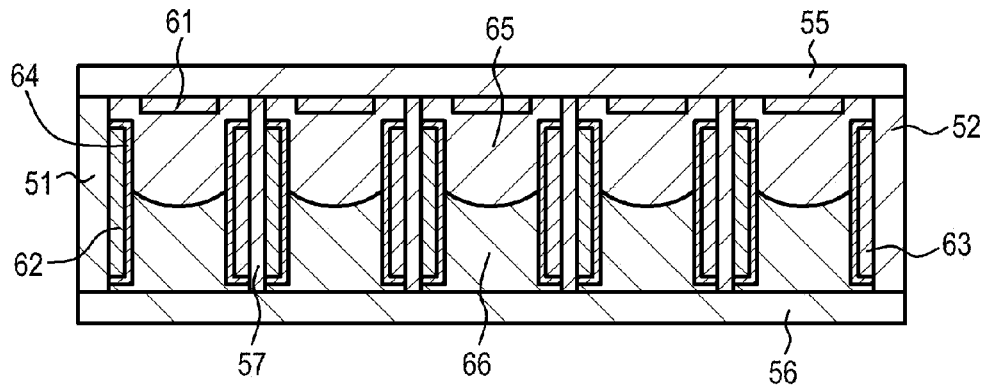
FIG.16B
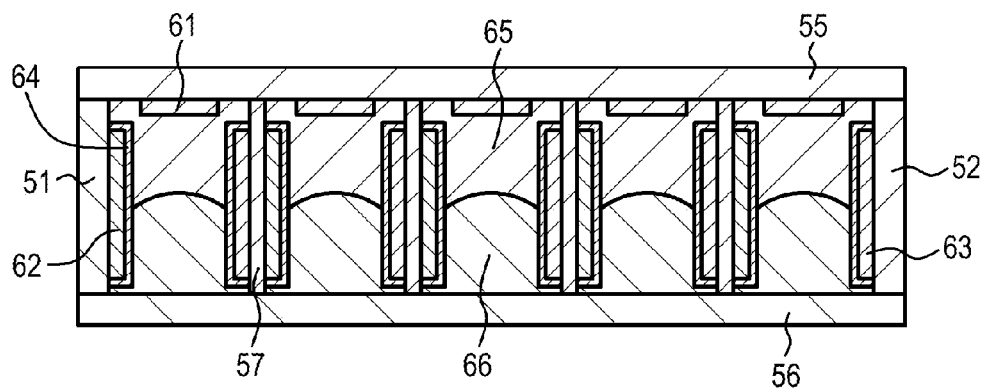
FIG.16C
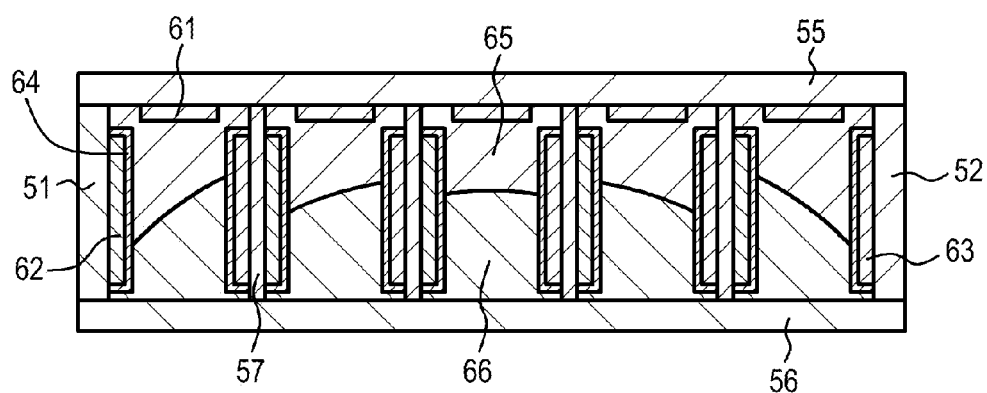

(EMBODIMENT 4)

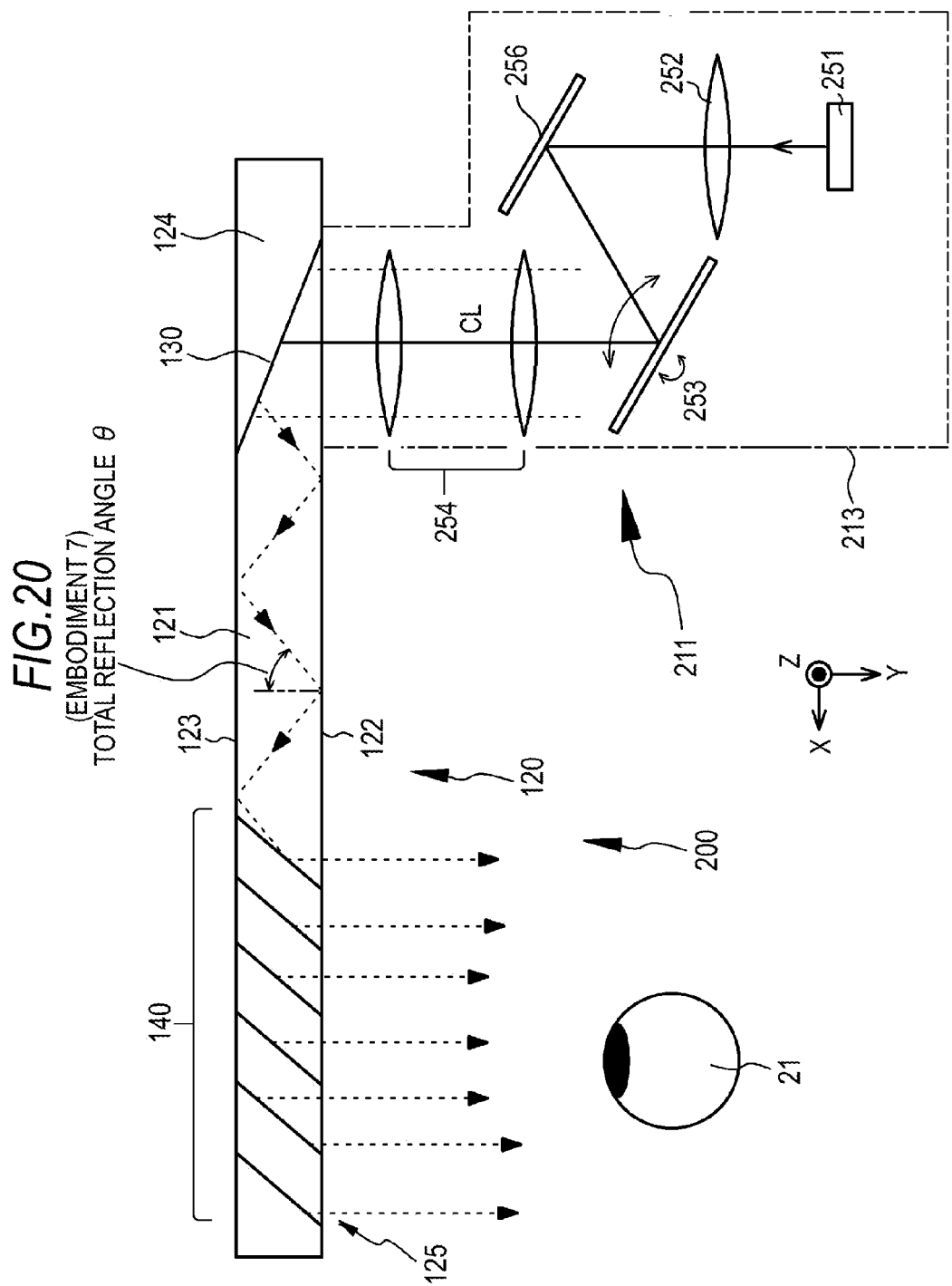

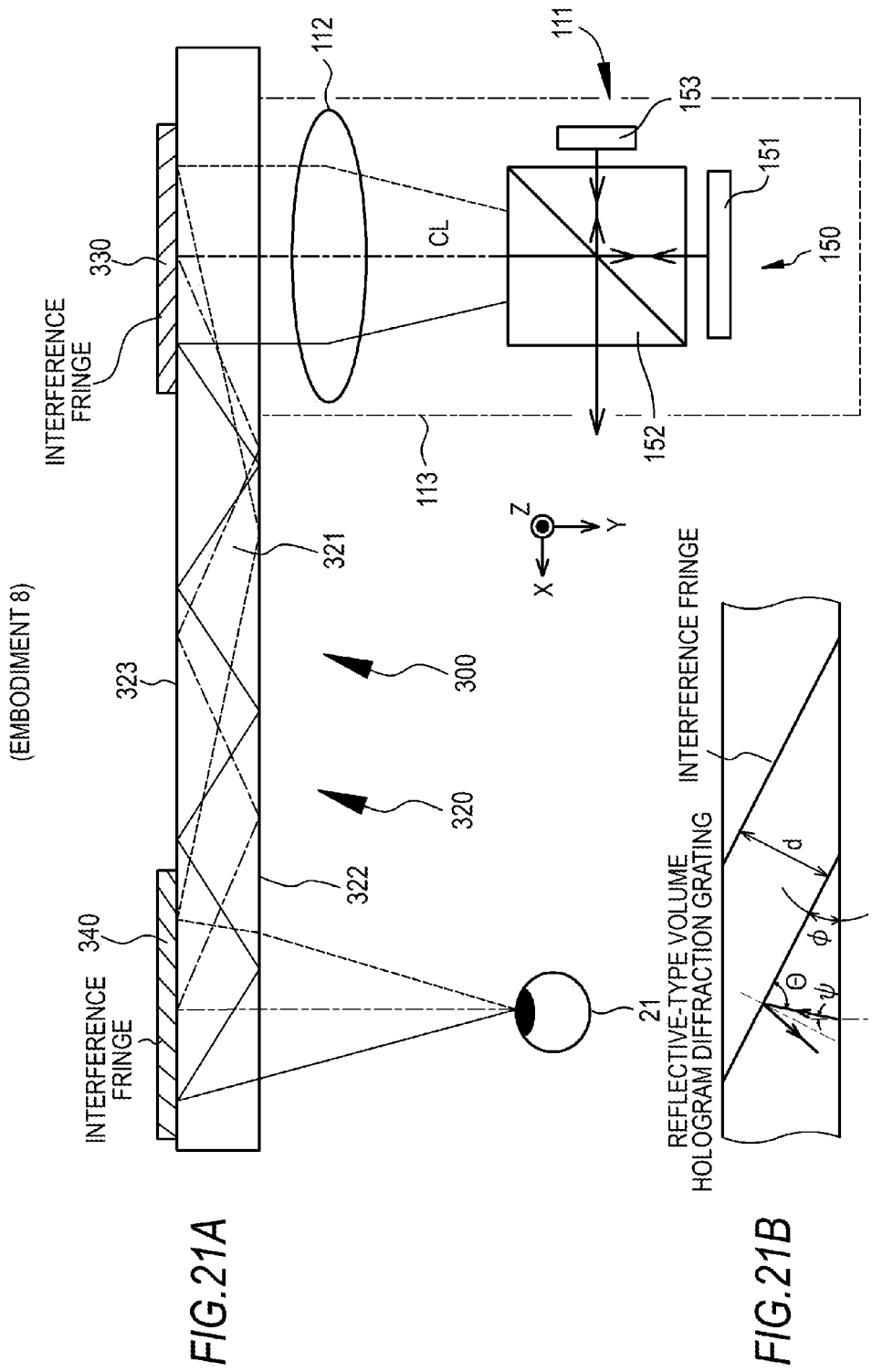

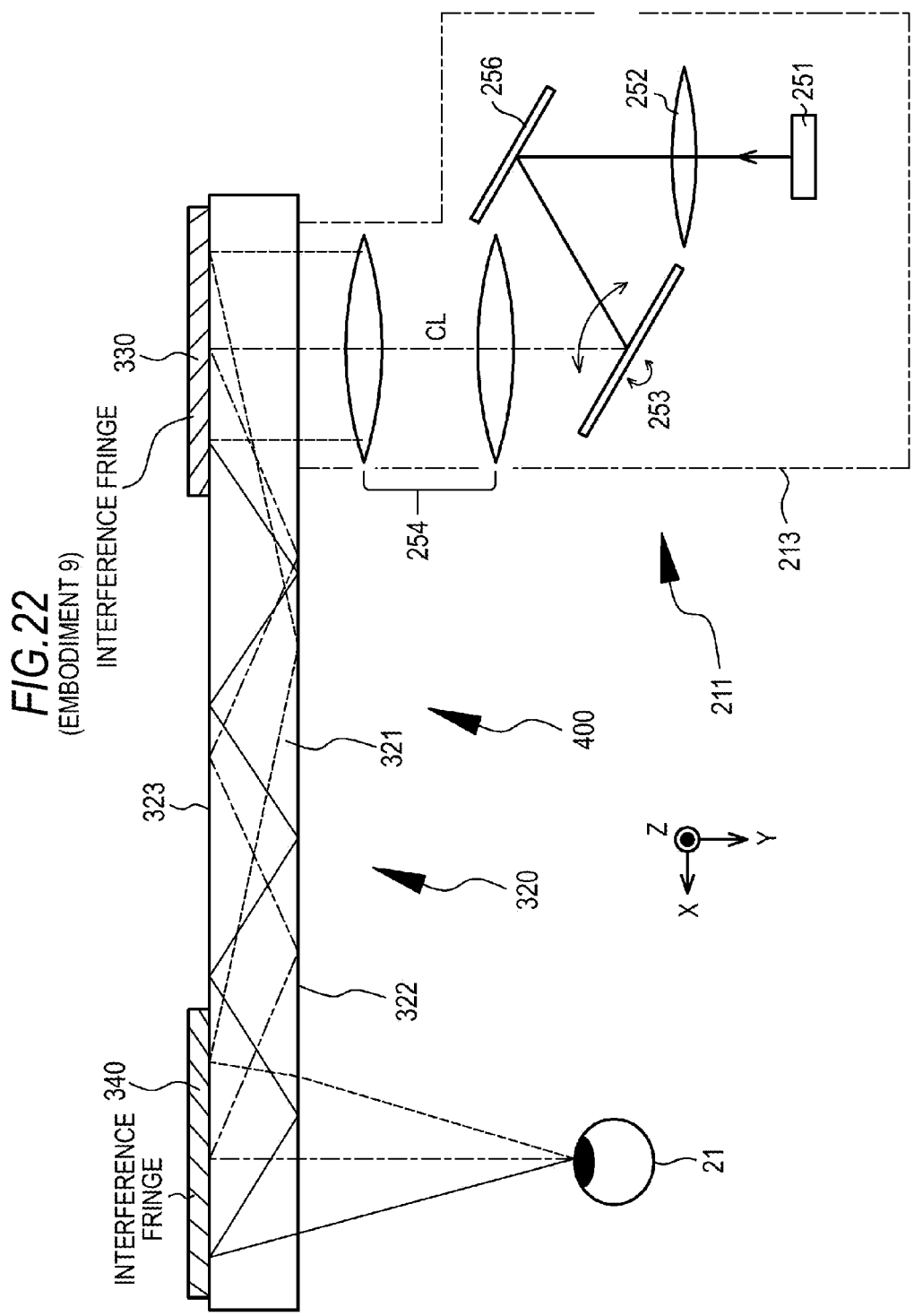
FIG. 22 (EMBODIMENT 9)

(EMBODIMENT 10)

(EMBODIMENT 10)

(EMBODIMENT 11)

(EMBODIMENT 12)

(EMBODIMENT 12)

| DESIGNATED IDENTIFICATION CODE | ENTIRE DISPLAY TIME | LUMINANCE INFORMATION | DATA |
|---|---|---|---|
| 01 | 10 | 60 | AAAAAAAAAA |
| 02 | 20 | 60 | BBBBBBBBBB |
| 03 | 15 | 80 | CCCCCCCCCC |
| 04 | 20 | 50 | DDDDDDDDDD |

DISPLAY APPARATUS

CROSS REFERENCES TO RELATED APPLICATIONS

This application is a continuation of and claims the benefit under 35 U.S.C. §120 of U.S. patent application Ser. No. 13/207,673, titled "DISPLAY APPARATUS," filed on Aug. 11, 2011, which claims the benefit under 35 U.S.C. §119 of Japanese Patent Application JP 2010-182973, filed on Aug. 18, 2010. The entire contents of these applications are hereby incorporated by reference in their entireties.

FIELD

The present disclosure relates to a display apparatus, and more particularly, to a display apparatus using a head-mounted display (HMD).

BACKGROUND

A virtual image displaying device (image displaying device) used for allowing an observer to observe a two-dimensional image formed by an image forming device as a magnified virtual image by using a virtual image optical system is known, for example, as in JP-A-2006-162767.

The image displaying device 100, as illustrated in FIG. 2 as a conceptual diagram thereof, includes: an image forming device 111 that includes a plurality of pixels arranged in a two-dimensional matrix pattern; a collimator optical system 112 that makes light emitted from the pixels of the image forming device 111 to be parallel light; and an optical device (light guiding unit) 120 to which the light formed as the parallel light by the collimator optical system 112 is incident, through which the incident light is guided, and from which the guided light is output. The optical device 120 is configured by: a light guiding plate 121 allowing the incident light to propagate the inside thereof through total reflection and output therefrom; a first deflection unit 130 (for example, configured by a single-layer light reflecting film) reflecting the light incident to the light guiding plate 121 such that the light incident to the light guiding plate 121 is totally reflected inside the light guiding plate 121; and a second defection unit 140 (for example, configured by a multi-layer light reflecting film having a multilayered stacked structure) allowing the light that has propagated the inside of the light guiding plate 121 through total reflection to output from the light guiding plate 121. For example, by configuring an HMD by using the above-described image displaying device 100, a miniaturized, lightweight device can be realized.

In addition, in order to allow an observer to observe a two-dimensional image formed by an image forming device as a magnified virtual image through a virtual image optical system, a virtual image displaying device (image displaying device) using a hologram diffraction grating is known, for example, as in JP-A-2007-94175.

The image displaying device 300, as illustrated in FIGS. 21A and 21B as a conceptual diagram thereof, basically includes: an image forming device 111 that displays an image; a collimator optical system 112, and an optical device (light guiding unit) 320 to which light displayed in the image forming device 111 is incident and which guides the light to the pupils 21 of the eyes 21 of the observer. Here, the optical device 320 includes a light guiding plate 321 and a first diffraction grating member 330 and a second diffraction grating member 340 each configured by a reflection-type volume hologram diffraction grating arranged on the light guiding plate 321. To the collimator optical system 112, light emitted from each pixel of the image forming device 111 is incident, and parallel light is generated by the collimator optical system 112 and is incident to the light guiding plate 321. The parallel light is incident from the first face 322 of the light guiding plate 321 and is output. Meanwhile, the first diffraction grating member 330 and the second diffraction grating member 340 are attached to the second face 323 of the light guiding plate 321 that is parallel to the first face 322 of the light guiding plate 321.

By displaying an image such as a subtitle in either one of the image displaying device 100 or 300, an observer can view an external image (for example, an actor in a play or a video in a movie) and a displayed image in an overlapping manner.

SUMMARY

However, in a case where there is a large difference between the convergence angle of an external image (real image) and the convergence angle of an image (a virtual image displayed in either one of the image displaying device 100 or 300) when an observer views the external image and the image such as a subtitle that is displayed in either one of the display devices 100 or 300 in an overlapping manner, the observer experiences fatigue. In other words, it is necessary to adjust the convergence angle depending on the observation position of the observer with respect to an observation target such as a stage or a screen.

Thus, it is desirable to provide a display apparatus that can realize the optimization of a convergence angle depending on the observation position of an observer with respect to an observation target.

A display device according to any of first to fourth embodiments of the present disclosure includes: a glass-type frame that is mounted to a head of an observer; and two image displaying devices for the left and right eyes that are attached to the frame. Each of the image displaying devices includes an image forming device, an optical system that makes light output from the image forming device to be parallel light, and an optical device to which the light output from the optical system is incident, and in which the light is guided so as to be output.

In the display apparatus according to the first embodiment of the present disclosure, at least one of the image displaying devices (in other words, the image displaying device for the right eye, the image displaying for the left eye, or the two image displaying devices for the left and right eyes; hereinafter the same) further includes a movement device that relatively moves an optical axis of the image forming device and an optical axis of the optical system in a horizontal direction, and a convergence angle (a main light beam intersecting angle in the horizontal face; hereinafter the same) is adjusted by relatively moving the optical axis of the image forming device and the optical axis of the optical system in the horizontal direction by using the movement device depending on an observation position of an observer.

In addition, in the display apparatus according to the second embodiment of the present disclosure, at least one of the image displaying devices further includes a rotary movement device that rotates the image forming device and the optical system, and a convergence angle is adjusted by rotating the image forming device and the optical system by using the rotary movement device depending on an observation position of the observer so as to change an incidence angle of the parallel light that is output from the optical system and is incident to the optical device with respect to the optical device.

Furthermore, in the display apparatus according to the third embodiment of the present disclosure, the optical system that configures at least one of the image displaying devices includes a liquid lens, and a convergence angle is adjusted by operating the liquid lens depending on an observation position of the observer.

In addition, in the display apparatus according to the fourth embodiment of the present disclosure, the optical system that configures at least one of the image displaying devices includes a liquid prism, and a convergence angle is adjusted by operating the liquid prism depending on an observation position of the observer.

In the display apparatus according to the first to fourth embodiments of the present disclosure, the convergence angle (the main light beam intersecting angle in the horizontal face) is adjusted depending on the observation position of the observer, that is, in correspondence with a distance from the display apparatus to the observation target. Accordingly, a distance between the observation target and the observer (audience member) and a virtual image distance of an image displayed by the image displaying device can be configured to be the same or be close to each other as much as possible. Therefore, the observer (audience member) viewing the observation target can view (observe) the image naturally displayed by the image displaying device without particularly shifting or changing the focus, whereby it is difficult for the observer to experience fatigue. In other words, as long as such a state is attained, it can be stated that the distance between the observation target and the observer (audience member) and the virtual image distance of the image displayed by the image displaying device are the same.

BRIEF DESCRIPTION OF THE DRAWINGS

FIGS. 1A and 1B are conceptual diagrams of a display apparatus according to Embodiment 1.

FIG. 2 is a conceptual diagram of an image displaying device of a display apparatus according to Embodiment 1.

FIG. 3 is a diagram schematically illustrating the propagation of light in a light guiding plate configuring an image displaying device of a display apparatus according to Embodiment 1.

FIG. 15 is a schematic cross-sectional view of a liquid lens according to Embodiment 3 similar to that taken along line A-A shown in FIG. 13B.

FIGS. 16A to 16C are schematic cross-sectional views of the liquid lens according to Embodiment 3, which is taken along line C-C shown in FIG. 15, and are diagrams schematically illustrating the behavior of the liquid lens.

FIG. 20 is a conceptual diagram of an image displaying device of a display apparatus according to Embodiment 7.

FIGS. 21A and 21B are conceptual diagrams of an image displaying device of a display apparatus according to Embodiment 8.

FIG. 22 is a conceptual diagram of an image displaying device of a display apparatus according to Embodiment 9.

FIGS. 23A and 23B are a diagram schematically illustrating the propagation of light in a light guiding plate that configures an image displaying device of a display apparatus according to Embodiment 10 and a conceptual diagram illustrating the arrangement state of the light guiding plate and the like.

FIGS. 25A and 25B are a diagram schematically illustrating the propagation of light in a light guiding plate that configures an image displaying device of a display apparatus according to Embodiment 11 and a conceptual diagram illustrating the arrangement state of the light guiding plate and the like.

DETAILED DESCRIPTION

Figure 4:
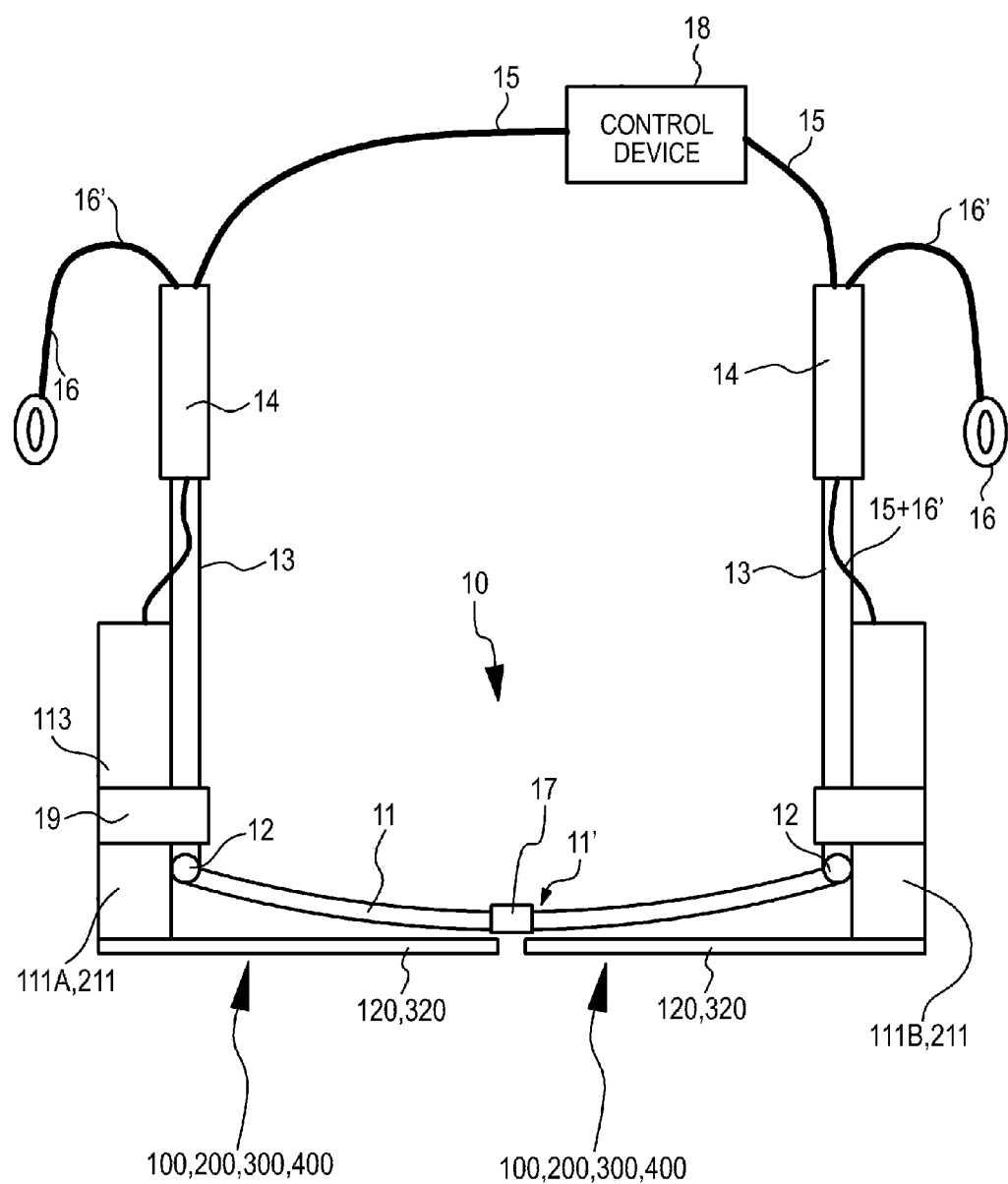
FIG. 4 is a schematic diagram of a display apparatus according to Embodiment 1, viewed from the upper side thereof.

Hereinafter, embodiments of the present disclosure will be described with reference to the accompanying drawings. However, the present disclosure is not limited to the embodiments, and various numbers and materials in the embodiments are examples. The description will be presented in the following order.

1. Description of Overview of Display Apparatuses According to First to Fourth Embodiments of Present Disclosure 2. Embodiment 1 (Display Apparatus According to First Embodiment of Present disclosure)

3. Embodiment 2 (Display Apparatus According to Second Embodiment of Present disclosure)

4. Embodiment 3 (Display Apparatus According to Third Embodiment of Present disclosure)

5. Embodiment 4 (Display Apparatus According to Fourth Embodiment of Present disclosure)

6. Embodiment 5 (Modification of Embodiments 1 to 4)

7. Embodiment 6 (Modification of Embodiments 1 to 5)

8. Embodiment 7 (Modification of Embodiments 1 to 6)

9. Embodiment 8 (Another Modification of Embodiments 1 to 6)

10. Embodiment 9 (Modification of Embodiment 8)

11. Embodiment 10 (Modification of Embodiments 1 to 9)

12. Embodiment 11 (Modification of Embodiment 10)

13. Embodiment 12 (Modification of Embodiments 1 to 6)

14. Embodiment 13 (Display Apparatus Having First Configuration)

15. Embodiment 14 (Display Apparatus Having Second Configuration)

16. Embodiment 15 (Display Apparatus Having Third Configuration)

17. Embodiment 16 (Display Apparatus Having Fourth Configuration)

[Description of Overview of Display Apparatuses According to First to Fourth Embodiments of Present Disclosure]

In a display apparatus according to the first to fourth embodiments of the present disclosure, a form may be employed in which the convergence angle is adjusted further by controlling an image signal input to an image forming device configuring at least one image displaying device.

In addition, a form may be employed in which an arbitrary combination of a horizontal movement, a vertical movement, and a rotary movement of an image displayed in an optical device configuring at least one image displaying device can be achieved by controlling the image signal input to the image forming device that configures at least one image displaying device. In such movements of the image, for example, a non-display area may be secured in the optical device so as to be assigned for the movement of the image. As above, in a case where the mutual optical positions of two image displaying devices are adjusted while controlling the position of an image displayed in the optical device configuring at least one image displaying device, to be more specific, the position of the image displayed in the optical device configuring at least one image displaying device may be controlled such that images displayed by an image displaying device for the left eye and an image displaying device for the right eye coincide with each other at a desired virtual image distance or a desired virtual image position. To be more specific, a display position correcting signal may be added to the original image signal such that images displayed by the image displaying device for the left eye and the image displaying device for the right eye coincide with each other at a desired virtual image distance or a desired virtual image position when the observer is equipped with the display apparatus. In addition, the related display position correcting signal may be stored in the display apparatus (particularly, a control device included in the display apparatus). By employing such a configuration, the position of the image displayed in the optical device can be adjusted depending on the observation position of the observer. Accordingly, when the observer views the image overlapping an external image, the display position of the external image to be closely observed and display position of the image are not separated away from each other, whereby the image can be visually recognized further easily.

In the display apparatuses according to the first to fourth embodiments of the present disclosure, which include the preferred forms described above, a form may be further employed in which image formation performed by the image forming device is stopped when a predetermined time elapses after an image signal is input to the image forming device. Accordingly, in such a case, since the mode of the display apparatus can be switched to a power saving mode or a standby and idle mode after the predetermined time elapses, there is no problem of wasting power or energy in the display apparatus. Here, in order to stop the image formation process of the image forming device, in other words, in order to switch the mode of the display apparatus to the power saving mode or the standby and idle mode (hereinafter, these mode may be collectively referred to as a "power saving mode or the like"), for example, a signal representing image display time in the image displaying device or a signal used for instructing the stopping of an image formation process of the image forming device may be added to the image signal. As examples of the predetermined time, there are a time that is necessary for an ordinary person to read a subtitle displayed in the image forming device and a subtitle display time that is determined in accordance with the length of an actor's line.

In addition, in the display apparatuses according to the first to fourth embodiments of the present disclosure, which include the preferred forms described above, a form may be further employed in which information relating to the observation position of an observer (hereinafter, referred to as "observation position information of an observer) is given to the display apparatus in advance, in addition to the image signal input to the image forming device. Alternatively, a form may be employed in which the observation position information of an observer is transmitted to the display apparatus from the outside thereof, or a form may be employed in which a position measuring unit that measures the observation position of an observer is further included. In the former form, the observation position information of an observer may be transmitted to the display apparatus (particularly, the control device that is included in the display apparatus) in a wireless manner. In the latter form, to be more specific, as examples of the position measuring unit, there are a camera or an imaging device that is provided with an automatic focus function (for example, a camera or an imaging device that has an active-type distance measuring device that irradiates an observation target with an infrared ray, an ultrasonic wave, or the like and detects a distance based on a time until a reflection wave thereof is returned or the irradiation angle or a passive-type distance measuring device) and a distance measuring device (an active-type distance measuring device) for a camera provided with an automatic focus function. Alternatively, it may be configured such that a button or a switch is arranged in the display apparatus, and a distance from the display apparatus to an observation target is manually set. Furthermore, a form may be employed in which the observation position information of an observer is set in the display apparatus in advance. Alternatively, the observation position information of an observer may be given to the display apparatus from a personal computer, and, for example, it may be configured such that seat information or theater information (hall information, theater information, or the like, hereinafter the same) printed on a ticket in the form of a barcode or seat information or theater information included in ticket information displayed in a cellular phone is read out by using an appropriate unit and an appropriate method, and the observation position information of an observer, which is based on the related seat information or the theater information, is given to the display apparatus by using an appropriate unit.

Furthermore, in the display apparatuses according to the first to fourth embodiments of the present disclosure, which include the preferred forms described above, a form may be further employed in which a luminance signal of an image to be displayed in the optical device is transmitted to the display apparatus from the outside, in addition to the image signal input to the image forming device, or a form may be employed in which a light receiving sensor is further included, and the luminance of an image to be displayed in the optical device is controlled based on luminance information of the environment (the ambience in which the display apparatus or an observation target is placed) that is acquired by the light receiving sensor. In the former form, the luminance signal may be transmitted to the display apparatus from the outside thereof in a wireless manner. In the latter form, to be more specific, as examples of the light receiving sensor, there are a photodiode or a light receiving device used for measuring the exposure that is included in the camera or the imaging device described above.

A form may be employed in which the image signal is transmitted to the display apparatus in a wireless manner. Here, in such a form, the image signal, for example, is received by the control device, and a process for displaying an image is performed in the control device. Alternatively, a form may be employed in which the image signal is stored in the display apparatus (control device). The control device (a control unit or a control circuit) may be configured by a known circuit.

Furthermore, in the display apparatuses according to the first to fourth embodiments of the present disclosure, which include the preferred forms described above, a form may be further employed in which the optical device is a semi-transmissive type (see-through type). To be more specific, it is preferable that at least a portion of the optical device that faces both eyes of an observer is configured to be semi-transmissive (see-through), and the outside scene can be viewed.

In the display apparatuses according to the first to fourth embodiments of the present disclosure, which include the preferred forms described above (hereinafter, these may be collectively referred to as a "display apparatus according to an embodiment of the present disclosure"), an image that is displayed in the optical device based on an image signal is formed from texts. Here, an image signal (it may be referred to as "text data") used for displaying texts as an image is digitalized data and may be generated in advance by an operator or through a process of a computer or the like. The format of the text data may be appropriately selected depending on a display apparatus or a system that is used and, for example, may be text data formed from a text string or image data that is a text string set as an image.

In a display apparatus according to an embodiment of the present disclosure, in order to alleviate the fatigue of the pupils of the eyes of an observer that is caused by continuously watching an image (for example, a subtitle or a virtual image) displayed at a constant position, positions (image positions) of images formed by two optical devices or distances (image distances) of images (for example, a subtitle and a virtual image) formed by two optical devices from two optical devices may be configured to be changed over time. Here, "being changed over time" denotes changing the position of an image in the horizontal direction, for example, by +2 pixels or −1 pixel in the image forming device, for example, once for every five to ten minutes, for example, over one minute to three minutes and returning the position to the original position.

In the display apparatus according to the embodiment of the present disclosure, which includes the preferred various forms and configurations described above, a configuration may be employed in which the control device included in the display apparatus includes a storage unit, a data group configured by a plurality of image signals (for example, text data) used for displaying an image is stored in the storage unit, a data identification code is added to each image signal configuring the data group, a designated identification code and display time information are transmitted to the control device from the outside at a predetermined time interval, an image signal of which the data identification code coincides with the designated identification code that has been transmitted is read out from the storage unit by the control device, and an image on the basis of the image signal is displayed in the display apparatus during the time corresponding to the transmitted display time information. In addition, the "time corresponding to the display time information" may be the "predetermined time". For the convenience of the description, the related configuration may be referred to as a "display apparatus having the first configuration".

In such a display apparatus having the first configuration, the designated identification code and the display time information are transmitted to the control device from the outside at a predetermined time interval, an image signal of which the data identification code coincides with the designated identification code that has been transmitted is read out from the storage unit by the control device, and an image on the basis of the image signal is displayed in the image forming device during the time corresponding to the transmitted display time information. Accordingly, even in a case where reception of the designated identification code and/or the display time information transmitted from the outside is failed in the control device for any reason, again or repeatedly, the reception of the designated identification code and the display time information can be performed, and accordingly, the designated identification code and the display time information can be assuredly received. As a result, for example, even in a case where the designated identification code and the display time information are received by a plurality of the display apparatuses, the same image can be assuredly displayed in the plurality of display apparatuses at the same time, and the occurrence of a problem in which it is difficult to display an image in the display apparatuses can be reliably avoided.

Alternatively, in the display apparatus according to the embodiment of the present disclosure, which includes the preferred various forms and configurations described above, a configuration may be employed in which the control device included in the display apparatus includes a storage unit, a data group configured by a plurality of image signals (for example, text data) used for displaying an image is stored in the storage unit, a data identification code is added to each image signal configuring the data group, each image signal is configured by a plurality of sets of different-size display data having different display sizes, a designated identification code is transmitted to the control device from the outside, one set of the different-size display data is read out from a plurality of sets of the different-size display data from the storage unit by the control device out of image signals of which the data identification codes coincide with the designated identification code that has been transmitted based on a distance between the observation target and the display apparatus, and an image on the basis of the one set of the different-size display data is displayed in the display apparatus. For the convenience of the description, the related configuration may be referred to as a "display apparatus having the second configuration".

In the display apparatus having the second configuration, one set of the different-size display data is read out from a plurality of sets of the different-size display data from the storage unit by the control device out of image signals of which the data identification codes coincide with the designated identification code that has been transmitted based on a distance between the observation target and the display apparatus, and an image on the basis of the one set of the different-size display data is displayed in the image forming device, whereby it is difficult for unbalance between the size of the target object that is observed by the eyes and the size of the image to occur.

Alternatively, in the display apparatus according to the embodiment of the present disclosure, which includes the preferred various forms and configurations described above, a configuration may be employed in which the control device included in the display apparatus includes a storage unit, a data group configured by a plurality of image signals (for example, text data) used for displaying an image is stored in the storage unit, a data identification code is added to each image signal configuring the data group, each image signal is configured by a plurality of sets of different-language display data having different display languages, a designated identification code is transmitted to the control device from the outside, one set of the different-language display data is readout from a plurality of sets of the different-language display data from the storage unit by the control device out of image signals of which the data identification codes coincide with the designated identification code that has been transmitted distance between the observation target and the display, and an image on the basis of the one set of the different-language display data is displayed in the display apparatus. For the convenience of the description, the related configuration may be referred to as a "display apparatus having the third configuration". As an example of method of selecting a language as the display language, for example, there is a method in which a button or a switch is arranged in the control device, and a language is manually selected as the display language.

In the display apparatus having the third configuration, one set of the different-language display data is readout from a plurality of sets of the different-language display data from the storage unit by the control device out of image signals of which the data identification codes coincide with the designated identification code that has been transmitted, and an image on the basis of the one set of the different-language display data is displayed in the image forming device, whereby an image display can be performed in a language used by an observer (the audience) in an easy manner.

Alternatively, in the display apparatus according to the embodiment of the present disclosure, which includes the preferred various forms and configurations described above, a configuration may be employed in which the control device included in the display apparatus includes a storage unit, a data group configured by a plurality of image signals (for example, text data) used for displaying an image is stored in the storage unit, a data identification code is added to each image signal configuring the data group, a designated identification code is transmitted to the control device from the outside, an image signal of which the data identification code coincides with the designated identification code that has been transmitted is read out form the storage unit by the control device, and data processing is performed depending on a distance between an observation target and the display apparatus, whereby an image on the basis of the image signals for which the data processing has been performed is displayed in the display apparatus, for example, in a state in which the convergence angle is controlled. For the convenience of the description, the related configuration may be referred to as a "display apparatus having the fourth configuration". Here, the image processing may be performed for an image signal input to the image forming device that configures at least one image displaying device based on the distance between the display apparatus to the observation target.

Alternatively, in the display apparatus according to the embodiment of the present disclosure, which includes the preferred various forms and configurations described above, the size of a display screen (image display area) displayed in the optical device, the angle of view of the display screen (image display area), and the resolution of the display screen may be changed depending on the observation position of an observer and the distance between the observation target and the display apparatus. For the convenience of the description, the related configuration may be referred to as a "display apparatus having the fifth configuration".

In addition, the display apparatuses having the first to fifth configurations can be appropriately combined. In the display apparatuses having the first to fifth configurations, the control device may be configured by a known circuit as described above, and the storage unit may be configured by a known storage unit, for example, a memory card. In addition, a configuration may be employed in which the designated identification code and the display time information are transmitted from a transmission apparatus in a wireless manner, and, furthermore, a configuration may be employed in which the transmission apparatus includes a display apparatus, and the designated identification code, the data group, and each image signal or the entire display time of each display data are displayed in the display apparatus. However, the configuration is not limited thereto, and the transmission may be performed in a wired manner. The transmission apparatus used for transmitting the designated identification code to the control device may be configured by a known transmission apparatus, and the display apparatus included in the transmission apparatus may be configured by a known display apparatus.

In addition, the number of data groups is fundamentally arbitrary, and the number of the image signals (for example, text data) configuring each data group and the number of sets of the display data configuring the image signal (text data) are fundamentally arbitrary. The data structure of the image signal or the display data, for example, may be text data that is configured by a text string or image data that is a text string set as an image. The display data having different sizes may be text data that is configured by text strings having different font sizes and may be image data that is text strings having different font sizes as an image. The display language of the display data is fundamentally arbitrary. By performing predetermined signal processing for the image signal or the display data, an image signal can be acquired.

The designated identification code and the data identification code may be any codes as long as they can be used for identifying an image signal and, for example, may be a number, a letter of the alphabet, or a combination of a number and a letter.

The designated identification code and the display time information are transmitted to the control device from the outside at a predetermined time interval. Here, when the entire display time, the display time information, and the predetermined time interval are respectively denoted by Ttotal, TInf, and Tint, it can be represented that $TInf(m)=Ttotal-(m-1)\times Tint$. Here, "m" is a positive integer and represents the number of times of transmitting the designated identification code and the display time information from the outside. For example, when Ttotal=10.0 seconds and Tint=0.1 seconds, the display time information TInf(m) at a time when the designated identification code and the display time information are transmitted to the control device from the outside at the first time (m=1) is TInf(1)=10.0 seconds. In addition, the display time information TInf(m) at a time when the designated identification code and the display time information are transmitted to the control device from the outside at the second time (m=2) and that at the eleventh time (m=11) are TInf(2)=9.9 seconds and TInf(11)=9.0 seconds. An image that is based on the image signal or one set of the display data is displayed in the image forming device during a time corresponding to the display time information TInf (m).

Here, in a case where the display of an image is started in the image forming device, even when the same designated identification code and different display time information are transmitted to the control device from the outside thereafter, the control device may ignore the designated identification code and the display time information and continue to display the image. In such an operation, some type of a flag (reception completion flag) may be set in the control device. On the other hand, in a case where the control device fails to receive the designated identification code and/or the display time information from the outside from the 1st time to the (m'−1)-th time for some reason and succeeds to receive the designated identification code and the display time information at the m'-th time for the first time, an image that is based on the image signal or one set of the display data may be displayed by the image forming device during the time $TInf(m')=Ttotal-(m'-1)\times Tint$.

The instruction that the designated identification code and the display time information are transmitted at the first time (m=1), for example, may be performed by an operator, be performed by the control process of a computer or the like, or be performed based on the movement of an observation target, a change in the sound of an actor as an observation target, a change in the environment (for example, a change in the illumination or the acoustics) that is occupied by the observation target, or the like.

In an image displaying device (hereinafter, briefly referred to as an "image displaying device according to an embodiment of the present disclosure") that configures a display apparatus according to an embodiment of the present disclosure, which includes the preferred various forms and configurations described above, an optical device may be configured so as to include:

(a) a light guiding plate in which light incident thereto propagates to the inside through total reflection and then from which the light is output;

(b) a first deflection unit that deflects the light incident to the light guiding plate such that the light incident to the light guiding plate is totally reflected inside the light guiding plate; and (c) a second deflection unit that deflects the light propagating through the inside of the light guiding plate through total reflection over a plurality of times for outputting the light propagating through the inside of the light guiding plate through total reflection from the light guiding plate. Here, the term "total reflection" represents the internal total reflection or total reflection inside the light guiding plate. Hereinafter, "total reflection" represents the same.

Light beams that are output from the center of the image forming device and pass through a nodal point of the optical system that is positioned on the side of the image forming device is referred to as a "center light beam, and a light beam that is vertically incident to the optical device out of the center light beams is referred to as a "center-incident light beam". A point at which the center-incident light beam is incident to the optical device is set as an optical device center point, an axial line that passes though the optical device center point and is parallel to the axial line of the optical device is set as the X axis, and an axial line that passes through the optical device center point and coincides with the normal line of the optical device is set as the Y axis. The horizontal direction in the display apparatus according to the embodiment of the present disclosure is a direction parallel to the X axis and may be referred to as an "X-axis direction". Here, the optical system is arranged between the image forming device and the optical device and allows the light output from the image forming device to be parallel light. Then, the light beams formed to be parallel by the optical system are incident to the optical device, are guided, and are output. In addition, the center point of the first deflection unit is set as the "optical device center point".

In the image displaying device according to the embodiment of the present disclosure, the center light beams may be configured so as to intersect the XY plane at an angle ($\theta$) other than zero degrees. However, the configuration of the image displaying device is not limited thereto. Accordingly, the limitation on the attachment angle of the image displaying device at the time of installing the image displaying device to an attachment portion of a glass-type frame decreases, whereby a high degree of freedom for design can be acquired. When the XY plane is assumed to coincide with the horizontal plane, the angle θ at which the center light beams intersect the XY plane may be configured as an elevation angle. In other words, the center light beams may be configured to collide with the XY plane from the lower side of the XY plane toward the XY plane. In such a case, it is preferable that the XY plane intersects the vertical surface at an angle other than zero degrees, and it is more preferable that the XY plane intersects the vertical surface at an angle θ'. Furthermore, although the maximum value of the angle θ' is not limited, it may be 5 degrees. Here, the horizontal plane includes a line of sight (horizontal line of sight of an observer) when an observer views a target (for example, a target located at an infinite distance, for example, the horizon) that is located in the horizontal direction and is a plane in which two pupils of the eyes of the observer that are horizontally positioned are included. In addition, the vertical plane is a plane that is perpendicular to the horizontal plane. Alternatively, a form may be employed in which the center light beams that are output from the optical device and are incident to the pupils of the eyes of the observer form a depression angle when an observer views a target (for example, a target located at an infinite distance, for example, the horizon) that is located in the horizontal direction. The depression angle relating to the horizontal plane, for example, may be in the range of 5 degrees to 45 degrees.

Here, it may be configured such that the first deflection unit reflects the light incident to the light guiding plate, and the second deflection unit transmits and reflects light propagating through the inside of the light guiding plate through total reflection over a plurality of times. In this case, it may be configured such that the first deflection unit serves as a reflective mirror, and the second deflection unit serves as a semi-transmissive mirror.

In such a configuration, the first deflection unit, for example, is formed from metal containing an alloy and can be configured by a light reflecting film (one type of mirror) that reflects the light incident to the light guiding plate or a diffraction grating (for example, a hologram diffraction grating film) that diffracts the light incident to the light guiding plate. In addition, the second deflection unit can be configured by a multi-layer laminated structure body in which multiple dielectric lamination films are laminated, a half mirror, a polarizing beam splitter, or a hologram diffraction grating film. The first deflection unit or the second deflection unit is arranged inside of the light guiding plate (built inside of the light guiding plate). In the first deflection unit, parallel light incident to the light guiding plate is reflected or diffracted such that the parallel light incident to the light guiding plate is totally reflected inside the light guiding plate. On the other hand, in the second deflection unit, the parallel light propagating through the inside of the light guiding plate through total reflection is reflected or diffracted over a plurality of times so as to be output from the light guiding plate in the state of parallel light.

Alternatively, it may be configured such that the first deflection unit diffracts the light incident to the light guiding plate, and the second deflection unit diffracts the light propagating through the inside of the light guiding plate through total reflection over a plurality of times. In such a case, the first deflection unit and the second deflection unit may be in the form of being configured by diffraction grating devices, and, furthermore, the diffraction grating devices may be formed by reflective-type diffraction grating devices or transmissive-type diffraction grating devices, or it may be configured such that one diffraction grating device is formed by a reflective-type diffraction grating device, and the other diffraction grating device is formed by a transmissive-type diffraction grating device. As an example of the reflective-type diffraction grating device, there is a reflective-type volume hologram diffraction grating. For the convenience of the description, the first deflection unit that is formed by the reflective-type volume hologram diffraction grating may be referred to as a "first diffraction grating member", and the second deflection unit that is formed by the reflective-type volume hologram diffraction grating may be referred to as a "second diffraction grating member".

According to the image displaying device according to the embodiment of the present disclosure, an image display of a single color (for example, green) can be performed. However, in the case of performing a color image display, in order to allow the first diffraction grating member or the second diffraction grating member to be in correspondence with the diffraction and the reflection of P types (for example, P=3, and three types of red, green and blue) of light having P different types of wavelength bands (or wavelengths), the first diffraction grating member or the second diffraction grating member may be configured by laminating the diffraction grating layers of P layers formed by the reflective-type volume hologram diffraction gratings. In each diffraction grating layer, interference fringes corresponding to one type of the wavelength band (or the wavelength) are formed. Alternatively, in order to be in correspondence with the diffraction and the reflection of light of P types having different P-type wavelength bands (or wavelengths), interference fringes of P types may be configured to be formed in the first diffraction grating member or the second diffraction grating member that is formed by a diffraction grating layer of one layer. Alternatively, it may be configured such that the angle of view, for example, is divided into three equal portions, and the first diffraction grating member or the second diffraction grating member is formed by laminating a diffraction grating layer corresponding to each angle of view. By employing such a configuration, an increase in the diffraction efficiency, an increase in the diffraction acceptance angle, and the optimization of the diffraction angle at the time of diffracting and reflecting light having each wavelength band (or the wavelength) by using the first diffraction grating member or the second diffraction grating member can be achieved.

As the material that forms the first diffraction grating member and the second diffraction grating member, there is a photopolymer material. The composition material and the basic structure of the first diffraction grating member and the second diffraction grating member that are formed by reflective-type volume hologram diffraction gratings may be the same as those of a general reflective-type volume hologram diffraction grating. The reflective-type volume hologram diffraction grating represents a hologram diffraction grating that diffracts and reflects only the +1st order diffracted light. In the diffraction grating member, interference fringes are formed over the surface thereof from the inside, and a method of forming the related interference fringes may be the same as a general forming method thereof. To be more specific, for example, the interference fringes that are formed by the object light and the reference light may be recorded inside a member that configures the diffraction grating member by irradiating a member (for example, a photopolymer material) configuring the diffraction grating member with the object light in a first predetermined direction on one side, and concurrently irradiating the member configuring the diffraction grating member with reference light in a second predetermined direction on the other side. By appropriately selecting the first predetermined direction, the second predetermined direction, and the wavelengths of the object light and the reference light, a desired pitch of the interference fringes and a desired angle of inclination (inclination angle) of the interference fringes on the surface of the diffraction grating member can be acquired. The angle of inclination of the interference fringes represents an angle that is formed by the surface of the diffraction grating member (or the diffraction grating layer) and the interference fringes. In a case where the first diffraction grating member and the second diffraction grating member are configured from a laminated structure of the diffraction grating layers as P layers that are formed by reflective-type volume hologram diffraction gratings, the laminating of the diffraction grating layers may be performed by using a method in which, after the diffraction grating layers as P layers are individually manufactured, the diffraction grating layers as P layers are laminated (bonded), for example, by using an ultraviolet curing adhesive. Alternatively, the diffraction grating layers as P layers may be manufactured by using a method in which, after a diffraction grating layer as one layer is manufactured using a photopolymer material having adhesiveness, diffraction grating layers are manufactured by sequentially attaching photopolymer materials having adhesiveness thereon.

Alternatively, in the image displaying device according to the embodiment of the present disclosure, a form may be employed in which the optical device is configured by a semi-transmissive mirror to which light output from the image forming device is incident so as to be output toward the pupil of the eye of the observer. In addition, a structure may be employed in which the light output from the image forming device propagates through the air and is incident to the semi-transmissive mirror, or a structure may be employed in which the light propagates through the inside of a transparent member (to be more specific, a member that is formed from a material that is the same as the material composing the light guiding plate to be described later) such as a glass plate or a plastic plate and is incident to the semi-transmissive mirror. In addition, the semi-transmissive mirror may be attached to the image forming device through the transparent member, or the semi-transmissive mirror may be attached to the image forming device through a member other than the transparent member.

In the image displaying device according to the embodiment of the present disclosure, which includes the various preferred forms and configurations described above, a form may be employed in which the image forming device has a plurality of pixels arranged in a two-dimensional matrix pattern. For the convenience of the description, the configuration of such an image forming device is referred to as an "image forming device according to the first configuration".

As examples of the image forming device according to the first configuration, for example, there are: an image forming device that is configured by a reflective-type spatial light modulation device and a light source; an image forming device that is configured by a transmissive-type spatial light modulation device and a light source; and an image forming device that is configured by a light emitting device such as an organic EL (Electro Luminescence), an inorganic EL, or a light emitting diode (LED). Of the above-described image forming devices, the light forming device that is configured by a reflective-type spatial light modulation device and a light source is preferably used. As examples of the spatial light modulation device, a light valve, for example, a transmissive-type or a reflective-type liquid crystal display device such as an LCOS (Liquid Crystal On Silicon) and a digital micro mirror device (DMD), and, as an example of the light source, there is a light emitting device. Furthermore, the reflective-type spatial light modulation device may have a configuration that is formed by a liquid crystal display device, and a polarizing beam splitter that reflects a part of the light emitted from the light source and guides the part of the light to the liquid crystal display device, and allows a part of the light reflected by the liquid crystal display device to pass through it so as to be guided to an optical system. As examples of the light emitting device that configures the light source, there are a red light emitting device, a green light emitting device, a blue light emitting device, and a white light emitting device. Alternatively, white light may be acquired by performing color mixing and luminance uniformization of red light, green light, and blue light emitted from the red light emitting device, the green light emitting device, and the blue light emitting device by using a light pipe. As examples of the light emitting device, there are a semiconductor laser device, a solid-state laser, and an LED. The number of the pixels can be determined based on the specification that is demanded for the image displaying device. As examples of specific values of the number of the pixels, there are 320×240, 432×240, 640×480, 1024×768, 1920×1080, and the like.

Alternatively, in the image displaying device according to the embodiment of the present disclosure, which includes the preferred forms and configurations described above, the image forming device may have a form in which a light source and a scanning unit scanning parallel light emitted from the light source are included. For the convenience of the description, the configuration of such an image forming device is referred to as an "image forming device according to the second configuration".

As an example of the light source of the image forming device according to the second configuration, there is a light emitting device. To be more specific, there are a red light emitting device, a green light emitting device, a blue light emitting device, and a white light emitting device. Alternatively, white light may be acquired by performing color mixing and luminance uniformization of red light, green light, and blue light emitted from the red light emitting device, the green light emitting device, and the blue light emitting device by using a light pipe. As examples of the light emitting device, there are a semiconductor laser device, a solid-state laser, and an LED. The number of pixels (virtual pixels) of the image forming device according to the second configuration can be determined based on the specification that is demanded for the image displaying device. As examples of specific values of the number of the pixels, there are 320×240, 432×240, 640×480, 1024×768, 1920×1080, and the like. In addition, in a case where a color image display is performed, and the light source is configured by a red light emitting device, a green light emitting device, and a blue light emitting device, it is preferable that color composition is performed, for example, by using a cross prism. As examples of the scanning unit, MEMS (Micro Electro Mechanical Systems), which have a micro mirror that can be rotated in a two-dimensional direction, and a galvanometer that perform horizontal scanning and vertical scanning of the light emitted from the light source can be given.

In the image forming device according to the first configuration or the image forming device according to the second configuration, light that is formed as a plurality of parallel light beams by an optical system (an optical system that forms output light as parallel light beams and may be referred to as a "parallel light output optical system"; more particularly, for example, a collimator optical system or a relay optical system) is incident to the light guiding plate. However, such a demand for the parallel light beams is based on light wave-front information at the time when the light is incident to the light guiding plate is necessarily conserved after the light is output from the light guiding plate through a first deflection unit and a second deflection unit. In addition, in order to generate a plurality of parallel light beams, particularly, for example, a light output portion of the image forming device may be located at a place (position) that is positioned at a focal distance of the parallel light output optical system. The parallel light output optical system has a function for converting the position information of a pixel into angle information in the optical system of the optical device. In the display apparatus device according to the first embodiment, the second embodiment, or the fourth embodiment of the present disclosure, as an example of the parallel light output optical system, there is an optical system, which has positive optical power as a whole, configured by one of a convex lens, a concave lens, a free-form surface prism, and a hologram lens or a combination thereof. Between the parallel light output optical system and the light guiding plate, a light shielding member having an opening portion may be arranged so as not to allow undesirable light to be emitted from the parallel light output optical system and be incident to the light guiding plate.

The light guiding plate has two parallel faces (first and second faces) that extend in parallel with the axial line (the X axis) of the light guiding plate. When the face of the light guiding plate to which light is incident is represented as a light guiding plate incidence face, and the face of the light guiding plate from which light is output is represented as a light guiding plate output face, the light guiding plate incidence face and the light guiding plate output face may be configured by the first face, or it may be configured such that the light guiding plate incidence face is configured by the first face, and the light guiding plate output face is configured by the second face. As examples of the material composing the light guiding plate, there are quartz crystal glass, glass containing optical glass such as BK7, and a plastic material (for example, PMMA, a polycarbonate resin, an acrylic resin, an amorphous polypropylene-based resin, or a styrene-based resin containing an AS resin). The shape of the light guiding plate is not limited to a parallel plate and may have a curved shape.

Depending on the observation position of an observer, the display apparatus according to the first embodiment of the present disclosure operates a movement device, the display apparatus according to the second embodiment operates a rotary movement device, the display apparatus according to the third embodiment operates a liquid lens, and the display apparatus according to the fourth embodiment operates a liquid prism, and such operations are controlled in accordance with control signals transmitted from the control device based on the observation position information of the observer.

In the display apparatus according to the first embodiment of the present disclosure, the optical axis of the image forming device and the optical axis of the optical system are relatively moved in the horizontal direction (the X-axis direction) by the movement device. To be more specific, as an example, a form may be employed in which, while fixing the positional relationship between the optical axis of the image forming device and the optical axis of the optical system of one image displaying device, the positions of the optical axis of the image forming device and the optical axis of the optical system of the other image displaying device are relatively moved in the horizontal direction (the X-axis direction). Alternatively, as an example, there is a form in which the positions of the optical axes of the image forming devices and the optical axes of the optical system of both the image displaying devices are relatively moved in the horizontal direction (the X-axis direction). In such a form, a change in the incidence angle (an angle formed by the center light beam and the YZ plane, and, hereinafter, referred to as a "YZ plane incidence angle") of parallel light, which is output from the optical system and is incident to the optical device, with respect to the optical device, occurs. In addition, in such a form, a system may be employed in which one of the image forming device and the optical system is placed in a movement guiding unit that is configured, for example, by a rack gear unit, and one of the image forming device and the optical system is moved on the movement guiding unit by a motor and a pinion gear. Alternatively, a system may be employed in which one of the image forming device and the optical system is placed in the movement guiding unit, and one of the image forming device and the optical system is moved on the movement guiding unit by using a piezoelectric device or an ultrasonic motor.

In the display apparatus according to the second embodiment of the present disclosure, the image forming device and the optical system are rotated by the rotary movement device. To be more specific, while fixing the positional relationship of the optical axes of the image forming devices and the optical axes of the optical systems of two image displaying devices, at least one image displaying device may be rotated around the Z axis as a rotation axis by operating a piezoelectric device, a motor, or an ultrasonic motor. Even in such a form, a change in the YZ plane incidence angle of the parallel light, which is output from the optical system and is incident to the optical device, with respect to the optical device, occurs.

In the display apparatus according to the third embodiment of the present disclosure, the liquid lens is operated, and the related liquid lens that configures the optical system may be configured by a known liquid lens that utilizes an electrowetting phenomenon. Through the operation of the liquid lens, while maintaining the relationship between the optical axis of the optical system and the Y axis to be constant, the optical axis of the optical system can be moved in the horizontal direction (the X-axis direction), or the angle of the optical axis of the optical system with respect to the YZ plane can be changed. Even in such a form, a change in the YZ plane incidence angle of the parallel light, which is output from the optical system and is incident to the optical device, with respect to the optical device, occurs.

In the display apparatus according to the fourth embodiment of the present disclosure, the liquid prism is operated, and the related liquid prism that configures a part of the optical system may be configured by a known liquid prism that utilizes an electrowetting phenomenon. Through the operation of the liquid prism, the optical axis of the optical system with respect to the YZ plane can be changed. Even in such a form, a change in the YZ plane incidence angle of the parallel light, which is output from the optical system and is incident to the optical device, with respect to the optical device, occurs.

In the display apparatus according to the embodiment of the present disclosure, a frame may be configured by a front portion that is arranged to the front side of the observer and two temple portions that are attached to both ends of the front portion through hinges so as to be freely rotatable. In addition, to the tip end portion of each temple portion, an ear band portion is attached. The image displaying device is attached to the frame, and more particularly, for example, the image forming device may be attached to the temple portion.

Furthermore, the display apparatus according to the embodiment of the present disclosure may employ a configuration in which a nose pad is attached. In other words, when the entire display apparatus according to the embodiment of the present disclosure is seen, an assembly of the frame and the nose pad has a structure that is approximately the same as that of ordinary glasses. In addition, a rim portion may be or may not be included. The material composing the frame may be a metal, alloy, or plastic, or a combination thereof and may be the same material as that which composes ordinary glasses. The configuration and the structure of the nose pad may be those that are known.

In addition, a form may be employed in which the imaging device is attached to the center portion of the front portion. To be more specific, the imaging device is configured by a solid-state imaging device that is, for example, formed by a CCD or a CMOS sensor and a lens. A wiring extending from the imaging device may be connected to one image displaying device (or the image forming device), for example, through a front portion and, furthermore, may be included in a wiring extending from the image displaying device (or the image forming device).

In the display apparatus according to the embodiment of the present disclosure, from the viewpoint of design or ease of wearing, it is preferable to employ a form in which wirings (signal lines, power lines, or the like) extending from two image forming devices extend from the tip end portion of the ear bend portion toward the outside so as to be connected to the control device (a control unit or a control circuit) through the inside of the temple portion and the ear bend portion. Furthermore, a form may be employed in which each image forming device includes a headphone portion, and a wiring for the headphone portion from each image forming device extends from the tip end portion of the ear bend portion to the headphone portion through the inside of the temple portion and the ear bend portion. As examples of the headphone portion, there are a headphone portion of an inner-ear type and a headphone portion of a canal type. To be more specific, a form is preferable in which the wiring for the headphone portion from the tip end portion of the ear bend portion wraps around the rear side of the auricle (auditory capsule) and extends to the headphone portion.

The display apparatus according to the embodiment of the present disclosure, for example, can be used for: displaying a subtitle of a movie or the like; displaying a description or closed caption relating to a video and that is synchronized to the video; displaying various descriptions of an observation target in a play or a Kabuki, a Noh play, a Koygen play, an opera, a music concert, a ballet, various plays, an amusement park, an art museum, a tourist site, a resort, a tour guide, or the like or displaying an explanatory statement used for explaining about the content, the state of progress, the background, or the like. In addition, the display apparatus also serves as a text displaying device and can be used for: displaying various descriptions, a symbol, a code, a stamp, a mark, a design, or the like at the time of the driving, the operating, the maintaining, or the disassembling of an observation target such as various devices; displaying various descriptions, a symbol, a code, a stamp, a mark, a design, or the like of an observation target such as a person or an object; and displaying a closed caption. In a play, a Kabuki, a Noh play, a Koygen play, an opera, a music concert, a ballet, various plays, an amusement park, an art museum, a tourist site, a resort, tour guide, or the like, a text as an image relating to the observation target may be displayed on the display apparatus at an appropriate timing. To be more specific, for example, in accordance with the state of progress of a movie or the like, or in accordance with the state of progress of a play or the like, an image signal is transmitted to the display apparatus or a designated identification code is transmitted to the control device by the operation of an operator or under the control of a computer or the like based on a predetermined schedule or a time allocation. In addition, in a case where various descriptions relating to an observation target such as various devices, persons, or goods are displayed, the displaying of various descriptions relating to the observation target such as various devices, persons, or goods that are prepared in advance can be performed by the display apparatus by arranging an imaging device in the display apparatus, photographing the observation target such as various devices, persons, or goods by using the imaging device, and analyzing the photographed content by using the display apparatus. Alternatively, the display apparatus according to the embodiment of the present disclosure may also be used as a stereovision display apparatus.

The image signal input to the image forming device, as described above, includes not only an image signal (for example, text data) but also, for example, luminance data (luminance information), chromaticity data (chromaticity information), or the luminance data and the chromaticity data of an image to be displayed. The luminance data may be set as luminance data corresponding to the luminance of a predetermined area including an observation target viewed through the optical device, and the chromaticity data may be set as chromaticity data corresponding to the chromaticity of the predetermined area including the observation target viewed though the optical device. As above, by including the luminance data of an image, the luminance (brightness) of a displayed image can be controlled, by including the chromaticity data of an image, the chromaticity (color) of a displayed image can be controlled, and by including the luminance data and the chromaticity data of an image, the luminance (brightness) and the chromaticity (color) of a displayed image can be controlled. In a case where the luminance data corresponding to the luminance of a predetermined area including an observation target viewed through the image displaying device is used, the value of the luminance data may be set such that, the higher the value of the luminance of the predetermined area including the observation target viewed through the image displaying device, the higher the value of the luminance of an image (in other words, the brighter an image is displayed). In addition, in a case where the chromaticity data corresponding to the chromaticity of the predetermined area including the observation target viewed through the image displaying device is used, the value of the chromaticity data may be set such that the chromaticity of the predetermined area including the observation target viewed through the image displaying device and the chromaticity of the image to be displayed have the relationship of complementary colors as a whole. Here, the relationship of complementary colors represents a combination of colors having the relationship in which the colors are oppositely positioned in a color circle. Green for red, violet for yellow, orange for blue, and the like are complementary colors. A complementary color may also refer to a color that causes a decrease in the saturation such as white for the case of light and black for the case of an object by mixing a color with a different color at an appropriate ratio. However, the complementarity of a visual effect in the case of colors being parallel and the complementarity in the case of mixing colors are different from each other. The complementary color is also referred to as an antagonistic color, a contrastive color or an opposite color. However, while the opposite color directly indicates a complimentary color that is opposite to the color, the complementary color indicates a range that is slightly broader than that of the opposite color. A combination of complementary colors has a synergetic effect for allowing the colors to be visually distinctive, and this is called harmony of complementary colors.

Embodiment 1

Figure 5:
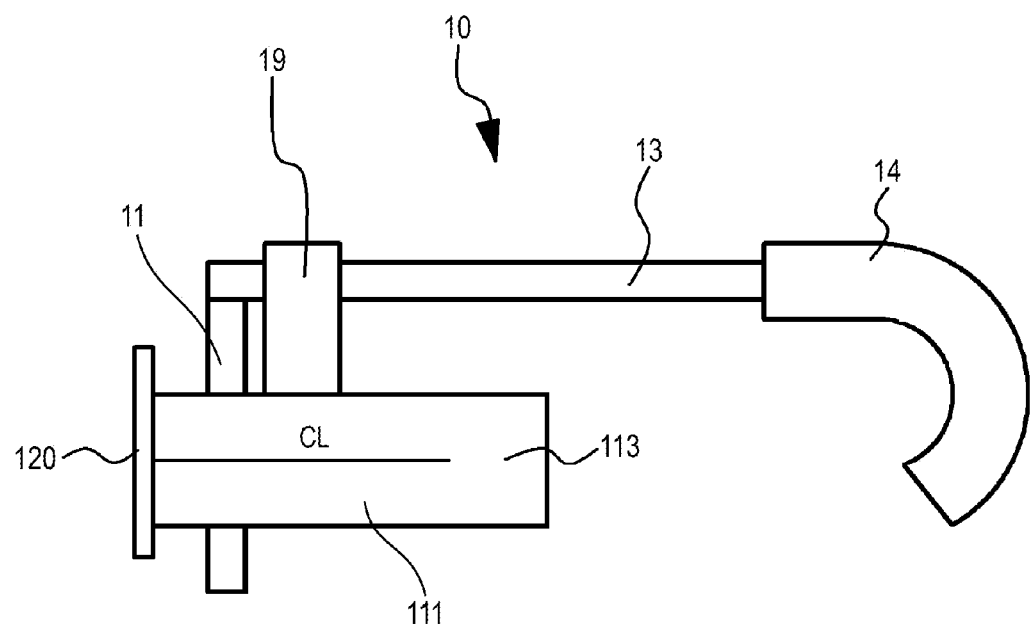
FIG. 5 is a schematic diagram of a display apparatus according to Embodiment 1, viewed from the side.
Figure 6:
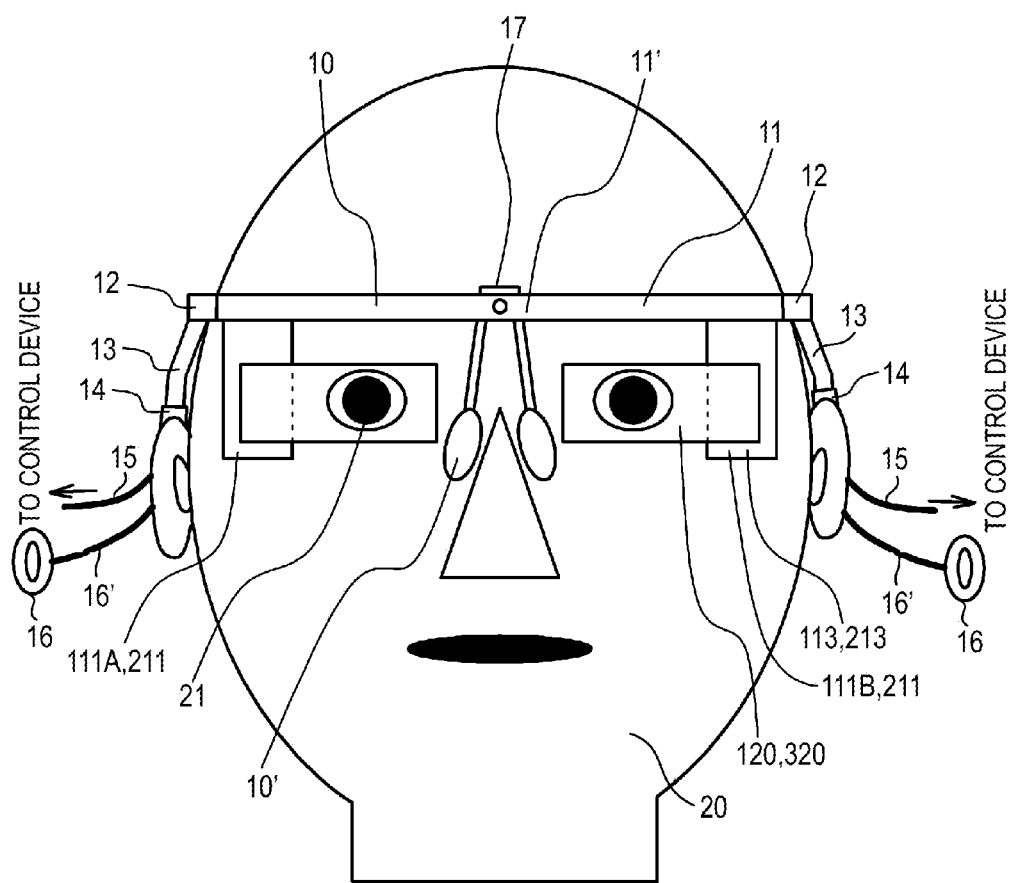
FIG. 6 is a schematic diagram of a display apparatus according to Embodiment 1, viewed from the front side.
Figure 7:
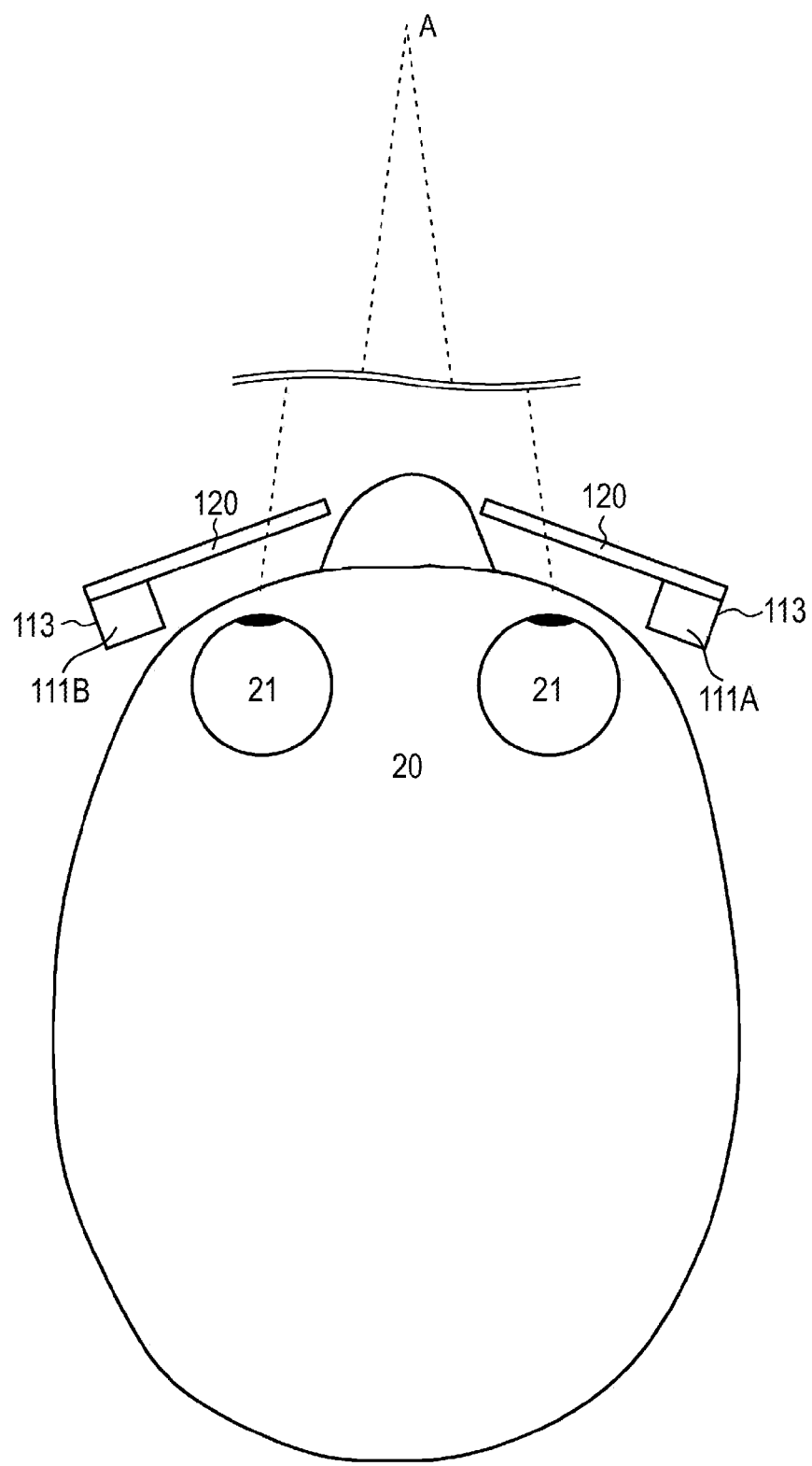
FIG. 7 is a diagram illustrating a state viewed from the upper side in which a display apparatus according to Embodiment 1 is mounted in a head of an observer (here, only the image displaying device is shown, but a frame is not shown).
Figure 8:
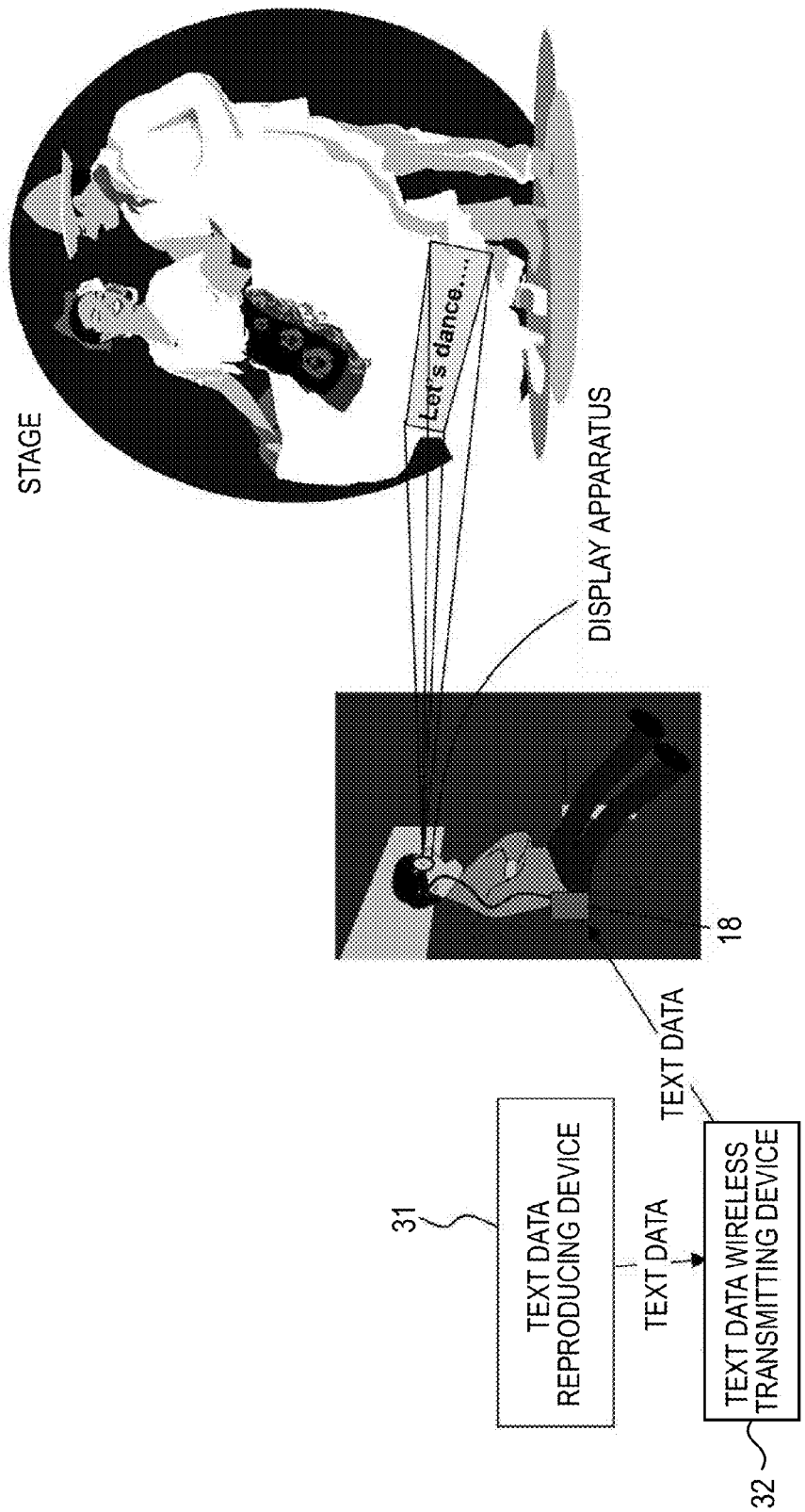
FIG. 8 is a conceptual diagram illustrating a state in which a display apparatus according to Embodiment 1 is used.
Figure 9:
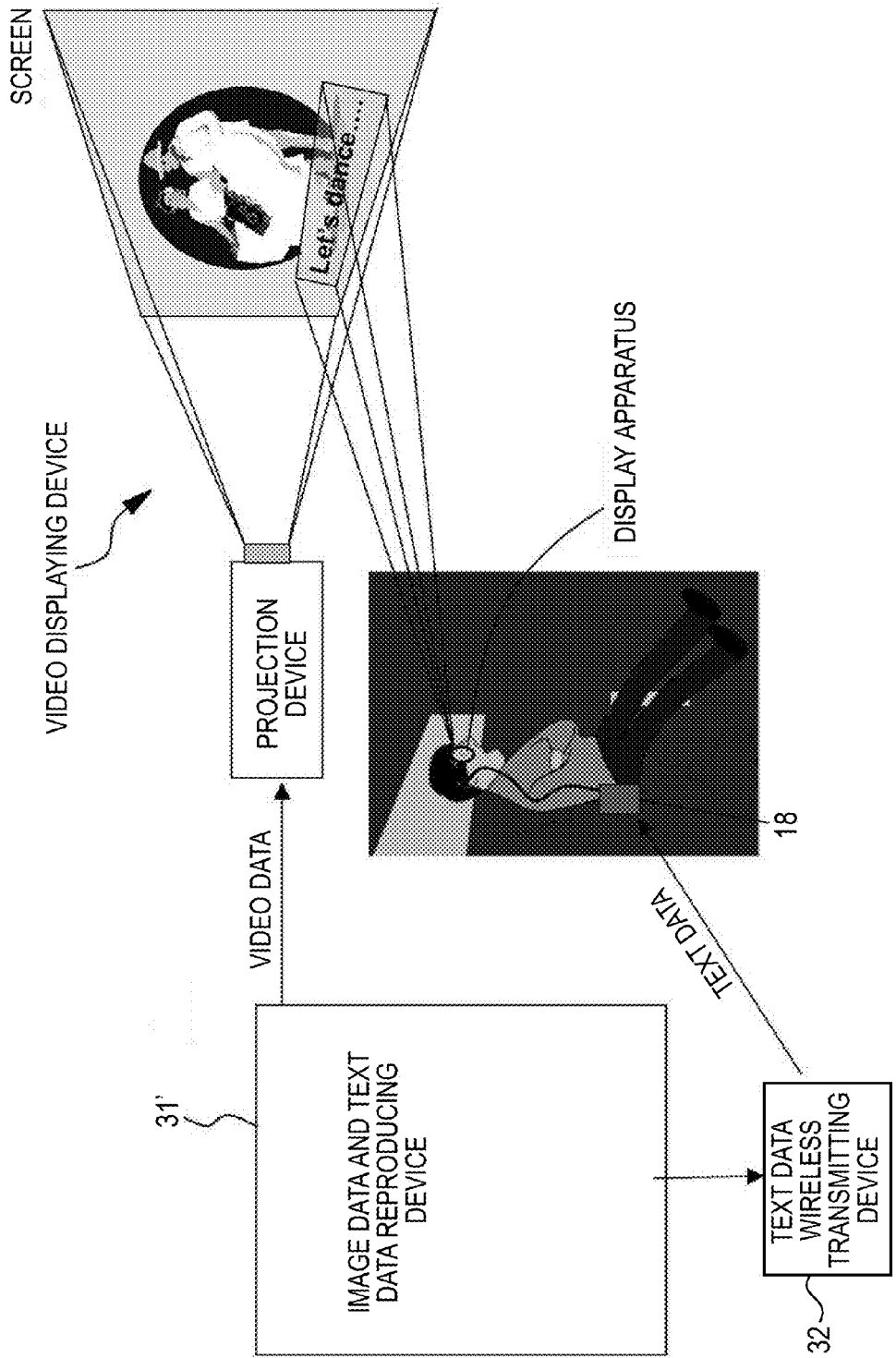
FIG. 9 is a conceptual diagram illustrating a state in which a display apparatus according to Embodiment 1 us used.
Figure 10:
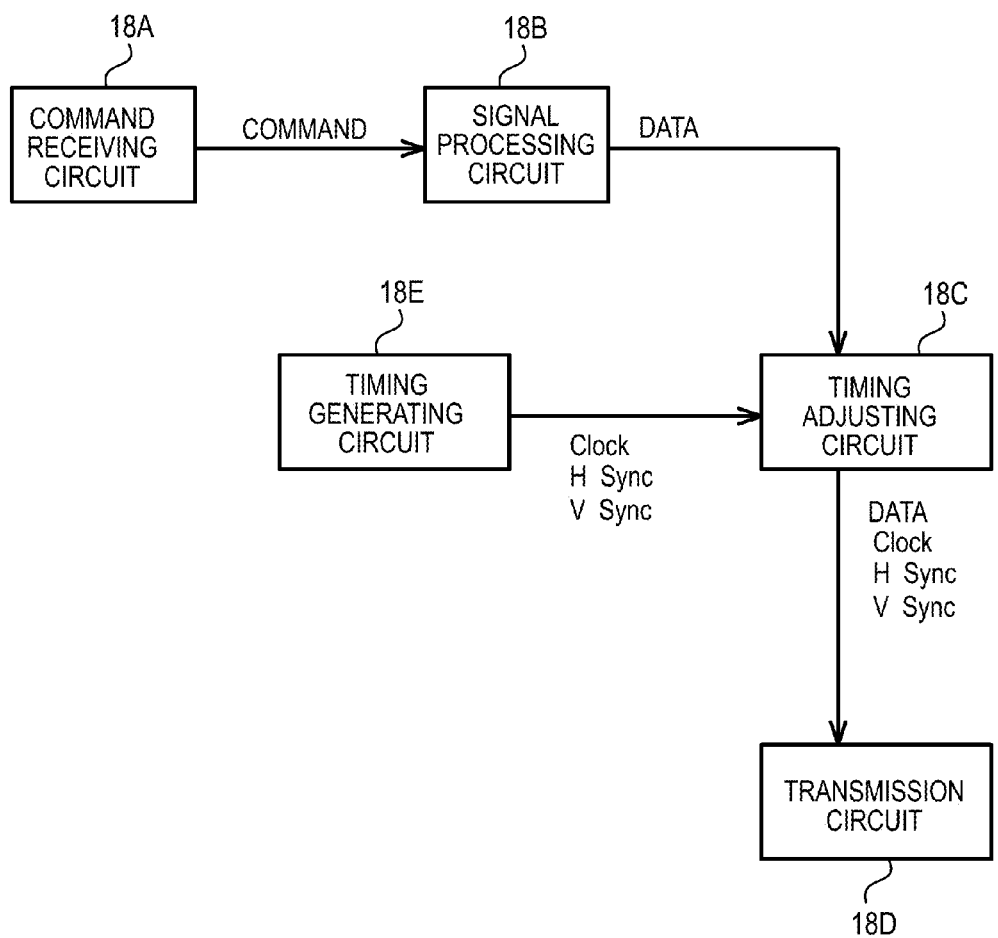
FIG. 10 is a conceptual diagram of a control device that configures a display apparatus according to Embodiment 1.
Figure 11A:
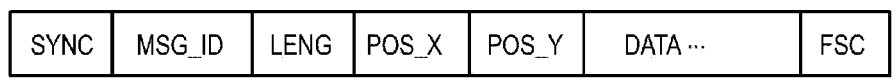
FIG. 11A is a diagram illustrating an example of an image signal according to Embodiment 1.

Embodiment 1 relates to a display apparatus according to the first embodiment of the present disclosure, and more particularly, to a display apparatus that displays a subtitle (subtitle displaying apparatus). FIGS. 1A, 1B, and 2 are conceptual diagrams of a display apparatus according to Embodiment 1 and an image displaying device of the display apparatus. The display apparatus according to Embodiment 1 is configured by a head-mounted display (HMD). FIG. 1A schematically represents a state before the movement of the optical axis of the image forming device and the optical axis of the optical system in the horizontal direction (the X-axis direction), and FIG. 1B schematically represents a state after the movement. In addition, FIG. 3 schematically represents the propagation of light in a light guiding plate that configures the image displaying device of the display apparatus according to Embodiment 1, FIG. 4 is a schematic diagram of the display apparatus viewed from the upper side, and FIG. 5 is a schematic diagram thereof viewed from the side. Furthermore, FIG. 6 is a schematic diagram of the display apparatus according to Embodiment 1 viewed from the front side, FIG. 7 is a diagram illustrating a state, in which the display apparatus according to Embodiment 1 is mounted to the head of an observer, viewed from the upper side (here, only the image displaying device is shown, but the frame is not shown), and FIGS. 8 and 9 are conceptual diagrams of the states in which the display apparatus according to Embodiment 1 is used. FIG. 10 is a conceptual diagram of a control device that configures the display apparatus according to Embodiment 1, and FIG. 11A illustrates an example of an image signal in Embodiment 1.

The display apparatus according to Embodiment 1 or any one of Embodiments 2 to 16 to be described later includes: a glass-type frame 10 mounted to the head of an observer (audience member) 20; and two image displaying devices 100, 200, 300, 400, and 500 for the left and right eyes that are mounted to the frame 10. In other words, the display apparatus is a binocular type including two image displaying devices. Each of the image displaying devices 100, 200, 300, 400, and 500 includes:

(A) an image forming device 111 or 211;

(B) an optical system (parallel light output optical system) 112 or 254 that forms the light output from the image forming device 111 or 211 to be parallel light; and (C) an optical device (light guiding unit) 120, 320, or 520 to which light output from the optical system (parallel light output optical system) 112 or 254 is incident and is guided so as to be output. The image displaying devices 100, 200, 300, 400, and 500 may be fixedly attached to the frame or may be detachably attached to the frame. Here, the optical systems 112 and 254 are arranged between the image forming devices 111 and 211 and the optical devices 120, 320, and 520. The light beams formed as the parallel light by the optical system 112 or 254 is incident to the optical device 120, 320, or 520 and is guided so as to be output. The image forming device 111 or 211 displays a single color (for example, green) image. In addition, the optical devices 120, 320, and 520 are a semi-transmissive type (see-through type). To be more specific, at least a part (more specifically, light guiding plates 121 and 321 and second deflection units 140 and 340 to be described later) of the optical device facing both eyes of an observer 20 is semi-transmissive (see-through).

In addition, in Embodiment 1 or in anyone of Embodiments 2 to 16 to be described later, a point at which center incident light beams vertically incident to the optical device 120 or 320 are incident to the optical device 120, 320, or 520, out of light beams (center light beams CL) that are output from the center of the image forming device 111 or 211 and passes through the nodal point of the optical system 112 or 254 that is located on the image forming device side, is set as an optical device center point O, an axial line that passes through the optical device center point O and is parallel to the direction of the axial line of the optical device 120, 320, or 520 is set as the X axis, and an axial line that passes through the optical device center line O and coincides with the normal line of the optical device 120, 320, or 520 is set as the Y axis. In addition, the center point of the first deflection unit 130 or 330 described next is the optical device center point O.

The optical device 120 or 320 according to Embodiment 1 or any one of Embodiments 2 to 11 to be described later includes:

(a) a light guiding plate 121 or 321 in which light incident thereto propagates to the inside through total reflection and then from which the light is output;

(b) a first deflection unit 130 or 330 that deflects the light incident to the light guiding plate 121 or 321 such that the light incident to the light guiding plate 121 or 321 is totally reflected inside the light guiding plate 121 or 321; and (c) a second deflection unit 140 or 340 that deflects the light propagating through the inside of the light guiding plate 121 or 321 through total reflection over a plurality of times for outputting the light propagating through the inside of the light guiding plate 121 or 321 through total reflection from the light guiding plate 121 or 321.

Here, in Embodiment 1, the first deflection unit 130 and the second deflection unit 140 are arranged inside the light guiding plate 121. The first defection unit 130 reflects the light incident to the light guiding plate 121, and the second deflection unit 140 transmits and reflects the light propagating through the inside of the light guiding plate 121 through total reflection a plurality of times. In other words, the first deflection unit 130 serves as a reflecting mirror, and the second deflection unit 140 serves as a semi-transmissive mirror. To be more specific, the first deflection unit 130 disposed inside the light guiding plate 121 is formed from aluminum (Al) and is configured by a light reflecting film (one type of mirror) that reflects the light incident to the light guiding plate 121. On the other hand, the second deflection unit 140 disposed inside the light guiding plate 121 is configured by a multi-layer laminated structure body in which a plurality of dielectric lamination films are laminated. The dielectric lamination film, for example, is configured by a $TiO_2$ film as a high dielectric-constant material and a $SiO_2$ film as a low dielectric-constant material. A multi-layer structure body in which a plurality of dielectric lamination films are laminated is disclosed in JP-T-2005-521099. In the figure, although dielectric lamination films of six layers are shown, the dielectric lamination film is not limited thereto. A thin piece that is formed from the same material as that composing the light guiding plate 121 is interposed between the dielectric lamination film and the dielectric lamination film. In the first deflection unit 130, the parallel light incident to the light guiding plate 121 is reflected (or diffracted) such that the parallel light incident to the light guiding plate 121 is totally reflected inside the light guiding plate 121. On the other hand, in the second deflection unit 140, the parallel light propagating through the inside of the light guiding plate 121 through total reflection is reflected (or diffracted) over a plurality of times and is output from the light guiding plate 121 toward the pupil of the eye 21 of the observer 20 in the parallel light state.

Regarding the first deflection unit 130, it may be configured such that an inclination face on which the first deflection unit 130 is to be formed is arranged in the light guiding plate 121 by cutting out a portion 124 of the light guiding plate 121 at which the first deflection unit 130 is arranged, a light reflecting film is vacuum deposited on the inclination face, and then the portion 124 cut by the light guiding plate 121 is bonded to the first deflection unit 130. In addition, regarding the second deflection unit 140, it may be configured such that a multi-layer laminated structure body in which a plurality of dielectric lamination films (for example, it may be deposited by using a vacuum deposition method) are laminated is manufactured by using the same material (for example, glass) as that composing the light guiding plate 121, an inclination face is formed by cutting out a portion 125 of the light guiding plate 121 at which the second deflection unit 140 is arranged, a multi-layer laminated structure body is bonded to the inclination face, and the outer shape is trimmed by performing grinding or the like. Accordingly, an optical device 120 in which the first deflection unit 130 and the second deflection unit 140 are disposed inside the light guiding plate 121 can be acquired.

Here, in Embodiment 1 or any one of Embodiments 2 to 11 to be described later, the light guiding plate 121 or 321 that is formed from an optical glass material or a plastic material has two parallel faces (a first face 122 or 322 and a second face 123 or 323) that extend in parallel with the light propagating direction (the X axis) according to the internal total reflection of the light guiding plate 121 or 321. The first face 122 or 322 and the second face 123 or 323 face each other. Thus, parallel light is incident from the first face 122 or 322 corresponding to a light incidence face, the incident parallel light propagates the inside through total reflection and then is output from the first face 122 or 322 corresponding to a light output face. However, embodiments of the present disclosure are not limited thereto, and thus, it may be configured such that the light incidence face is configured by the second face 123 or 323, and the light output face is configured by the first face 122 or 322.

In Embodiment 1 or any one of Embodiments 2 to 4 and 8 to be described later, the image forming device 111 is the image forming device according to the first configuration and has a plurality of pixels arranged in a two-dimensional matrix pattern. To be more specific, the image forming device 111 is configured by a reflective-type spatial light modulation device 150 and a light source 153 that is formed by a light emitting diode emitting white light. Each entire image forming device 111 is fitted to the inside of a casing 113 (denoted by dashed-dotted lines in FIG. 2 or 21), and an opening portion (not shown in the figure) is arranged in the casing 113, and light is output from the optical system (the parallel light output optical system or the collimator optical system) 112 through the opening portion. The reflective-type spatial light modulation device 150 is configured by a liquid crystal display device (LCD) 151 that is formed by an LCOS as a light valve and a polarizing beam splitter 152 that reflects a part of the light emitted from a light source 153 so as to be guided to the liquid crystal display device 151 and allows a part of the light reflected by the liquid crystal display device 151 to pass therethrough and be guided to the optical system 112. The liquid crystal display device 151 includes a plurality (for example, 640×480) of pixels (liquid crystal cells) arranged in a two-dimensional matrix pattern. The polarizing beam splitter 152 has a configuration and a structure that are known. The light, which has no polarization, emitted from the light source 153 collides with the polarizing beam splitter 152. The polarizing beam splitter 152 allows a P-polarized component to pass therethrough so as to be output to the outside of the system. On the other hand, an S-polarized component is reflected by the polarizing beam splitter 152 so as to be incident to the liquid crystal display device 151 and is reflected inside the liquid crystal display device 151 so as to be out from the liquid crystal display device 151. Here, while a large amount of the P-polarized component is included in light emitted from a pixel used for displaying "white" out of the light output from the liquid crystal display device 151, a large amount of the S-polarized component is included in light emitted from a pixel used for displaying "black" out of above-described light. Accordingly, the P-polarized component of the light that is output from the liquid crystal display device 151 and collides with the polarizing beam splitter 152 passes through the polarizing beam splitter 152 and is guided to the optical system 112. On the other hand, the S-polarized component is reflected by the polarizing beam splitter 152 and is returned to the light source 153. The optical system 112, for example, is configured by a convex lens and generates parallel light. Accordingly, the image forming device 111 (to be more specific, the liquid crystal display device 151) is arranged at a place (position) that is at a focal distance of the optical system 112.

The frame 10 is formed by: a front portion 11 that is arranged on the front side of an observer 20; two temple portions 13 that are attached to both ends of the front portion 11 through hinges 12 so as to be freely rotatable; and ear band portions (also referred to as temple tips or ear pads) 14 that are attached to the tip end portion of each temple portion 13. In addition, nose pads 10' are attached thereto. In other words, the assembly of the frame 10 and the nose pads 10' has a structure that is approximately the same as ordinary glasses. Furthermore, each casing 113 is attached to the temple portion 13 by using an attachment member 19. The frame 10 is manufactured by using metal or plastic. Here, each casing 113 may be detachably attached to the temple portion 13 by using the attachment member 19. Furthermore, in a case where the observer owns and wears glasses, each casing 113 may be detachably attached to the temple portion of the frame of the glasses owned by the observer by using the attachment member 19.

In addition, wirings (signal lines, power lines, and the like) 15 extending from the image forming devices 111A and 111B extend from the tip end portion of the ear band portion 14 toward the outside through the inside of the temple portion 13 and the ear band portion 14 so as to be connected to the control device (the control circuit or the control unit) 18. Furthermore, each of the image forming devices 111A and 111B has a headphone portion 16, and a wiring 16' for the headphone portion that extends from each of the image forming devices 111A and 111B extends from the tip end portion of the ear band portion 14 to the headphone portion 16 through the inside of the temple portion 13 and the ear band portion 14. To be more specific, the wiring 16' for the headphone portion extends from the tip end portion of the ear band portion 14 so as to wrap around the rear side of the auricle (auditory capsule) and extends to the headphone portion 16. By employing such a configuration, a simple display apparatus can be formed without giving an impression that the headphone portion 16 and the wiring 16' for the headphone portion are arranged in a disorderly manner.

In addition, an imaging device 17 that is configured by a solid-state imaging device formed by a CCD sensor or a CMOS sensor and a lens (these are not shown in the figure) is attached, as necessary, to a center portion 11' of the front portion 11 by using an appropriate attachment member (not shown in the figure). A signal output from the imaging device 17 is transmitted to the image forming device 111A through a wiring (not shown in the figure) extending from the imaging device 17.

As described above, the wirings (the signal lines, the power lines, and the like) 15 are connected to the control device (control circuit) 18. An image signal (for example, text data) is transmitted to the control device 18 in a wireless manner. Then, the control device 18 performs a process used for displaying an image (for example, displaying a subtitle) for the image signal (text data). The control device 18 can be configured by using a known circuit.

As represented in FIG. 10, the control device 18 is configured by: a command receiving circuit 18A that receives an image signal (including a command) transmitted through a text data wireless transmitting device 32 to be described later in a wireless manner; a signal processing circuit 18B that receives the image signal transmitted from the command receiving circuit 18A and performs various analyses and processes; a timing adjusting circuit 18C that receives various types of data transmitted from the signal processing circuit 18B and transmits various signals; and a transmission circuit 18D that receives various signals transmitted from the timing adjusting circuit 18C, adjusts the timing so as to reproduce the image from a display position, and transmits an image signal to each of the image forming devices 111A and 111B through the wiring 15. The control device 18 further includes a timing generating circuit 18E that generates a timing signal used for displaying the received image signal, and the adjustment of timings is performed by the timing adjusting circuit 18C based on various timing clocks and timing signals transmitted from the timing generating circuit 18E.

As illustrated in FIG. 11A, the image signal, for example, is configured by "SYNC" that is a command starting flag, "MSG_ID" that is a specific ID for each command type, data "LENG" that represents the length of the entire command, data "POS_X" that represents a display starting position of an image in the horizontal direction, data "POS_Y" that represents a start position of an image in the vertical direction, data "DATA" of an image to be displayed, and a command error check "FCS".

In the display apparatus (subtitle displaying device) according to Embodiment 1 or a display apparatus according to any one of Embodiments 2 to 16 to be described later, the movement device 40 is operated, the rotary movement device 43 is operated, the liquid lens 44 is operated, and the liquid prism 45 is operated depending on the observation position of the observer, and such operations are controlled in accordance with a control signal transmitted from the control device 18 based on the observation position information (or the amount of image shift to the left or right side) of the observer. Here, as examples of the observation position information of an observer, there are the position of a seat on which the observer (audience member) sits in a movie theater, a theater, or the like and theater information.

In the display apparatus 100, 200, 300, 400, or 500 according to Embodiment 1 or any one of Embodiments 5 to 16, the optical axis of the image forming device 111 (111A and 111B) or 211 and the optical axis of the optical system 112 or 254 are relatively moved in the horizontal direction (the X-axis direction) by the movement device 40. To be more specific, as illustrated in FIGS. 1A, 1B and 3 as conceptual diagrams, the positions of the optical axis of the image forming device 111 or 211 of each of two image displaying devices 100, 200, 300, 400, and 500 and the optical axis of the optical system 112 or 254 thereof may be relatively moved in the horizontal direction (the X-axis direction). In other words, any one (for example, the optical system 112 or 254) of the image forming device 111 or 211 and the optical system 112 or 254 is placed in a movement guiding unit 42 that is configured by a rack gear unit, and any one (for example, the optical system 112 or 254) of the image forming device 111 or 211 and the optical system 112 or 254 is moved on the movement guiding unit 42 by a motor and a pinion gear 41. Alternatively, it may be configured such that any one of the image forming device and the optical system is placed in the movement guiding unit, and any one of the image forming device and the optical system is moved on the movement guiding unit by a piezoelectric device or an ultrasonic motor. In such a configuration, a change in the YZ plane incidence angle of the parallel light that is output from the optical system 112 or 254 and is incident to the optical device 120, 320, or 520 with respect to the optical device 120, 320, and 520 occurs. In other words, a change in the angle of the optical axis of the optical system 112 or 254 with respect to the YZ plane occurs. In FIG. 3, a center light beam before the movement of the optical axis of the image forming device 111 or 211 and the optical axis of the optical system 112 or 254 in the horizontal direction (the X-axis direction) is denoted by solid lines, and a center light beam after the movement is denoted by dotted lines. Here, by moving the image forming device 111 or 211 and the optical system 112 or 254 from the state illustrated in FIG. 1A to the state illustrated in FIG. 1B, the value of the convergence angle increases, and the virtual image distance decreases. In other words, the virtual image approaches the observer (audience member). In other words, for example, the image forming device 111 or 211 or the optical system 112 or 254 are relatively moved in the horizontal direction (the X-axis direction) such that a point "A" shown in FIG. 7 is located at a desired position. In addition, in the movement of the image forming device 111 or 211, the entire image forming device 111 or 211 may be moved, or a part (for example, the liquid crystal display device 151, a scanning unit 253, or the like) of the constituent element of the image forming device 111 or 211 may be moved.

Here, for example, information (the observation position information of an observer) on the observation position of an observer may be given by a personal computer to the display apparatus in advance. Alternatively, it may be configured such that seat information or theater information printed on a ticket in the form of a barcode or seat information or theater information included in ticket information displayed in a cellular phone is read out by using an appropriate unit and an appropriate method, and the observation position information of an observer, which is based on the seat information or the theater information, is given to the display apparatus by using an appropriate unit. Then, the control device 18 operates the motor, the pinion gear 41, and the like based on the observation position information of the observer so as to relatively move the image forming device 111 or 211 and/or the optical system 112 or 254 in the horizontal direction (the X-axis direction), thereby adjusting the convergence angle. To be more specific, for example, the convergence angle may decrease as a distance from the display apparatus to the observation target increases. When the distance from the display apparatus to the observation target is infinite, the convergence angle is zero degrees.

As above, by moving two images acquired by two image displaying devices 100, 200, 300, 400, or 500 for the right eye and the left eye based on the observation position information (or, the amount of shift to the left or right side), a virtual image can be arranged at a desired position. In other words, by adjusting the distance (gap) of two images displayed in the optical devices 120, 320, or 520 configuring the image displaying devices 100, 200, 300, 400, or 500 in the horizontal direction or the YZ plane incidence angle, the convergence angle can be adjusted in correspondence with the distance from the display apparatus to the observation target.

Figure 11B:
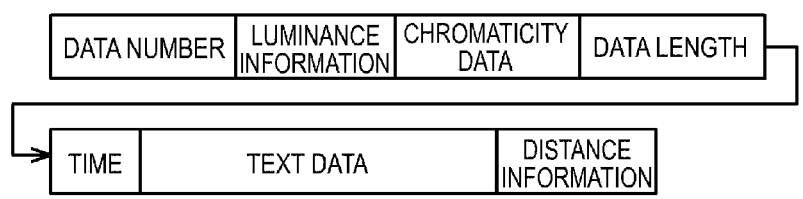
FIG. 11B is a conceptual diagram of the format of a signal acquired by adding an image signal input to an image forming device according to Embodiment 1 and observation position information on an observation position from an observer (display apparatus) to an observation target.
Figure 11C:
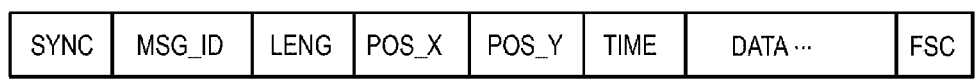
FIG. 11C is a diagram illustrating an example of an image signal according to Embodiment 6.
Figure 11D:
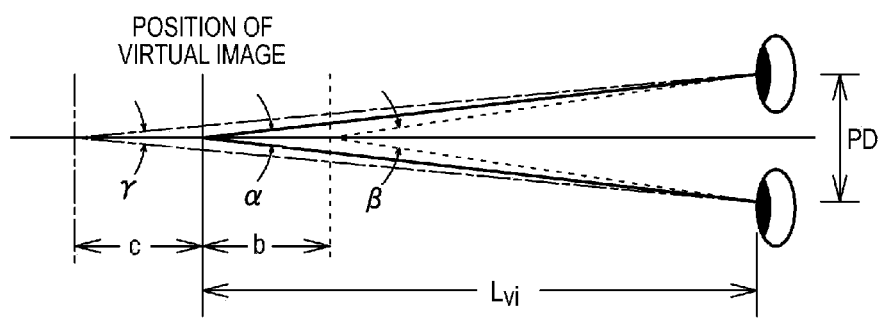
FIG. 11D is a schematic diagram illustrating adjusting of a convergence angle in accordance with a distance from a display apparatus to an observation target.

The adjusting of the convergence angle in correspondence with the distance from the display apparatus to the observation target will be described with reference to FIG. 11D. Here, a virtual image distance of an image (text) that is based on the image signal displayed by the image displaying device is denoted by "Lvi", and the convergence angle for the image at this time is denoted by "α". In addition, the convergence angle for the image in a case where the virtual image distance increases from the virtual image distance Lvi by "c" is denoted by "γ", and the convergence angle for the image in a case where the virtual image distance decreases from the virtual image distance Lvi by "b" is denoted by "β". Furthermore, a distance between the left and right pupils is denoted by "PD". Here, in a case where PD=61.5 mm, and Lvi=4000 mm, the convergence angle α=53 minutes (53').

One pixel of the image forming device is defined as 3 minutes (3'). Here, in a case where the image forming device 111 or 211 and the optical system 112 and 254 are shifted by one pixel in the horizontal direction (the X-axis direction) to the inner side, the convergence angle β=56 minutes (56'), and b=225 mm. On the other hand, in a case where the image forming device 111 or 211 and the optical system 112 and 254 are shifted by one pixel in the horizontal direction to the outer side, the convergence angle γ=50 minutes (50'), and c=228 mm. In addition, in a case where the virtual image distance Lvi=8000 mm, by shifting the image by one pixel, the virtual image distance can be shifted by about 1 m.

As above, by relatively moving the image forming device 111 or 211 and/or the optical system 112 or 254 in the horizontal direction (the X-axis direction), the convergence angle can be adjusted. As a result, the distance between the observation target and the observer (audience member) 20 and the virtual image distance of an image (subtitle) that is displayed by the image displaying device can be configured to be the same or can be configured to be as close to each other as possible, and the observer (audience member) 20 viewing the observation target can view the image that is naturally displayed by the image displaying device without particularly shifting or changing the focus.

In addition, when the virtual image distance is denoted by Lvi and the convergence angle (main light beam intersecting angle in the horizontal face) is θaoV, it is preferable that the following relationship is satisfied.

$Lvi \cdot \tan(\theta aoV/2) = PD/2$

Here, PD (unit: mm), for example, satisfies the relationship of 56≤PD≤74. However, in a case where the value of θaoV is zero, the value of Lvi is infinity. However, the virtual image distance Lvi and the convergence angle θaoV are not independently calculated in accordance with the movement speed of the observer, and by defining either one correspondence relationship, the other is automatically determined.

It may be configured such that a position measuring unit (distance measuring device) that measures the distance from the display apparatus to the observation target is further included, and the observation position information (distance information) is acquired by using the position measuring unit (distance measuring device). As the position measuring unit (distance measuring device), for example, the imaging device 17 may be configured as an imaging device provided with an automatic focus function (an imaging device having a passive-type distance measuring device). Alternatively, it may be configured such that a button or a switch is arranged in the control device 18, and the observation position information (distance information) is manually set based on the distance from the display apparatus to the observation target.

An image signal is transmitted to the control device 18 in a wireless manner (or in a wired manner depending on the situation). Then, the control device 18 performs a process for displaying an image for the image signal, and the image forming devices 111A and 111B generate images (subtitles) based on the data "DATA". These images finally reach both eyes of an observer (audience member) 20 by whom the display apparatus is worn through the optical system 112 or 254 and the optical device 120, 320, or 520.

Furthermore, in addition to the image signal input to the image forming device, by transmitting a luminance signal of an image to be displayed by the optical device to the display apparatus from the outside, the visibility of the displayed image can be improved. Alternatively, it may be configured such that a light receiving sensor is further included, and the luminance of the image to be displayed by the optical device is controlled based on the luminance information of the environment (the ambience in which the display apparatus or the observation target is placed) acquired by the light receiving sensor. To be more specific, as the light receiving sensor, a photodiode or a light receiving device, which is included in the imaging device 17, used for measuring the exposure may be used.

In a case where the display apparatus is used, for example, in a theater, although an explanatory statement used for explaining about the content, the state of progress, the background, or the like of a play or the like may be displayed as an image in the display apparatus, there are cases where it is necessary to set the virtual image distance to a desired distance. In other words, the distance between the observation target and the observer (audience member) and the virtual image distance of an image (for example, a text) displayed by the image displaying device changes in accordance with the position at which an observer of the play sits. Accordingly, although it is necessary to optimize the virtual image distance depending on the position of an observer of the play, in the display apparatus according to Embodiment 1, as described above, the convergence angle is optimized in correspondence with the distance from the display apparatus to the observation target. Accordingly, the virtual image distance is optimized depending on the position of the observer of the player. In addition, although there is a case where the virtual image distance is desired to be changed depending on the scene, by transmitting the observation position information (distance information) that is information on the observation position of the observer (display apparatus) with respect to the observation target to the display apparatus from the outside, such a case can be responded to in an easy manner.

Alternatively, an observer (an audience or a user) can set the virtual image distance to a desired distance or sets the virtual image position to a desired position. To be more specific, by arranging a switch or a button in the control device 18 and an observer operating the switch or the button, the virtual image can be arranged at a desired distance or position. For example, in a case where the background is changed, the virtual image distance or the virtual image position can be arbitrarily changed. Such an operation can be automatically performed, for example, based on the image signal, or the observer may appropriately perform the operation at the time of observing the observation target. To be more specific, such an operation is an operation of operating the movement device 40 or an operation of adding a display position correcting signal (convergence angle control signal) to be described later to the image signal by the control device 18. Accordingly, the observer can assuredly read, for example, an image (for example, a text such as a subtitle) without excessively moving the line of sight, and an image (for example, a subtitle or the like, and more particularly, for example, a subtitle that is based on a different language or the like) that is appropriate to an audience can be concurrently displayed in an easy manner.

The image signal is digitalized data and is generated in advance before the display thereof. The display position of the image may be a position that does not interrupt the viewing of the observation target. To be more specific, the display of the image, as described above, is performed by transmitting an image signal to the control device 18 by the text data wireless transmitting device 32 in a wireless manner, for example, based on a predetermined schedule, a time allocation, or the like or in accordance with the state of progress of an observation target, under the control of a computer (not shown in the figure) included in the text data reproducing device 31 or an image data and text data reproducing device 31'.

By including not only text data but also luminance data or chromaticity data of a text to be displayed as the image signal in the display apparatus according to Embodiment 1, it can be assuredly prevented that it becomes difficult to visually recognize the text of an image (for example, a subtitle or the like) depending on the background of the text. As an example of the luminance data, there is luminance data corresponding to the luminance of a predetermined area (for example, an area corresponding to a lower portion in one third of the entire stage) including the observation target (a character, the background, or the like) viewed through the image displaying device. In addition, as the chromaticity data, chromaticity data corresponding to the chromaticity of a predetermined area including the observation target viewed through the image displaying device can be used. Particularly, when the brightness of a screen, a stage, or the like viewed through a semi-transmissive-type (see-through-type) optical device and the brightness or the balance of colors of the text displayed in the optical device are not in a predetermined range, there is a case where it is difficult to observe a subtitle, the screen, the stage, or the like well. However, the brightness or the color of the text to be displayed can be adjusted to the screen, the stage, or the like, and accordingly, the text can be visually recognized well. In other words, it can be assuredly prevented that it becomes difficult to visually recognize a text used for explaining an observation target or the like viewed by an observer (audience member) depending on the background of the text. In the use of the display apparatus according to Embodiment 1, for example, a text (for example, an explanatory statement relating to the situation or the background of the play, an explanatory statement about characters, conversations between the characters, or the like) relating to the observation target may be displayed in the image displaying device 100, 200, 300, 400, or 500 at an appropriate timing in watching a play. To be more specific, for example, in accordance with the state of progress of a play, the text data may be transmitted to the image displaying device 100, 200, 300, 400, or 500 so as to display the text in the image displaying data 100, 200, 300, 400, or 500 by the operation of an operator, under the control of a computer or the like.

Furthermore, it is said that the eyes become tired when the position of the virtual image is fixed. The reason for this is that the movement of the eyeballs is small when the focus is fixed. Thus, by appropriately changing the virtual image distance or moving the position of the virtual image, the fatigue of the eyes can be reduced. In other words, the position of the virtual image formed by two optical devices or the distance (virtual image distance) of the virtual image formed by two optical devices from the two optical devices may be changed by time. To be more specific, it may be configured such that the position of the image in the horizontal direction is changed, for example, over one minute, for example, by +2 pixels of the image forming device, for example, once every five minutes, and then, the background is returned.

Embodiment 2

Figure 12A:
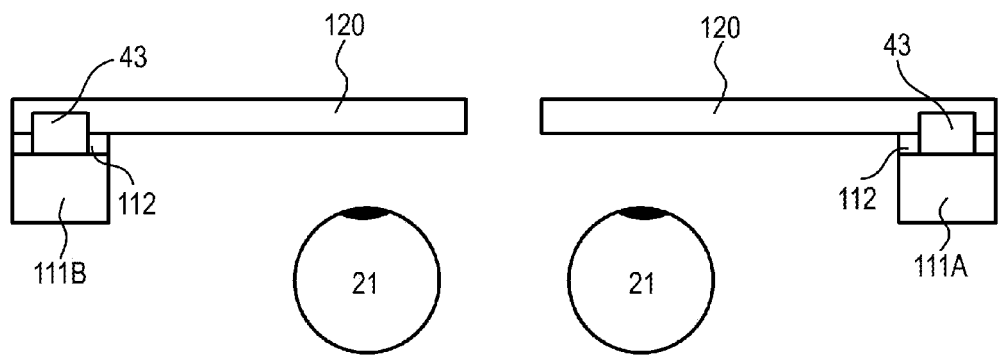
FIGS. 12A and 12B are conceptual diagrams illustrating a display device according to Embodiment 2.
Figure 12B:
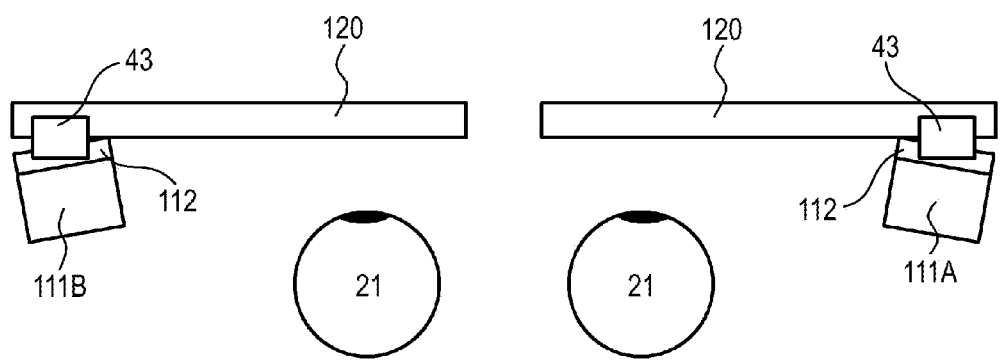

Embodiment 2 relates to a display apparatus according to the second embodiment of the present disclosure. FIGS. 12A and 12B are conceptual diagrams of the display apparatus according to Embodiment 2. In the display apparatus according to Embodiment 2, at least one image displaying device (in Embodiment 2, each of two image displaying devices for the left and right eyes) further includes a rotary movement device 43 that rotates the image forming device 111 or 211 and the optical systems 112 or 254. Thus, by rotating the image forming device 111 or 211 and the optical system 112 or 254 by using the rotary movement device 43 depending on the observation position of an observer, the incidence angle (YZ plane incidence angle) of parallel light that is output from the optical system 112 or 254 and is incident to the optical device 120 or 320 with respect to the optical device 120 or 320 is changed, in other words, the angle of the optical axis of the optical system 112 or 254 with respect to the YZ plane is changed, whereby the convergence angle (the main light beam intersecting angle in the horizontal face) is adjusted. Here, by moving the image forming device 111 or 211 and the optical system 112 or 254 from the state illustrated in FIG. 12A to the state illustrated in FIG. 12B, the value of the convergence angle increases, and the virtual image distance decreases. In other words, the virtual image approaches the observer (audience member).

Here, the image forming device 111 or 211 and the optical system 112 or 254 are rotated by the rotary movement device 43. To be more specific, while the positional relationship between the optical axis of the image forming device 111 or 211 and the optical axis of the optical system 112 or 254 of each of two image displaying devices is fixed, at least one image displaying device may be rotated by operating a piezoelectric device, a motor, or an ultrasonic motor with the Z axis arranged at an appropriate position used as a rotary axis. In such a form, a change in the YZ plane incidence angle of the parallel light that is output from the optical system 112 or 254 and is incident to the optical device 120 or 320 with respect to the optical device 120 or 320 occurs. In other words, a change in the angle of the optical axis of the optical system 112 or 254 with respect to the YZ plane occurs. The optical device 120 or 320 may be rotated together in some situations.

Embodiment 3

Embodiment 3 relates to a display apparatus according to the third embodiment of the present disclosure. In the display apparatus according to Embodiment 3, an optical system 112 or 254 that configures at least one image displaying device (in Embodiment 3, each of two image displaying devices for the left and right eyes) includes a liquid lens 44. Thus, by operating the liquid lens 44 depending on the observation position of an observer, the convergence angle (the main light beam intersecting angle in the horizontal face) is adjusted. The liquid lens 44 that configures the optical system 112 or 254 is configured by a known liquid lens 44 that utilizes an electrowetting phenomenon. By operating the liquid lens 44, the optical axis of the optical system 112 or 254 can be moved in the horizontal direction (the X-axis direction), or the angle of the optical axis of the optical system 112 or 254 with respect to the YZ plane can be changed, while the relationship between the optical axis of the optical system 112 or 254 and the Y axis is maintained to be constant. Accordingly, a change in the YZ plane incidence angle of the parallel light that is output from the optical system 112 or 254 and is incident to the optical device 120 or 320 with respect to the optical device 120 or 320 occurs. In other words, a change in the angle of the optical axis of the optical system 112 or 254 with respect to the YZ plane occurs.

Figure 13A:
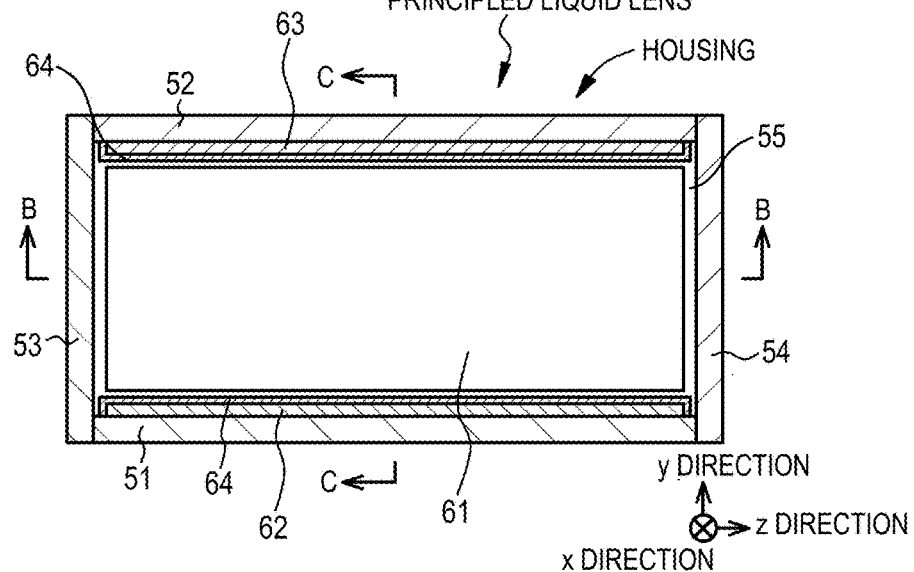
FIG. 13A is a schematic cross-sectional view of a principled liquid lens taken along line A-A shown in FIG. 13B.
Figure 13B:
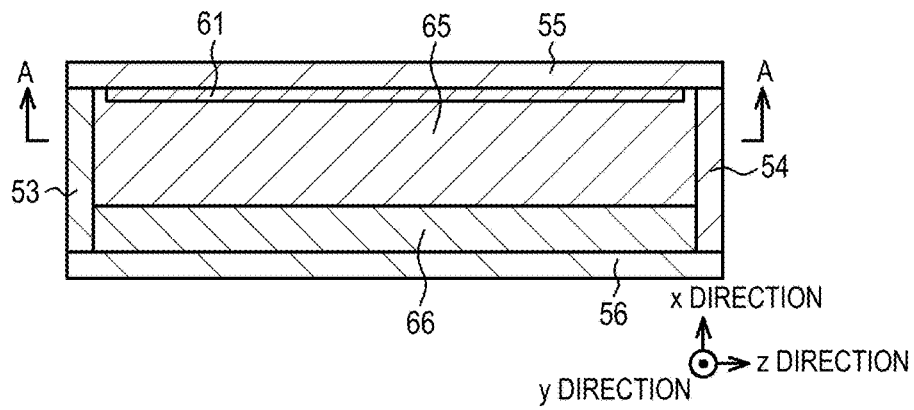
FIG. 13B is a schematic cross-sectional view of a principled liquid lens taken along line B-B shown in FIG. 13A.

The principle of the liquid lens 44 will be described with reference to FIGS. 13A to 13C and FIGS. 14A to 14C. FIG. 13A is a schematic cross-sectional view taken along line A-A shown in FIG. 13B, FIG. 13B is a schematic cross-sectional view (here, a first liquid is not shown in the figure) taken along line B-B shown in FIG. 13A, and FIG. 13C and FIGS. 14A to 14C are schematic cross-sectional views taken along line C-C shown in FIG. 13A. Here, the shape of the liquid lens at the time of being cut along the xy plane is a schematic shape, which is different from the actual shape.

The liquid lens (referred to as a "principled liquid lens" for convenience of the description) representing the principle diagrams illustrated in FIGS. 13A to 13C and FIGS. 14A to 14C includes a housing. This housing is formed by: a first side member 51; a second side member 52 that faces the first side member 51; a third side member 53 that joins one end portion of the first side member 51 and one end portion of the second side member 52; a fourth side member 54 that joins the other end portion of the first side member 51 and the other end portion of the second side member 52; a top panel 55 that is mounted on the top faces of the first side member 51, the second side member 52, the third side member 53, and the fourth side member 54; and a bottom panel 56 that is mounted on the bottom faces of the first side member 51, the second side member 52, the third side member 53, and the fourth side member 54. One lens chamber is configured by this housing. The lens chamber is occupied by a first liquid 65 and a second liquid 66 that compose the liquid lens as a cylinder lens of which the axial line extends in the direction in which the first side member 51 and the second side member 52 extend (the z direction).

In addition, a first electrode 61 is mounted on the inner face of the top panel 55, a second electrode 62 is mounted on the inner face of the first side member 51, and a third electrode 63 is mounted on the inner face of the second side member 52. Here, in the state illustrated in FIGS. 13A to 13C, no voltage is applied to the first electrode 61, the second electrode 62, and the third electrode 63.

Figure 14A:
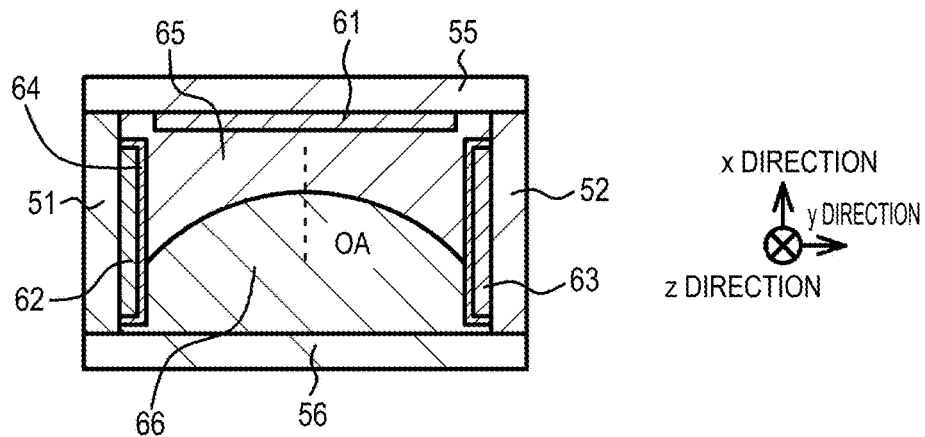
FIGS. 14A to 14C are schematic cross-sectional views of a principled liquid lens taken along line C-C shown in FIG. 13A and are diagrams schematically illustrating the behavior or the liquid lens.
Figure 14B:
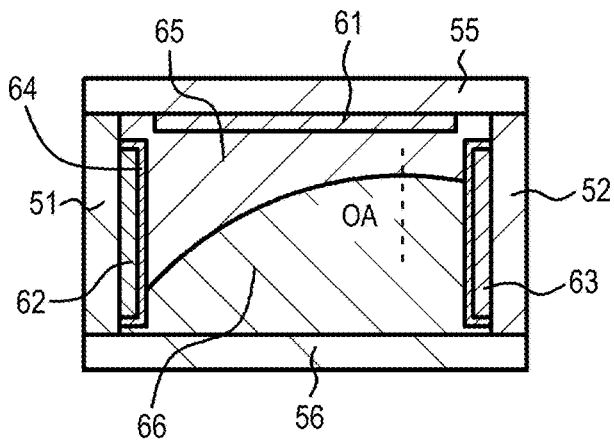
Figure 14C:
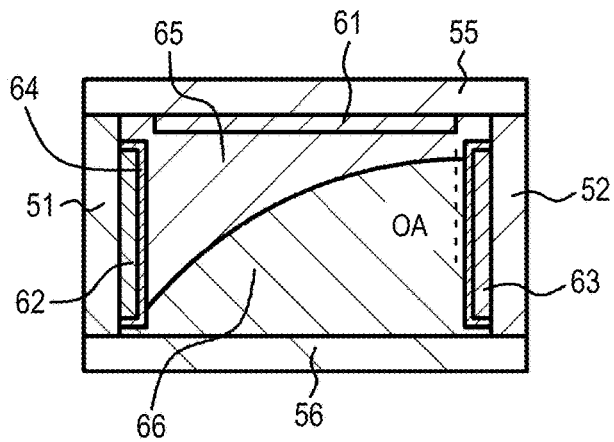

When appropriate voltages are applied to the first electrode 61, the second electrode 62, and the third electrode 63 from this state, the state of the interface between the first liquid 65 and the second liquid 66 changes to the state illustrated in FIG. 14A, 14B, or 14C. Here, the state illustrated in FIG. 14A illustrates a state when the same voltage is applied to the second electrode 62 and the third electrode 63, and the shape of the liquid lens at the time of being cut along the xy plane, which is formed inside the lens chamber, is symmetrical with respect to the optical axis OA. In addition, the state illustrated in FIGS. 14B and 14C illustrates a state when different voltages are applied to the second electrode 62 and the third electrode 63, and the shape of the liquid lens at the time of being cut along the xy plane, which is formed inside the lens chamber, is asymmetric with respect to the optical axis OA. Here, an electric potential difference between the second electrode 62 and the third electrode 63 illustrated in FIG. 14C is greater than the state illustrated in FIG. 14B. As illustrated in FIGS. 14B and 14C, in accordance with the electric potential difference between the second electrode 62 and the third electrode 63, the optical power of the liquid lens can be changed, and the optical axis OA (denoted by a dotted line) of the liquid lens can be moved in the y direction that is orthogonal to the z direction. Alternatively, by arranging a plurality of liquid lenses each illustrated in the principle diagram and appropriately controlling the voltages applied to the second electrode 62 and the third electrode 63 of each of the liquid lenses, the optical axes of the liquid lenses as a whole can be moved, and the inclination of the optical axes of the liquid lenses as a whole can be changed, whereby a Fresnel lens can be configured in the liquid lenses as a whole.

Schematic cross-sectional views of a practical liquid lens 44 according to Embodiment 3 are illustrated in FIG. 15, FIGS. 16A to 16C, and FIGS. 17A and 17B. FIG. 15 is a schematic cross-sectional view taken along line A-A shown in FIG. 13B, and FIGS. 16A to 16C, FIGS. 17A, and 17B are schematic cross-sectional views taken along line C-C shown in FIG. 15. In addition, the schematic cross-sectional view taken along line B-B shown in FIG. 15 is similar to that illustrated in FIG. 13B.

The liquid lens 44 includes (A) a housing 50 that includes: a first side member 51; a second side member 52 that faces the first side member 51; a third side member 53 that joins one end portion of the first side member 51 and one end portion of the second side member 52; a fourth side member 54 that joins the other end portion of the first side member 51 and the other end portion of the second side member 52; a top panel 55 that is mounted on the top faces of the first side member 51, the second side member 52, the third side member 53, and the fourth side member 54; and a bottom panel 56 that is mounted on the bottom faces of the first side member 51, the second side member 52, the third side member 53, and the fourth side member 54 and (B) (M−1)

partition wall members 57 that are arranged in parallel between the first side member 51 and the second side member 52.

In the liquid lens 44 according to Embodiment 3, M (five) lens chambers 58 (58₁, 58₂, 58₃, 58₄, and 58₅) are aligned. Here, each of the lens chambers 58 (58₁, 58₂, 58₃, 58₄, and 58₅) are occupied by a first liquid 65 and a second liquid 66 that compose the liquid lens as a cylinder lens of which the axial line extends in the direction (the z direction) parallel to the direction in which the partition wall member 57 extends.

The first lens chamber 58₁ is configured by: the first side member 51; the third side member 53; a first partition wall member 57; the fourth side member 54; the top panel 55, and the bottom panel 56. In addition, a first electrode 61 is mounted on the inner face of a part of the top panel 55 configuring the first lens chamber 58₁, a second electrode 62 is mounted on the inner face of a part of the first side member 51 configuring the first lens chamber 58₁, and a third electrode 63 is mounted on the inner face of a part of the first partition wall member 57 configuring the first lens chamber 58₁.

In addition, the (m+1)-th lens chamber $58_{(m+1)}$ is configured by: the m-th (here, m=1, 2, ..., M−2) partition wall member 57; the third side member 53; the (m+1)-th partition wall member 57; the fourth side member 54; the top panel 55, and the bottom panel 56. In addition, a first electrode 61 is mounted on the inner face of a part of the top panel 55 configuring the (m+1)-th lens chamber $58_{(m+1)}$, a second electrode 62 is mounted on the inner face of a part of the m-th partition wall member 57 configuring the (m+1)-th lens chamber $58_{(m+1)}$, and a third electrode 63 is mounted on the inner face of a part of the (m+1)-th partition wall member 57 configuring the (m+1)-th lens chamber $58_{(m+1)}$.

Furthermore, the M-th lens chamber $58_M$ (=58₅) is configured by: the (M−1)-th partition wall member 57; the third side member 53; the second side member 52; the fourth side member 54; the top panel 55, and the bottom panel 56. In addition, a first electrode 61 is mounted on the inner face of apart of the top panel 55 configuring the M-th lens chamber $58_M$ (=58₅), a second electrode 62 is mounted on the inner face of a part of the (M−1)-th partition wall member 57 configuring the M-th lens chamber $58_M$ (=58₅), and a third electrode 63 is mounted on the inner face of a part of the second side member 52 configuring the M-th lens chamber $58_M$ (=58₅).

In addition, in the example illustrated in the figure, although the first electrode 61 is mounted for each lens chamber, one first electrode 61 may be mounted on the inner face of the top panel 55.

In the liquid lens 44 according to Embodiment 3, a water-repellency treatment is performed for the surface of each of the first side member 51, the second side member 52, and the partition wall member 57 in which at least the interface between the first liquid 65 and the second liquid 66 is located. In addition, the bottom face 56 of the partition wall member 57 extends up to the bottom panel 56, and the top face of the partition wall member 57 extends up to the top panel 55. The outer shape of the housing 50 is a rectangle having a long side in the z direction and a short side in the y direction. Light is incident from the bottom panel 56, and the light is output from the top panel 55.

The first liquid 65 and the second liquid 66 are insoluble and unmixed, and the interface between the first liquid 65 and the second liquid 66 configures a lens surface. Here, the first liquid 65 has conductivity, and the second liquid 66 has an insulating property. The first electrode 61 is brought into contact with the first liquid 65, the second electrode 62 is brought into contact with the first liquid 65 and the second liquid 66 through an insulating film 64, and the third electrode 63 is brought into contact with the first liquid 65 and the second liquid 66 through the insulating film 64. In addition, the top panel 55, the bottom panel 56, and the first electrode 61 are composed of materials that are transparent for light that is incident to the liquid lens 44.

To be more specific, the top panel 55, the bottom panel 56, the first side member 51, the second side member 52, the third side member 53, the fourth side member 54, and the partition wall member 57 are manufactured from glass or a resin such as an acrylic resin. In addition, the first liquid 65 having conductivity is formed from a lithium chloride aqueous solution and has a density of 1.06 gram/cm3 and a refractive index of 1.34. On the other hand, the second liquid 66 having an insulating property is formed from silicon oil (TSF437 manufactured by Momentive Performance Materials Japan LLC) and has a density of 1.02 gram/cm$^3$ and a refractive index of 1.49. In addition, the first electrode 61 is formed from ITO, and the second electrode 62 and the third electrode 63 are formed as a metal electrode, for example, made of gold, aluminum, copper, silver, or the like. Furthermore, the insulating film 64 is formed from poly-para-xylene or a metal oxide such as tantalum oxide, or titanium dioxide. In addition, a water-repellency treated layer (not shown in the figure) is formed on the insulating film 64. The water-repellency treated layer is formed from poly-para-xylene or a fluorinated polymer. It is preferable that a hydrophilic treatment is performed for the surface of the first electrode 61, and a water-repellency treatment is performed for the inner face of the third side member 53 or the fourth side member 54.

In Embodiment 3, in order to configure the optical system 112 or 254, two liquid lenses 44 illustrated in FIG. 15 overlap each other. To be more specific, the liquid lenses 44 overlap each other such that the y direction of the liquid lens 44 disposed on the lower side and the y direction of the liquid lens 44 disposed on the upper side are perpendicular to each other, and the z direction of the liquid lens 44 disposed on the lower side and the z direction of the liquid lens 44 disposed on the upper side are perpendicular to each other. Then, for example, two liquid lenses 44 overlapping each other are arranged at the position of the optical system 112 illustrated in FIG. 2 such that the y direction of the liquid lens 44 disposed on the lower side is parallel to the X-axis direction, and the x direction is parallel to the Y-axis direction.

The first electrode 61, the second electrode 62, and the third electrode 63 have a configuration and a structure so as to be connected to an external control circuit through a connection unit not shown in the figure and be applied with desired voltages. When voltages are applied to the first electrode 61, the second electrode 62, and the third electrode 63, a lens surface that is configured by the interface between the first liquid 65 and the second liquid 66 changes from a downward convex state illustrated in FIG. 16A to an upward convex state illustrated in FIG. 16B. The state of the lens surface changes in accordance with the voltages applied to the electrodes 61, 62, and 63 based on a Lippman-Young's equation. In the example illustrated in FIG. 16B, the same voltage is applied to the second electrode 62 and the third electrode 63. Accordingly, the shape of the liquid lens, which is formed inside the lens chamber, at the time of being cut along the xy plane is symmetric with respect to the optical axis of the liquid lens. Such control may be performed for the liquid lens 44 disposed on the upper side out of the two liquid lenses 44 overlapping each other.

Figure 17A:
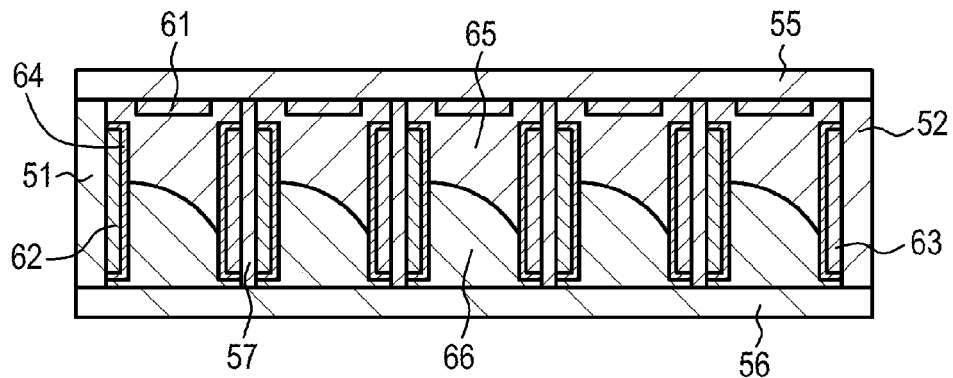
FIGS. 17A and 17B are schematic cross-sectional views of the liquid lens according to Embodiment 3, which is taken along line C-C shown in FIG. 15, and are diagrams schematically illustrating the behavior of the liquid lens.
Figure 17B:
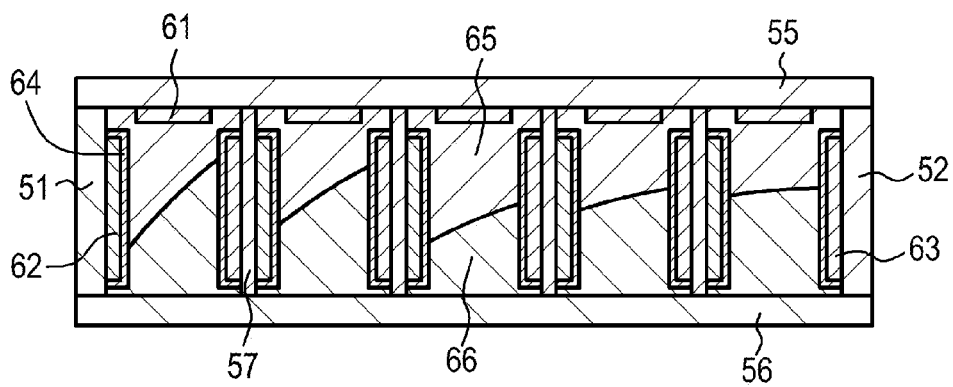

In addition, the states illustrated in FIG. 16C and FIGS. 17A and 17B are states when different voltages are applied to the second electrode 62 and the third electrode 63. In such states, the shape of the liquid lens, which is formed inside the lens chamber, at the time of being cut along the xy plane is asymmetric with respect to the optical axis of the liquid lens. Here, in the state illustrated in FIG. 16C, a Fresnel lens is configured as the liquid lens 44. Such control may be performed for the liquid lens 44 disposed on the upper side out of the two liquid lenses 44 overlapping each other.

In the states illustrated in FIGS. 17A and 17B, the optical axis of the liquid lens is moved in the y direction (the X-axis direction) that is perpendicular to the z direction. By forming the states illustrated in FIG. 17A or 17B, the direction of progress of the light output from the liquid lens 44 can be changed, or the inclination of the optical axis of the liquid lenses 44 as a whole with respect to the x direction can be controlled. In other words, by performing such control for the liquid lens 44 disposed on the lower side out of the two liquid lenses 44 overlapping each other, the optical axis of the liquid lens can be moved in the X-axis direction, or the optical axis of the liquid lens can be inclined with respect to the Y-axis direction. In addition, the optical power of the liquid lens can be changed in accordance with an electric potential difference between the second electrode 62 and the third electrode 63. Here, in the state illustrated in FIG. 17A, the same voltage is applied to each second electrode 62, and the same voltage is applied to each third electrode 63. On the other hand, in the state illustrated in FIG. 17B, different voltages are applied to the second electrode 62 and the third electrode 63, and one kind of Fresnel lens is configured as a whole of the liquid lenses 44.

When the cylinder lens implements the optical power by applying voltages to the first electrode 61, the second electrode 62, and the third electrode 63, the optical power of the cylinder lens in the xz plane (or a plane parallel to the xz plane) is substantially zero, and the optical power of the cylinder lens in the xy plane has a finite value. Here, an "optical axis of the liquid lenses as a whole" is a line joining the centers of curvature of two virtual image optical surfaces of a virtual lens (one lens as a whole of the liquid lenses 44) that is acquired as a whole of the liquid lenses 44 when the liquid lens 44 is cut out along the xy plane.

It may be configured such that the second electrodes 62 are connected to a common wiring, the third electrodes 63 are connected to a common wiring, the same voltage is applied to the second electrode 62, and the same voltage is applied to the third electrodes 63. Alternatively, it may be configured such that the second electrodes 62 are connected to a common wiring, and the third electrodes 63 are connected to individual wirings so as to be individually applied with different voltages, it may be configured such that the third electrodes 63 are connected to a common wiring, the second electrodes 62 are connected to individual wirings so as to be individually applied with difference voltages, or it may be configured such that all the second electrodes 62 and the third electrodes 63 are connected to individual wirings so as to be individually applied with different voltages.

Embodiment 4

Embodiment 4 relates to a display apparatus according to the fourth embodiment of the present disclosure. In the display apparatus according to Embodiment 4, an optical system 112 or 254 that configures at least one image displaying device (in Embodiment 4, each of two image displaying devices for the left and right eyes) includes a liquid prism 45. Thus, by operating the liquid prism 45 depending on the observation position of an observer, the convergence angle (the main light beam intersecting angle in the horizontal face) is adjusted. The liquid prism 45 that configures apart of the optical system 112 or 254 is configured by a known liquid prism 45 that utilizes an electrowetting phenomenon. By operating the liquid prism 45, the angle of the optical axis of the optical system 112 or 254 with respect to the YZ plane can be changed. In such a form, a change in the YZ plane incidence angle of parallel light that is output from the optical system 112 or 254 and is incident to the optical device 120 or 320 with respect to the optical device 120 or 320 occurs. In other words, a change in the angle of the optical axis of the optical system 112 or 254 with respect to the YZ plane occurs.

Figure 13C:
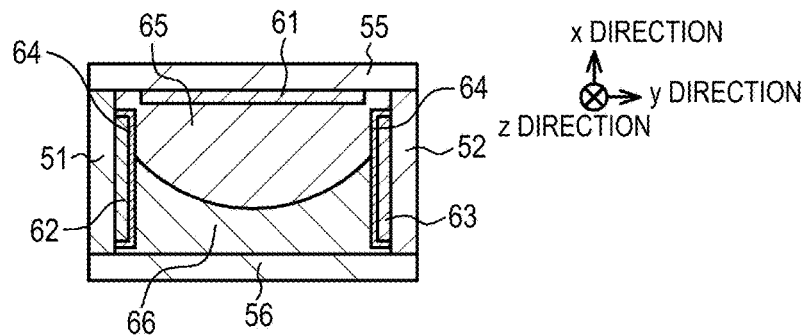
FIG. 13C is a schematic cross-sectional view of a principled liquid lens taken along line C-C shown in FIG. 13A.
Figure 18:
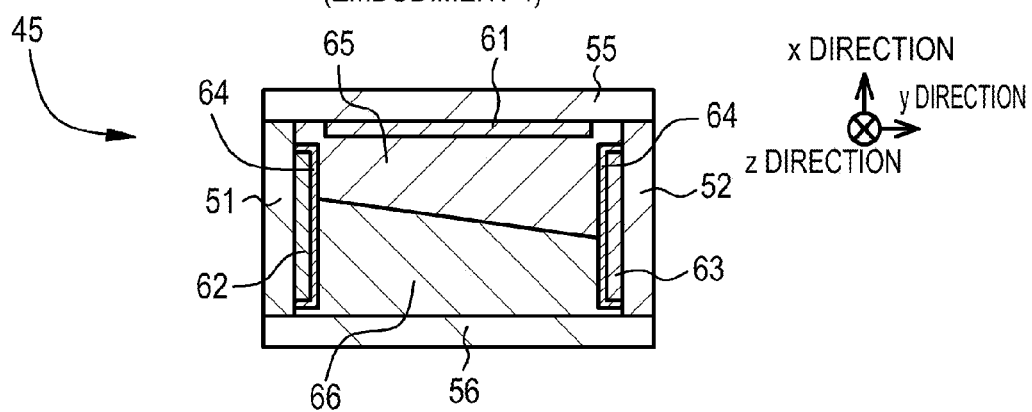
FIG. 18 is a conceptual diagram of a liquid prism according to Embodiment 4.

As illustrated in FIG. 18 as a conceptual diagram, the configuration and the structure of the liquid prism 45 may be the same as those of the principled liquid lens illustrated in FIGS. 13A to 13C, and detailed description thereof is omitted. A difference from the principled liquid lens is that a lens surface is not configured by the interface between the first liquid 65 and the second liquid 66, and a flat inclined surface of a prism is configured, and such a configuration can be acquired by appropriately selecting the first liquid 65 and the second liquid 66. Then, the liquid prism 45 may be arranged, for example, between the optical system 112 and the light guiding plate 121 of the display apparatus illustrated in FIG. 2 such that the y direction is parallel to the X-axis direction, and the x direction is parallel to the Y-axis direction.

Embodiment 5

Embodiment 5 is a modification of the display apparatuses according to Embodiments 1 to 4. In the display apparatus according to Embodiment 5, by controlling image signals (text data, input image signals, or input image data) input to the image forming devices 111A and 111B configuring at least one image displaying device (in Embodiment 5, each of two image displaying devices 100, 200, 300, 400, and 500 for the left and right eyes), in addition to the adjustment of the convergence angle according to Embodiments 1 to 4, more precise adjustment of the convergence angle is performed depending on the observation position of an observer, or the position of an image displayed in the optical device configuring at least the one image displaying device is adjusted depending on the observation position of an observer. In addition, in Embodiment 5, although both the adjustment of the convergence angle and the adjustment of the position of an image on the basis of the observation position of an observer are performed, any one thereof may be performed.

To be more specific, a test image signal is transmitted to the control device 18 in a wireless manner (or wired manner in some situations). Then, the control device 18 performs a process for displaying an image for the image signal, and images (subtitles) are generated by the image forming devices 111A and 111B based on the test image signal. These images finally reach both eyes of an observer (audience member) 20 to whom the display apparatus is mounted through the optical system 112 or 254 and the optical device 120, 320, or 520.

Then, the image displayed in the optical device 120, 320, or 520 is moved horizontally and vertically and is rotated through the control device 18, and more particularly, by using a switch (not shown in the figure) arranged in the control device 18 such that the images displayed in the image displaying devices 100, 200, 300, 400, or 500 for the left and right eyes coincide (overlap each other) at a desired position (for example, a desired position on a stage or a screen). In other words, for example, the image displayed in the optical device 120, 320, or 520 is moved horizontally and vertically and is rotated such that a point "A" shown in FIG. 7 is located at a desired position. As above, by operating the switch arranged in the control device 18, the image signal is controlled (corrected). In other words, a display position correcting signal is generated within the control device 18, and the display position correcting signal is added to the image signal.

Figure 19A:
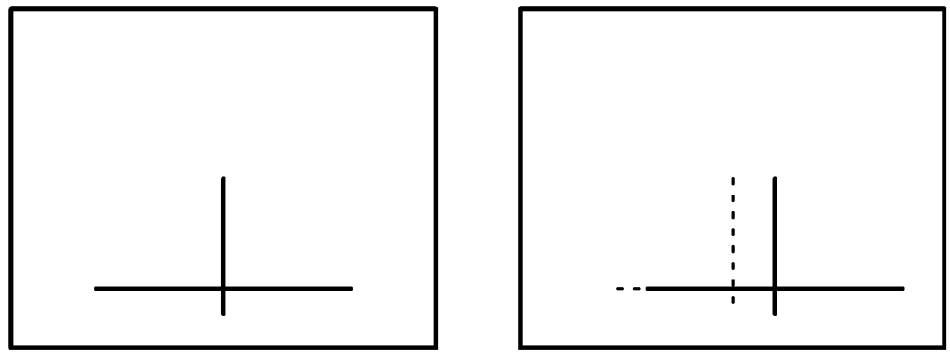
FIGS. 19A, 19B, and 19C are schematic diagrams illustrating a state in which there is a deviation between an image displayed by the image displaying device for the left eye and an image displayed by the image displaying device for the right eye.
Figure 19B:
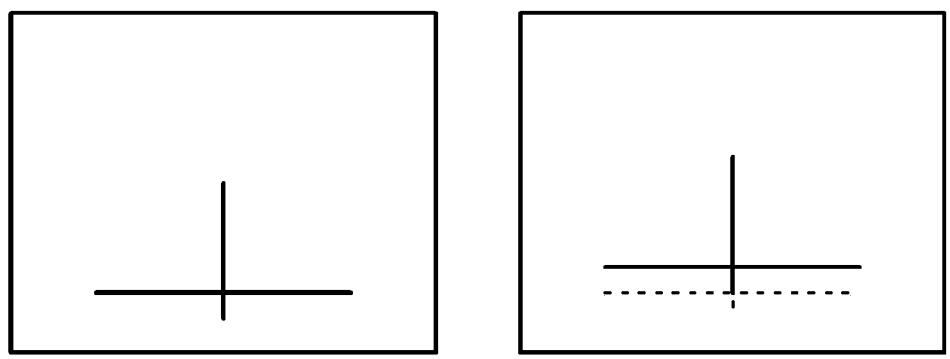
Figure 19C:
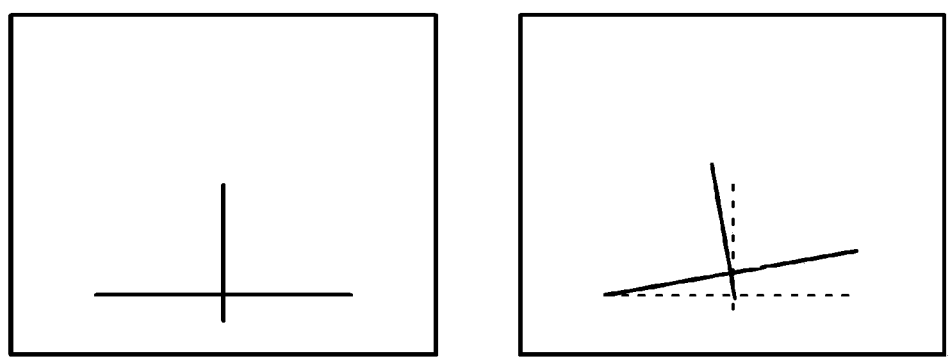

A state in which the images displayed by the image displaying devices 100, 200, 300, 400, and 500 for the left and right eyes are horizontally misaligned from desired positions is schematically illustrated in FIG. 19A, a state in which the above-described images are vertically misaligned is schematically illustrated in FIG. 19B, and a state in which the above-described images area misaligned in a rotated state is schematically illustrated in FIG. 19C. Here, images disposed on the right side in FIGS. 19A, 19B, and 19C represent images that are displayed by the image displaying devices 100, 200, 300, 400, and 500 for the right eye, and images disposed on the left side in FIGS. 19A, 19B, and 19C represent images that are displayed by the image displaying devices 100, 200, 300, 400, and 500 for the left eye. In addition, dotted lines represented on the right side in FIGS. 19A, 19B, and 19C represent the overlapping of the images displayed by the image displaying device 100, 200, 300, 400, or 500 for the left eye.

Here, for the movement of an image (text) in the horizontal direction, a signal used for shifting the position of the image, which is based on an image signal, by +i pixels or −i pixels in the horizontal direction may be generated by the control device 18 as a display position correcting signal. Alternatively, a signal that is used for shifting the timing of a horizontal synchronization signal by +i pixels or −i pixels may be generated by the control device 18. In addition, for the movement of an image (text) in the vertical direction, a signal that is used for shifting the position of an image, which is based on an image signal, by +j pixels or −j pixels in the vertical direction may be generated by the control device 18 as a display position correcting signal, or a signal that is used for shifting the timing of a vertical synchronization signal by +j pixels or −j pixels may be generated by the control device 18. In other words, it can be achieved by delaying or advancing the memory reading position of an image timing-wise or by shifting the timing of the vertical synchronization signal or the horizontal synchronization signal. Furthermore, for rotating an image (text), a signal that is used for rotating an image may be generated by the control device 18 as a display position correcting signal by using a known method.

Then, the display position correcting signal at a time when the images displayed by the image displaying devices 100, 200, 300, 400, and 500 for the left and right eyes coincide with each other (overlap each other) is stored in the control device 18. Such an operation can be performed, for example, by using a button (not shown in the figure) arranged in the control device 18. Such an operation may be performed once, for example, after an observer is seated on a seat. In addition, in such an operation, one kind of test pattern, as illustrated in FIGS. 19A to 19C, acquired by combining a line extending in the horizontal direction, a line extending in the vertical direction, and a line extending in an inclined direction may be used. As above, by controlling the position of the image displayed in the optical device 120, 320, or 520 that configures at least one image displaying device 100, 200, 300, 400, or 500, the mutual positions of two images displayed in two image displaying devices 100, 200, 300, 400, and 500 can be adjusted. In other words, both of a more precise adjustment of the convergence angle and the adjustment of the position of an image depending on the observation position of an observer can be performed.

The display position correcting signal, as described above, is stored in the control device (a control circuit or a control unit) 18. An image signal (text data) that is reproduced, for example, by the text data reproducing device 31 or the image data and text data reproducing device 31' that has a known configuration is transmitted to the control device 18 through the text data wireless transmitting device 32 in a wireless manner. The start of transmission of an image signal may be performed, for example, in accordance with the state of progress of a movie or the like or the state of progress of a play or the like based on a predetermined schedule or a time allocation by the operation of an operator or under the control of a computer or the like. Then, a process for displaying an image is performed for the image signal by the control device 18. In other words, a display position correcting signal is added to the image signal (particularly, data "POS_X" and "POS_Y") by the control device 18. Accordingly, based on a distance from the display apparatus to the observation target, by controlling the image signals input to the image forming devices 111A and 111B that configure at least one image displaying device (in Embodiment 5, two image displaying devices 100, 200, 300, 400, and 500 for the left and right eyes), in other words, by adjusting a distance (gap) between two images acquired by two image displaying devices 100, 200, 300, 400, and 500 for the left and right eyes, more precise adjustment of the convergence angle, which is in correspondence with the distance from the display apparatus to the observation target, can be performed. To be more specific, for example, the farther the distance from the display apparatus to the observation target is, the more the convergence angle may be decreased. In addition, by parallel moving two images acquired by the two image displaying devices 100, 200, 300, 400, and 500 for the left and right eyes, the positions of images displayed in the optical devices 120, 320, and 520 configuring the image displaying devices 100, 200, 300, 400, and 500 can be adjusted depending on the observation position of an observer. To be more specific, for example, in a case where the observation target is located at a position with an angle in the vertical direction with respect to the display apparatus (for example, in the case of a position of looking up the at screen when an observer is seated in a front row), by moving the position of the displayed image (subtitle) to the upper side, the positions of an external image and the image are not far from each other when the observer views the image overlapping the external image (observation target), whereby the image can be visually recognized in an easy manner. A performance progresses in a movie, a stage, or the like based on a scenario that is determined in advance. Accordingly, an image (observation target) displayed on the screen or the stage at the time that images overlap each other can be predicted. In addition, it is possible to predict the position of a character or the like on the screen or the stage based on a speech generating source such as a character that speaks its part. Therefore, based on such a prediction, by adjusting the positions of images displayed in the optical devices 120, 320, and 520 that configure the image displaying devices 100, 200, 300, 400, and 500 depending on the observation position of the observer, the image (subtitle) can be displayed at a position having good visibility in the optical devices 120, 320, and 520.

In addition to the image signals input to the image forming devices 111A and 111B, observation position information (distance information) that is information on the position from the observer (display apparatus) to the observation target is transmitted to the display apparatus from the outside. An example of the conceptual diagram illustrating the format of such a signal is illustrated in FIG. 11B. In such a configuration, a signal (a display position correcting signal or a convergence angle control signal) used for shifting the position of an image, which is based on the image signal, by +k pixels or −k pixels in the horizontal direction may be generated by the control device 18 based on the observation position information (distance information). It may be configured such that the degree of change in the convergence angle or the degree of change in the virtual image distance for shifting the position of the image by one pixel in the horizontal direction is checked in advance, and such relationship is stored in the control device 18. In addition, a display position correcting signal used for shifting the position of the image by +i pixels or −i pixels in the horizontal direction, a display position correcting signal used for shifting the position of the image by +j pixels or −j pixels in the vertical direction, and furthermore a display position correcting signal used for rotating the image may be configured to be added to this signal and be transmitted to the image forming devices 111A and 111B. As above, by moving two images acquired by two image displaying devices 100, 200, 300, 400, and 500 for the left and right eyes based on the observation position information (or the amount of shift of images in the horizontal direction), a virtual image can be arranged at a desired position. In other words, by adjusting a distance (gap) between two images displayed in the optical devices 120, 320, and 520 that configure the image displaying devices 100, 200, 300, 400, and 500 in the horizontal direction, in addition to the adjustment of the convergence angle described in Embodiments 1 to 4, more precise adjustment of the convergence angle can be performed in correspondence with the distance from the display apparatus to the observation target. In addition, by parallel moving the two images acquired by the two image displaying devices 100, 200, 300, 400, and 500 for the left and right eyes, a virtual image can be arranged at a desired position. In other words, the positions of the images displayed in the optical devices 120, 320, and 520 that configure the image displaying devices 100, 200, 300, 400, and 500 can be adjusted depending on the observation position of an observer.

As above, by shifting the image display position by a desired number of pixels in the horizontal direction from a predetermined position, more precise adjustment of the convergence angle can be performed. In other words, by controlling the image signals input to the image forming devices 111A and 111B that configure the two image displaying devices 100, 200, 300, 400, and 500 for the left and right eyes based on the display position correcting signal, more precise adjustment of the convergence angle can be performed in correspondence with the distance from the display apparatus to the observation target. As a result, the distance between the observation target and the observer (audience member) 20 and the virtual image distance of the image (subtitle) displayed by the image displaying device can be configured to be the same with higher precision.

In addition, in Embodiment 5 or any one of Embodiments 1 to 4 and Embodiments 6 to 16 to be described later, the size of the display screen (image displaying area) displayed in the optical device, the angle of view of the display screen (image displaying area), and the resolution of the display screen may be changed depending on the observation position of an observer and the distance between the observation target and the display apparatus under the control of the control device 18.

Embodiment 6

Embodiment 6 is a modification of the display apparatuses according to Embodiments 1 to 5. Since the basic configuration and structure of a display apparatus according to Embodiment 6 are the same as those of the display apparatus according to any one of Embodiments 1 to 4, detailed description thereof is omitted.

In the display apparatus according to Embodiment 6, when a predetermined time elapses after an image signal is input to an image forming device, an image formation process of the image forming device is stopped. In order to stop the image formation process of the image forming device, in other words, in order to proceed to a power saving mode or the like of the display apparatus, a signal that represents an image display time of the image displaying device or a signal used for instructing the image forming device to stop the image formation process is added to the image signal.

An example of an image signal according to Embodiment 6 described above is illustrated in FIG. 11C, and data "TIME" that represents an image display time as a signal representing the image display time of the image displaying device is added to the image signal according to Embodiment 1 illustrated in FIG. 11A. The control device 18 displays an image (subtitle) in the image displaying device for a time length (T seconds) corresponding to the data "TIME", then stops the display of the image (subtitle) in the image displaying device, and operates only the command receiving circuit 18A, thereby proceeding to a power saving mode, in which the operations of the signal processing circuit 18B, the timing adjusting circuit 18C, the transmission circuit 18D, and the timing generating circuit 18E are stopped, or the like based on an instruction transmitted from the command receiving circuit 18A. Then, when the command receiving circuit 18A receives an image signal again, the control device 18 restarts the operations of the signal processing circuit 18B, the timing adjusting circuit 18C, the transmission circuit 18D, and the timing generating circuit 18E based on an instruction transmitted from the command receiving circuit 18A.

As above, according to the display apparatus according to Embodiment 6, when a predetermined time elapses after an image signal is input to the image forming device, the image formation process of the image forming device is stopped. In other words, since the display apparatus proceeds to the power saving mode or the like after the elapse of the predetermined time, there is no problem of wasting power in the display apparatus.

Embodiment 7

Embodiment 7 is a modification of the image displaying devices according to Embodiments 1 to 6. As the conceptual diagrams of image displaying devices 200 and 400 of the display apparatus according to Embodiment 7 or Embodiment 9 to be described later are illustrated in FIGS. 20 and 22, an image forming device 211 is configured by the image forming device according to the second configuration. In other words, the image forming device 211 includes a light source 251 and a scanning unit 253 that scans parallel light emitted from the light source 251. To be more specific, the image forming device 211 includes: a light source 251; a collimator optical system 252 that that forms light emitted from the light source 251 to be parallel light; and a scanning unit 253 that scans the parallel light output from the collimator optical system 252; and an optical system (relay optical system) 254 that relays and outputs the parallel light scanned by the scanning unit 253. In addition, the entire image forming device 211 can be fitted to the inside of a casing 213 (denoted by dashed-dotted lines in FIGS. 20 and 22), an opening portion (not shown in the figure) is arranged in the casing 213, and light is output from the relay optical system 254 through the opening portion. In addition, each casing 213 is attached to a temple portion 13 in a detachable state or a fixed state by using an attachment member 19.

The light source 251 is configured by a light emitting device that emits white light. The light emitted from the light source 251 is incident to the collimator optical system 252 having a positive optical power as a whole and is output as parallel light. Then, the parallel light is reflected by a total-reflection mirror 256, a micro mirror is configured to be rotatable in a two-dimensional direction, and horizontal scanning and vertical scanning are performed by the scanning unit 253 that is formed by MEMS that can two-dimensionally scan the incident parallel light for forming one kind of two-dimensional image, and virtual pixels (the number of the pixels, for example, may be the same as that in Embodiment 1) are generated. Then, light emitted from the virtual pixels passes through the relay optical system (parallel light output optical system) 254 that is configured by a known relay optical system, and the light beams formed as the parallel light are incident to the optical device 120.

The optical device 120 to which the light beams formed as the parallel light by the relay optical system 254 are incident and in which the incident light beams are guided so as to be output therefrom has the same configuration and structure as those described in Embodiment 1, and thus detailed description thereof is omitted. In addition, since the display apparatus according to Embodiment 7 has the same configuration and structure as those of the display apparatuses according to Embodiments 1 to 6 except for the differences described above, detailed description thereof is omitted.

Embodiment 8

Embodiment 8 is a modification of the image displaying devices according to Embodiments 1 to 6. The conceptual diagram of an image displaying device 300 of a display apparatus according to Embodiment 8 is illustrated in FIG. 21A. In addition, a schematic cross-sectional view in which a part of a reflective-type volume hologram diffraction grating is enlarged is illustrated in FIG. 21B. According to Embodiment 8, similarly to Embodiment 1, an image forming device 111 is configured by an image forming device according to the first configuration. The basic configuration and structure of an optical device 320 are the same as those of the optical device 120 according to Embodiment 1, except for the configurations and the structures of first and second deflection units.

According to Embodiment 8, the first deflection unit and the second deflection unit are arranged on the surface (particularly, a second face 323 of a light guiding plate 321) of a light guiding plate 321. The first deflection unit diffracts light incident to the light guiding plate 321, and the second deflection unit diffracts light propagating through the inside of the light guiding plate 321 through total reflection over a plurality of times. Here, the first deflection unit and the second deflection unit are formed by diffraction grating devices, particularly, reflective-type diffraction grating devices, and more particularly, reflective-type volume hologram diffraction gratings. In the description presented below, the first deflection unit that is formed by a reflective-type volume hologram deflation grating is referred to as a "first diffraction grating member 330" for convenience of the description, and the second deflection unit that is formed from a reflective-type volume hologram diffraction grating is referred to as a "second diffraction grating member 340" for convenience of the description.

In Embodiment 8 or Embodiment 9 to be described later, the first diffraction grating member 330 and the second diffraction grating member 340 are configured so as to be formed by laminating diffraction grating layers each formed as one layer. In addition, in each diffraction grating layer that is formed from a photopolymer material, interference fringes according to one type of wavelength band (or wavelength) is formed, and the diffraction grating layer is manufactured by using a general method. The pitch of the interference fringes formed in the diffraction grating layer (diffraction optical device) is constant, and the interference fringes have a linear shape and are parallel to the Z-axis. In addition, the axial lines of the first diffraction grating member 330 and the second diffraction grating member 340 are parallel to the X axis, and the normal lines thereof are parallel to the Y axis.

A schematic partial cross-sectional view in which the reflective-type volume hologram diffraction grating is enlarged is illustrated in FIG. 21B. In the reflective-type volume hologram diffraction grating, interference fringes having an inclination angle $\phi$ are formed. Here, the inclination angle $\phi$ represents an angle that is formed by the surface of the reflective-type volume hologram diffraction grating and the interference fringes. The interference fringes are formed from the inside of the reflective-type volume hologram diffraction grating to the surface thereof. The interference fringes satisfy a Bragg condition. Here, the Bragg condition is a condition that satisfies the following Equation (A). In Equation (A), m represents a positive integer, $\lambda$, represents a wavelength, d represents the pitch of the grating face (a gap of virtual planes including the interference fringes in the direction of the normal line), and $\Theta$ represents a complementary angle of an angle at which light is incident to the interference fringes. In addition, the relationship among the complementary angle $\Theta$, the inclination angle $\phi$, and the incidence angle $\psi$ in a case where light penetrates into the diffraction grating member with an incidence angle $\psi$ is as in Equation (B).

$$m \cdot \lambda = 2 \cdot d \cdot \sin(\Theta) \tag{A}$$

$$\Theta = 90° - (\phi + \psi) \tag{B}$$

The first diffraction grating member 330, as described above, is arranged on (bonded to) the second face 323 of the light guiding plate 321 and diffracts and reflects parallel light incident to the light guiding plate 321 such that the parallel light incident to the light guiding plate 321 from the first face 322 is totally reflected inside the light guiding plate 321. In addition, the second diffraction grating member 340, as descried above, is arranged on (bonded to) the second face 323 of the light guiding plate 321 and diffracts and reflects the parallel light propagating through the inside of the light guiding plate 321 through total reflection a plurality of times so as to be output from the first face 322 of the light guiding plate 321 as parallel light.

Then, the parallel light propagates through the inside of the light guiding plate 321 through total reflection and then is output therefrom. At this time, since the light guiding plate 321 is thin, and the optical path for propagating the inside of the light guiding plate 321 is long, the number of times of total reflection until the reach of the parallel light up to the second diffraction grating member 340 differs in accordance with the angle of view. Described in more detail, of the parallel light incident to the light guiding plate 321, the number of times of reflection of parallel light incident to the light guiding plate 321 with an angle in the direction approaching the second diffraction grating member 340 is less than that of parallel light incident to the light guiding plate 321 with an angle in the direction departing away from the second diffraction grating member 340. The reason for this is that an angle that is formed by the parallel light that is diffracted and reflected by the first diffraction grating member 330 and is incident to the light guiding plate 321 with angle in the direction approaching the second diffraction grating member 340 and the normal line of the light guiding plate 321 at the time when the light propagating through the inside of the light guiding plate 321 collides with the inner face of the light guiding plate 321 is less than an angle that is formed by the parallel light incident to the light guiding plate 321 with an angle in the opposite direction and the normal line. In addition, the shape of the interference fringes formed inside the second diffraction grating member 340 and the shape of the interference fringes formed inside the first diffraction grating member 330 are symmetrical with respect to a virtual surface that is perpendicular to the axial line of the light guiding plate 321.

A light guiding plate 321 according to Embodiment 9 to be described later basically has the same configuration and structure as those of the light guiding plate 321 described above. The display apparatus according to Embodiment 8 has the same configuration and structure as those of the display apparatuses according to Embodiments 1 to 7 except for the differences described above, and thus detailed description thereof is omitted.

Embodiment 9

Embodiment 9 is a modification of the image displaying device according to Embodiments 8. A conceptual diagram of an image displaying device of a display apparatus according to Embodiment 9 is illustrated in FIG. 22. A light source 251, a collimator optical system 252, a scanning unit 253, a parallel light output optical system (an optical system or a relay optical system 254), and the like of the image displaying device 400 according to Embodiment 9 have the same configurations and structures (the image forming device according to the second configuration) as those of Embodiment 7. In addition, an optical device 320 according to Embodiment 9 has the same configuration and structure as those of the optical device 320 according to Embodiment 8. The display apparatus according to Embodiment 9 substantially has the same configuration and structure as those of the display apparatus according to Embodiment 1 or 7 except for the differences described above, and thus detailed description thereof is omitted.

Embodiment 10

Figure 23A:
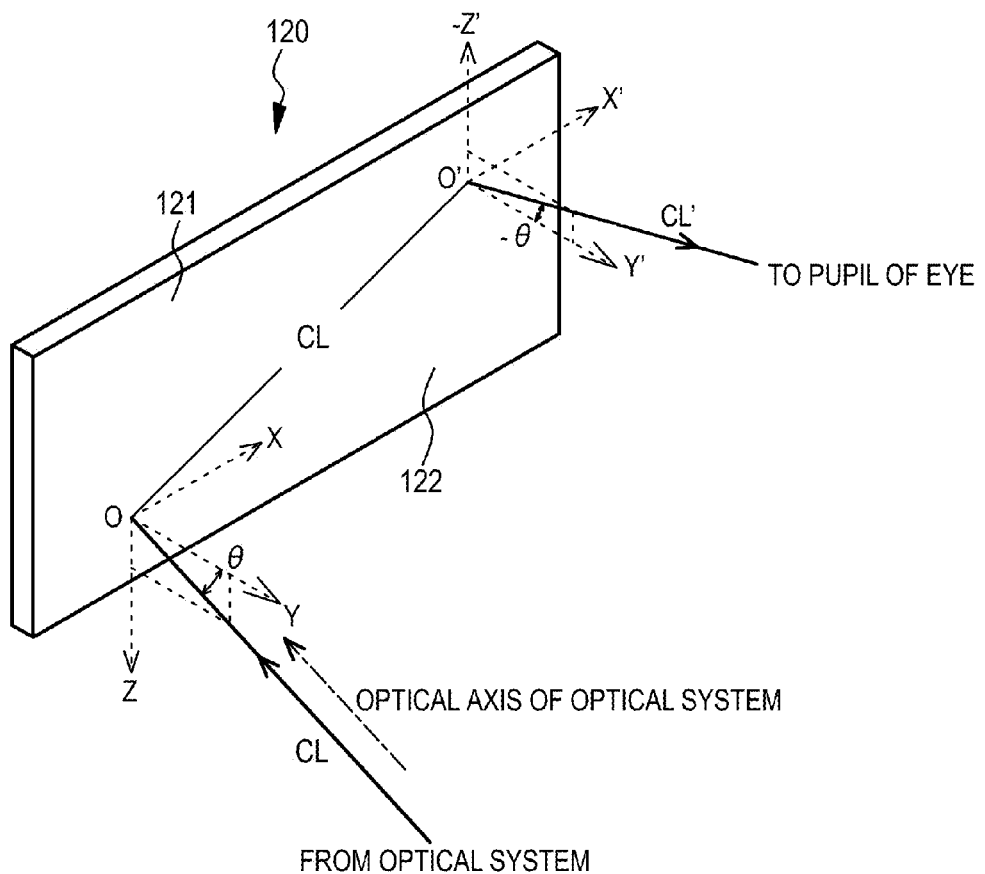
Figure 23B:
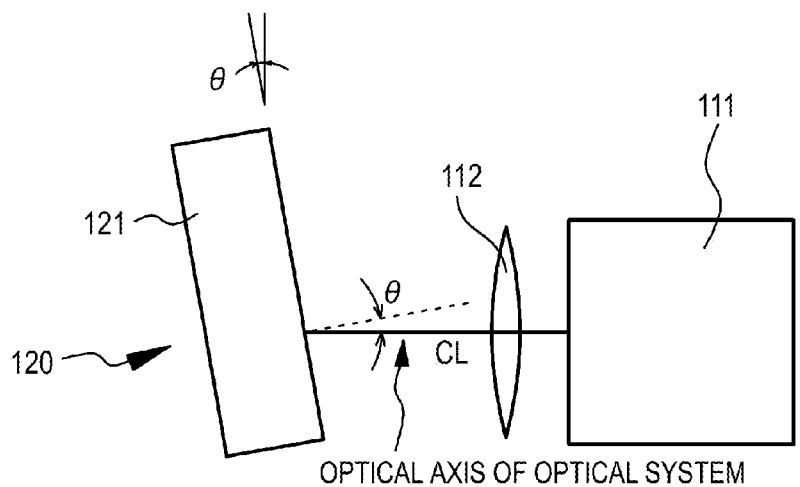
Figure 24:
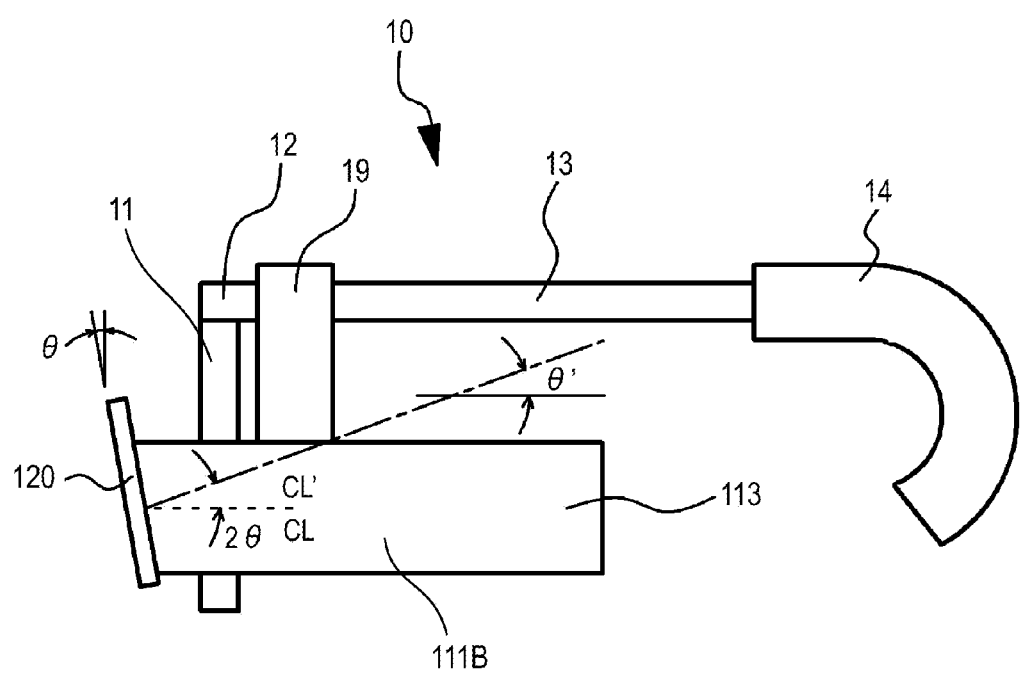
FIG. 24 is a schematic diagram of the display apparatus according to Embodiment 10, viewed from the side.

Embodiment 10 is a modification of the image displaying devices according to Embodiments 1 to 9. Conceptual diagrams illustrating the arrangement state of a light guiding plate and the like that configure an image displaying device of a display apparatus according to Embodiment 10 are illustrated in FIGS. 23A and 23B. In addition, a schematic diagram of the display apparatus according to Embodiment 10, viewed from the side is illustrated in FIG. 24.

In Embodiments 1 to 9, as illustrated in FIG. 3, in the image displaying device 100 or 300, the center light beam CL that is output from the center of the image forming device 111 or 211 and passes through the nodal point of the optical system 112 or 254 located on the image forming device side is designed so as to collide with the light guiding plate 121 or 321 within the XY plane. In other words, the center light beam CL is designed so as to be incident to the light guiding plate 121 or 321 with an incidence angle (XY plane incidence angle) of zero degree within the XY plane. In such a case, the center of a displayed image coincides in the direction of the perpendicular line of the first face 122 or 322 of the light guiding plate 121 or 321.

In other words, in such an image displaying device that is represented by the image displaying device 100, as illustrated in FIG. 3, the center light beam CL output from the center of the image forming device 111 located on the optical axis of the collimator optical system 112 is converted into approximately parallel light by the collimator optical system 112 and then is incident to the first face (incidence face) 122 of the light guiding plate 121 within the XY plane. Then, the converted parallel light propagates in the propagation direction A while being totally reflected between the first face 122 and the second face 123 by the first diffraction unit 130. Subsequently, the center light beam CL is reflected and diffracted by the second deflection unit 140 and is output from the first face 122 of the light guiding plate 121 within the XY plane so as to reach the pupil 21 of the eye of the observer (audience member) 20.

Figure 28:
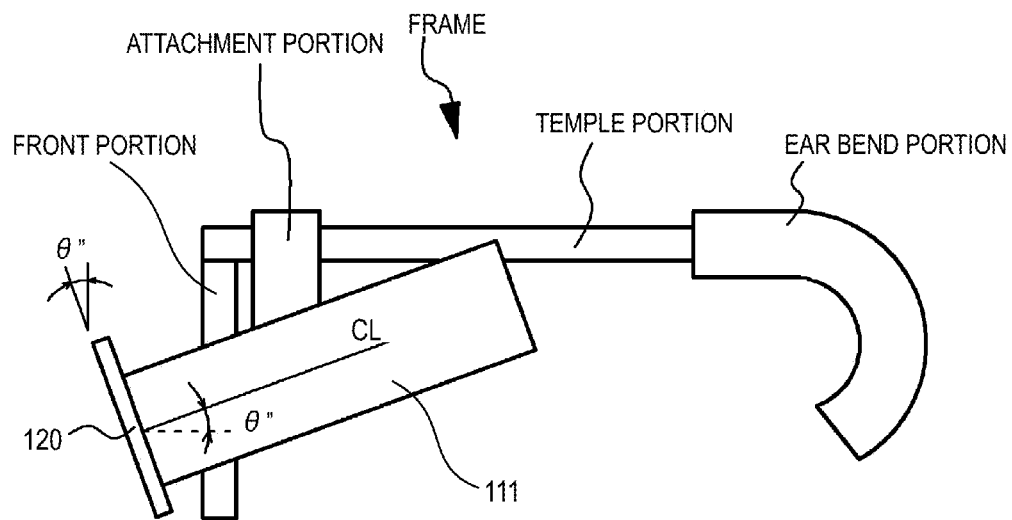
FIG. 28 is a schematic diagram of one type of a head-mounted display according to Embodiment 1, viewed from the side.

In a see-through type display apparatus, in order not for the optical device 120, 320, or 520 to interfere the observer (audience member) 20 viewing an observation target located in the horizontal direction, it is preferable to arrange the optical device 120, 320, or 520 so as to be shifted to the lower side of the line of sight of the observer in the horizontal direction (the horizontal-direction line of sight of the observer). In such a case, the entire image displaying device 100 or 300 are arranged to the lower side of the horizontal-direction line of sight of the observer. In such a configuration, as illustrated in FIG. 28, it is necessary to incline the entire image displaying device 100 by an angle θ″. Accordingly, there is a case where the angle θ″ by which the image displaying device 100 can be inclined is limited, or the degree of freedom in design decreases based on the relationship with the attachment portion (temple portion) of the glass-type frame that is used for being mounted in the head of the observer. Accordingly, it is more preferable to form an image displaying device that does not interfere the horizontal-direction line of sight of the observer, can be arranged with a high degree of freedom, and has a high degree of freedom in design.

In Embodiment 10, a configuration is employed in which the center light beam CL intersects the XY plane at an angle (θ) other than zero degree. In addition, the center light beam CL is configured so as to be included within the YZ plane. Furthermore, in Embodiment 10 or Embodiment 11 to be described later, the optical axis of the optical system 112 or 254 is included within the YZ plane and intersects the XY plane at an angle other than zero degree, and more particularly, at an angle θ (see FIGS. 23A and 23B). In addition, in Embodiment 10 or Embodiment 11 to be described later, assuming that the XY plane coincides with a horizontal surface, the angle θ at which the center light beam CL intersects the XY plane is an elevation angle. In other words, the center light beam CL collides with the XY plane from the lower side of the XY plane toward the XY plane. The XY plane intersects the vertical surface at an angle other than zero degree, and more particularly, at an angle θ.

Figure 25A:
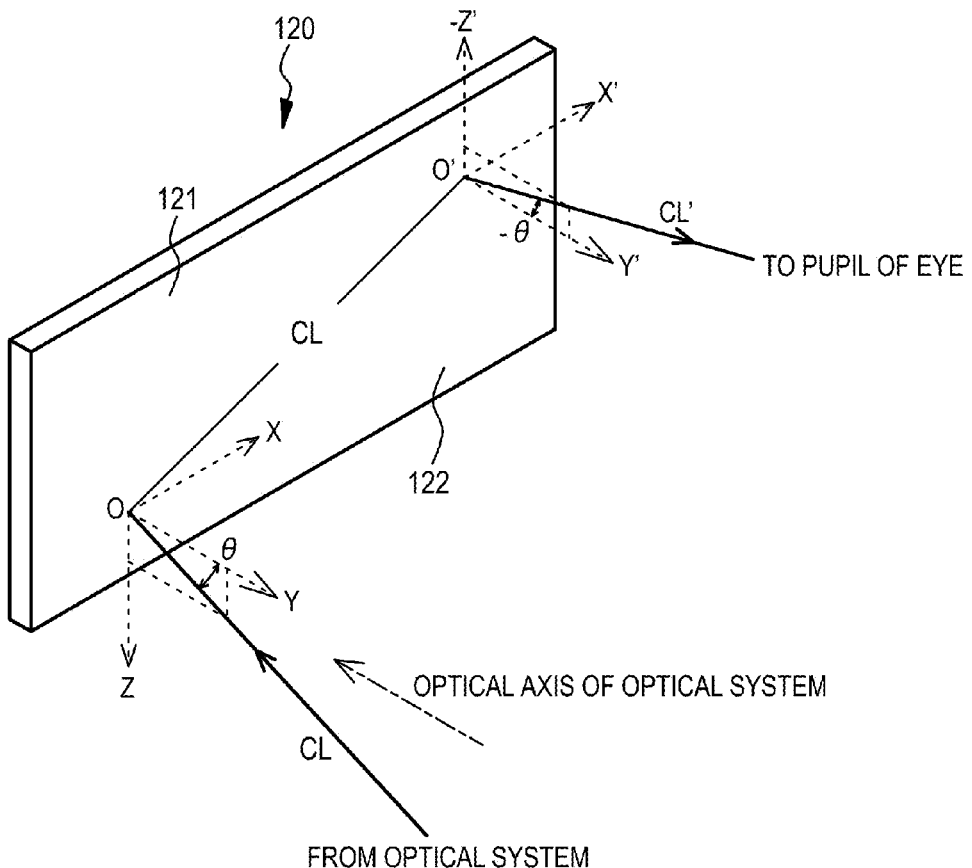

In Embodiment 10, the angle θ=5 degrees. To be more specific, in such a configuration, the center light beam CL (denoted by a dotted line in FIG. 24) is included in the horizontal surface. The optical device 120, 320, or 520 is inclined by the angle θ with respect to the vertical surface. In other words, the optical device 120, 320, or 520 is inclined by an angle (90-θ) degrees with respect to the horizontal surface. In addition, the center light beam CL' (denoted by a dashed-dotted line in FIG. 24) output from the optical device 120, 320, or 520 is inclined by an angle 2θ with respect to the horizontal surface. In other words, when an observer 20 views a target located at an infinite distance in the horizontal direction, the center light beam CL' that is output from the optical device 120, 320, or 520 and is incident to the pupil of the eye of the observer 20 forms a depression angle θ' (=2θ) (see FIG. 24). The angle formed by the center light beam CL' and the normal line of the optical device 120, 320, or 520 is θ. In FIG. 23A or FIG. 25A to be described later, a point of the optical device 120, 320, or 520 from which the center light beam CL' is output is denoted by "O'", and axial lines that pass through the point O' and are parallel to the X axis, the Y axis, and the Z axis are denoted by the X' axis, the Y' axis, and the Z' axis.

In the image displaying device according to Embodiment 10, the center light beam CL intersects the XY plane at an angle (θ) other than zero degree. Here, the center light beam CL' that is output from the optical device and is incident to the pupil of the eye of the observer (audience member) 20 forms a depression angle θ', and θ'=2θ. On the other hand, in the example illustrated in FIG. 28, in order to obtain the same depression angle, it is necessary to incline the entire image displaying device by an angle θ". Here, the relationship between θ" and θ is θ"=2θ, and accordingly, it is necessary to incline the optical device by 2θ with respect to the vertical surface in the example illustrated in FIG. 28. On the other hand, according to Embodiment 10, the optical device may be inclined by θ with respect to the vertical surface, and the image forming device may be maintained to be horizontally arranged. Accordingly, there is less limitation on the angle of attachment of the image displaying device at the time of attaching the image displaying device to the attachment portion of the glass-type frame, and a high degree of freedom in the design can be acquired. In addition, since the inclination of the optical device with respect to the vertical surface is less than that of the example illustrated in FIG. 28, it is difficult for a phenomenon to occur in which external light is reflected by the optical device and is incident to the pupil of the eye of the observer (audience member) 20. Therefore, an image having a higher quality can be displayed.

The display apparatus according to Embodiment 10 has the same configuration and structure as those of the display apparatuses according to Embodiments 1 to 9 except for the differences described above, and thus detailed description thereof is omitted.

Embodiment 11

Figure 25B:
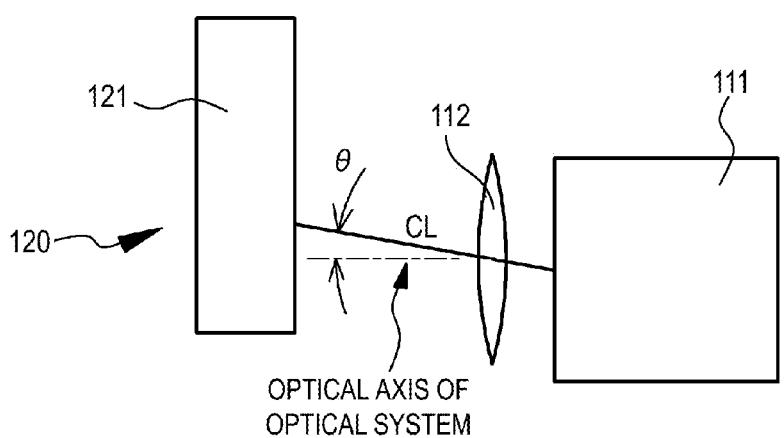

Embodiment 11 is a modification of the image displaying device according to Embodiment 10. Conceptual diagrams illustrating the arrangement state of a light guiding plate and the like that configure an image displaying device according to Embodiment 11 are illustrated in FIGS. 25A and 25B. Here, according to Embodiment 11, the optical axis of an optical system (a parallel light output optical system or a collimator optical system) 112 is parallel to the YZ plane, is parallel to the XY plane, and passes through a position deviated from the center of an image forming device 111. By employing such a configuration, the center light beam CL is included in the YZ plan and intersects the XY plane at an elevation angle θ. A display apparatus according to Embodiment 11 has the same configuration and structure as those of the display apparatuses according to Embodiments 1 to 10 except for the differences described above, and thus detailed description thereof is omitted.

Embodiment 12

Figure 26:
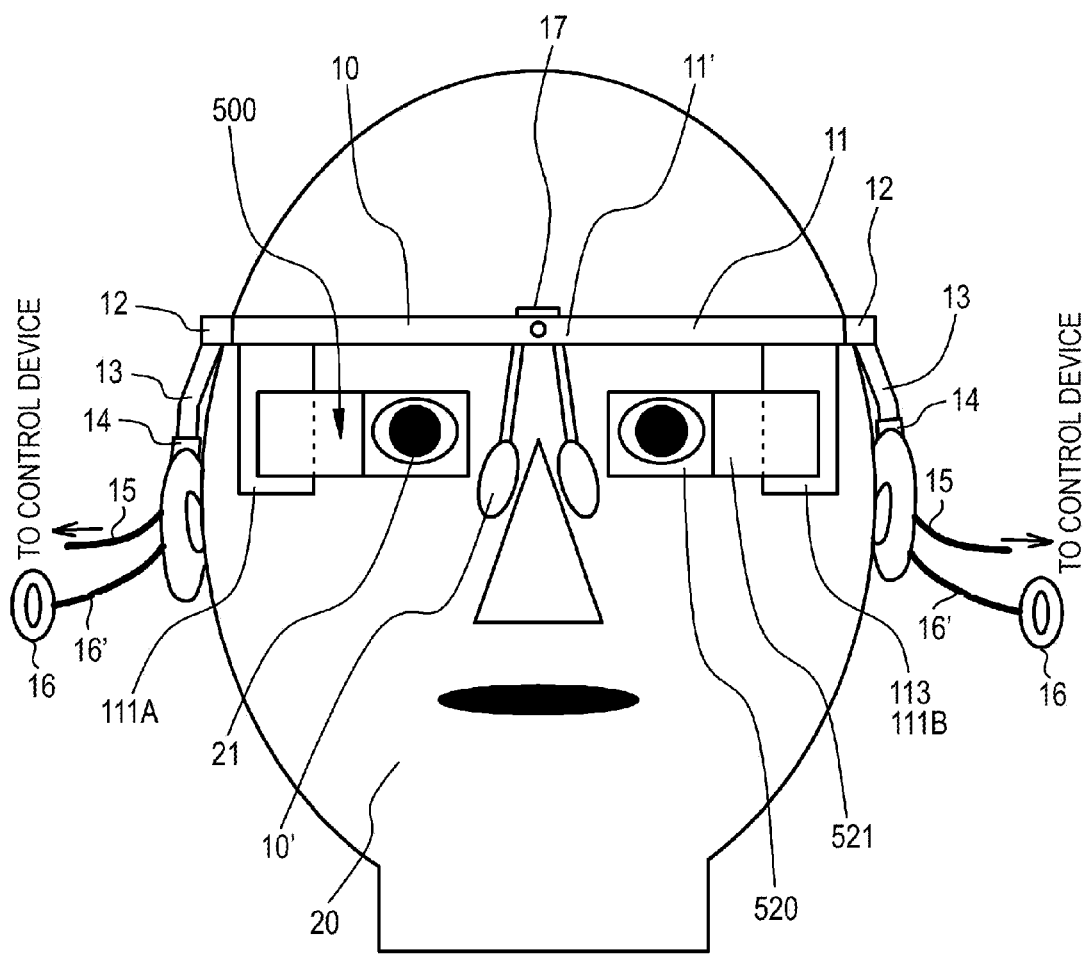
FIG. 26 is a schematic diagram of a display apparatus according to Embodiment 12, viewed from the front side.
Figure 27:
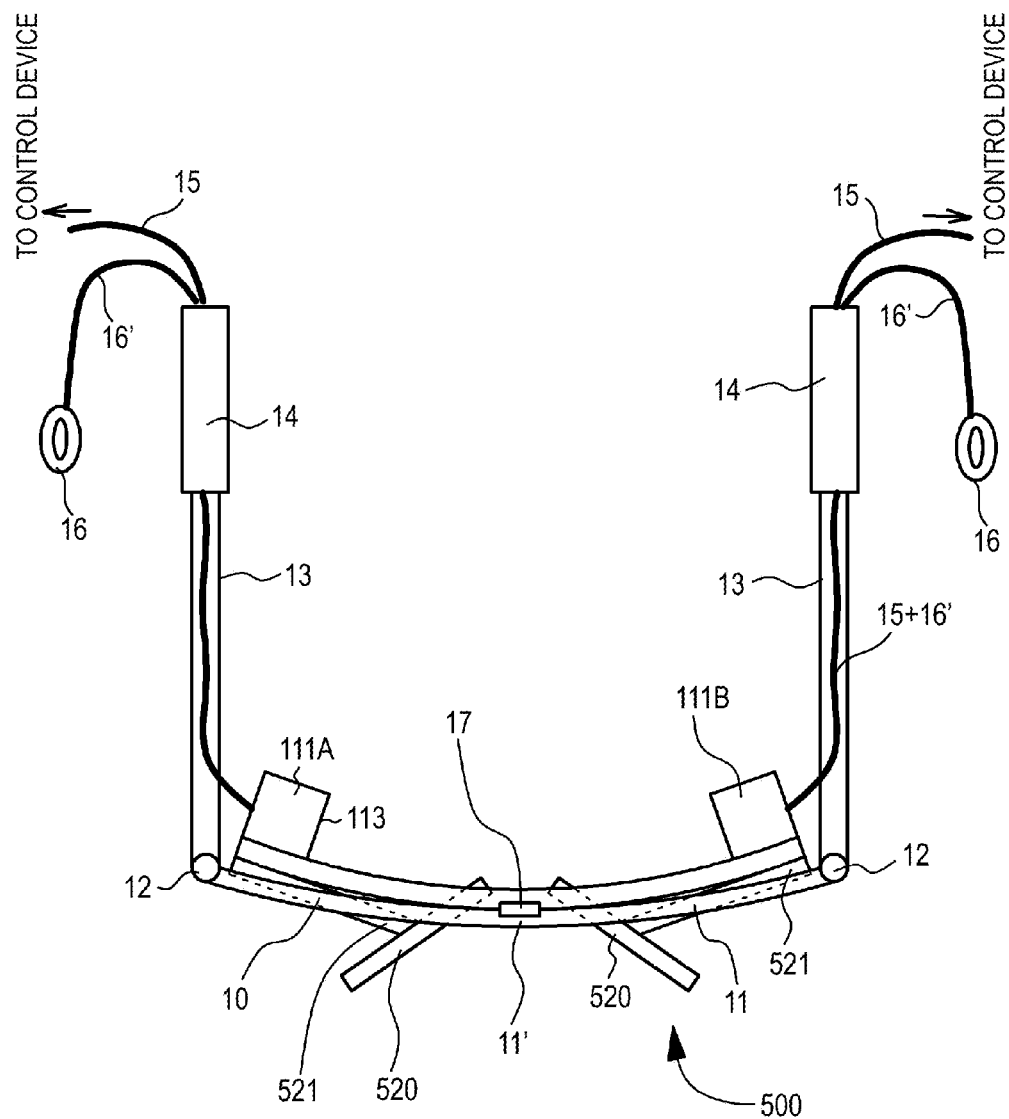
FIG. 27 is a schematic diagram of a display apparatus according to Embodiment 12, viewed from the upper side.

Embodiment 12 is a modification of the image displaying devices according to Embodiments 1 to 6. A schematic diagram of a display apparatus according to Embodiment 12, viewed from the front side is illustrated in FIG. 26, and a schematic diagram thereof viewed from the upper side is illustrated in FIG. 27.

In Embodiment 12, an optical device 520 is configured by a semi-transmissive mirror to which light output from the image forming devices 111A and 111B is incident and from which the light is output toward the pupil 21 of the eye of the observer 20. In addition, in Embodiment 12, although a structure is employed in which the light output from the image forming devices 111A and 111B propagates through the inside of a transparent member 521 such as a glass plate or a plastic plate and is incident to an optical device 520 (semi-transmissive mirror), a structure may be employed in which the light propagates through the air and is incident to the optical device 520. In addition, the image forming device may be configured as the image forming device 211 described in Embodiment 7.

Each of the image forming devices 111A and 111B is attached to a front portion 11, for example, by using a screw. In addition, a member 521 is attached to each of the image forming devices 111A and 111B, and the optical device 520 (semi-transmissive mirror) is mounted in the member 521. The display apparatus according to Embodiment 12 substantially has the same configuration and structure as those of the display apparatuses according to Embodiments 1 to 11 except for the differences described above, and thus detailed description thereof is omitted.

Embodiment 13

Embodiments 13 to 16 are modifications of the display apparatuses described in Embodiments 1 to 12, and Embodiment 13 relates to a display apparatus according to the first configuration. Since the basic configuration and structure of a display apparatus according to Embodiment 13 or any one of Embodiments 14 to 16 are similar to those of the display apparatuses described in Embodiments 1 to 12, detailed description thereof is omitted.

Figure 29:
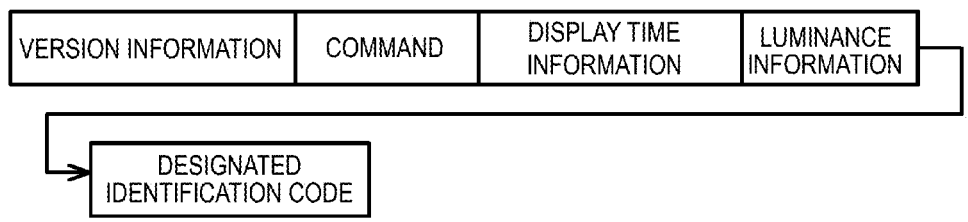
FIG. 29 is a diagram conceptually illustrating the file structure of data that configures a data group according to Embodiment 13.

A display apparatus according to Embodiment 13 also displays a conversation or the like of an actor in a play in a display apparatus as a subtitle. A data group is stored in a storage unit (not shown in the figure) that is formed by a memory card included in a control device 618 that employs a known circuit configuration. Here, in Embodiment 13, the data group is an aggregation of text data that is image data using text strings acquired by editing each scene of a conversation or the like of an actor in a play as an image. The file format of the image data (image signal) is fundamentally arbitrary. FIG. 29 conceptually illustrates the data structure of an image signal (text data) that configures the data group. Here, a designated identification code is attached to each text data configuring the data group. The designated identification code, for example, is formed by a number.

Figure 30A:
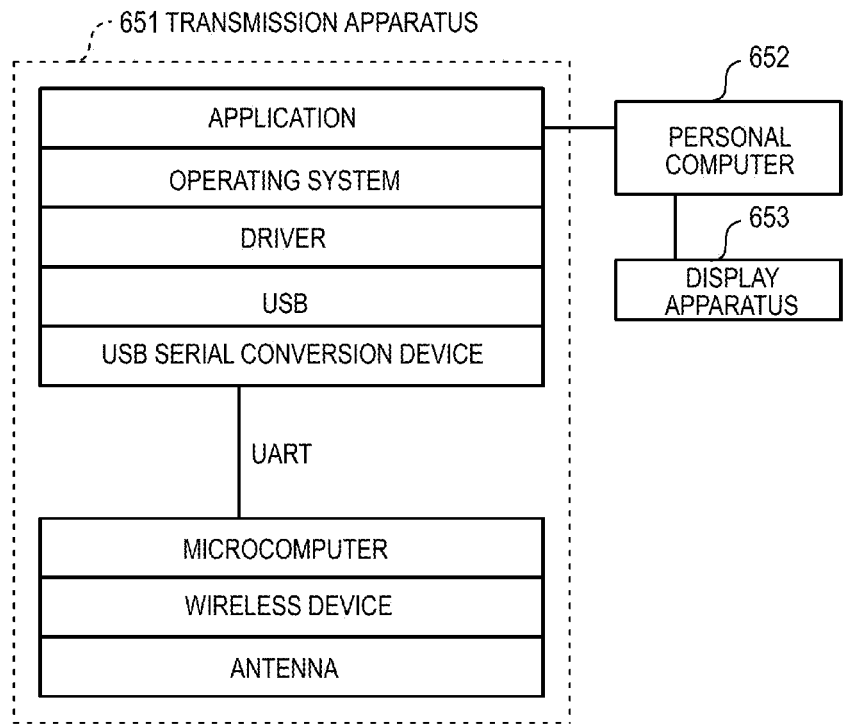
FIGS. 30A and 30B are a system configuration block diagram of a transmission apparatus and a system configuration block diagram of a display apparatus, according to Embodiment 13.
Figure 30B:
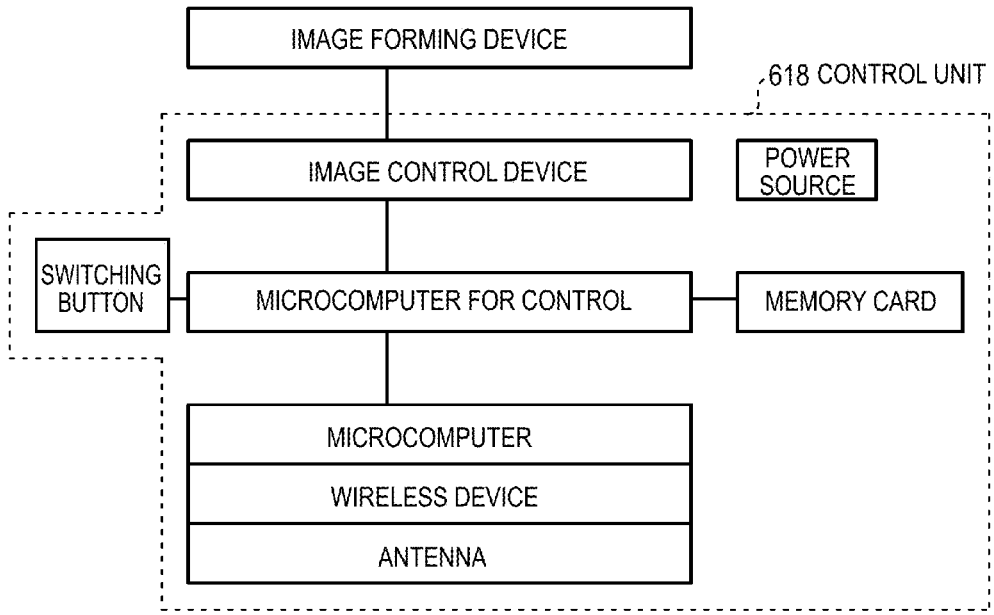
Figure 31:
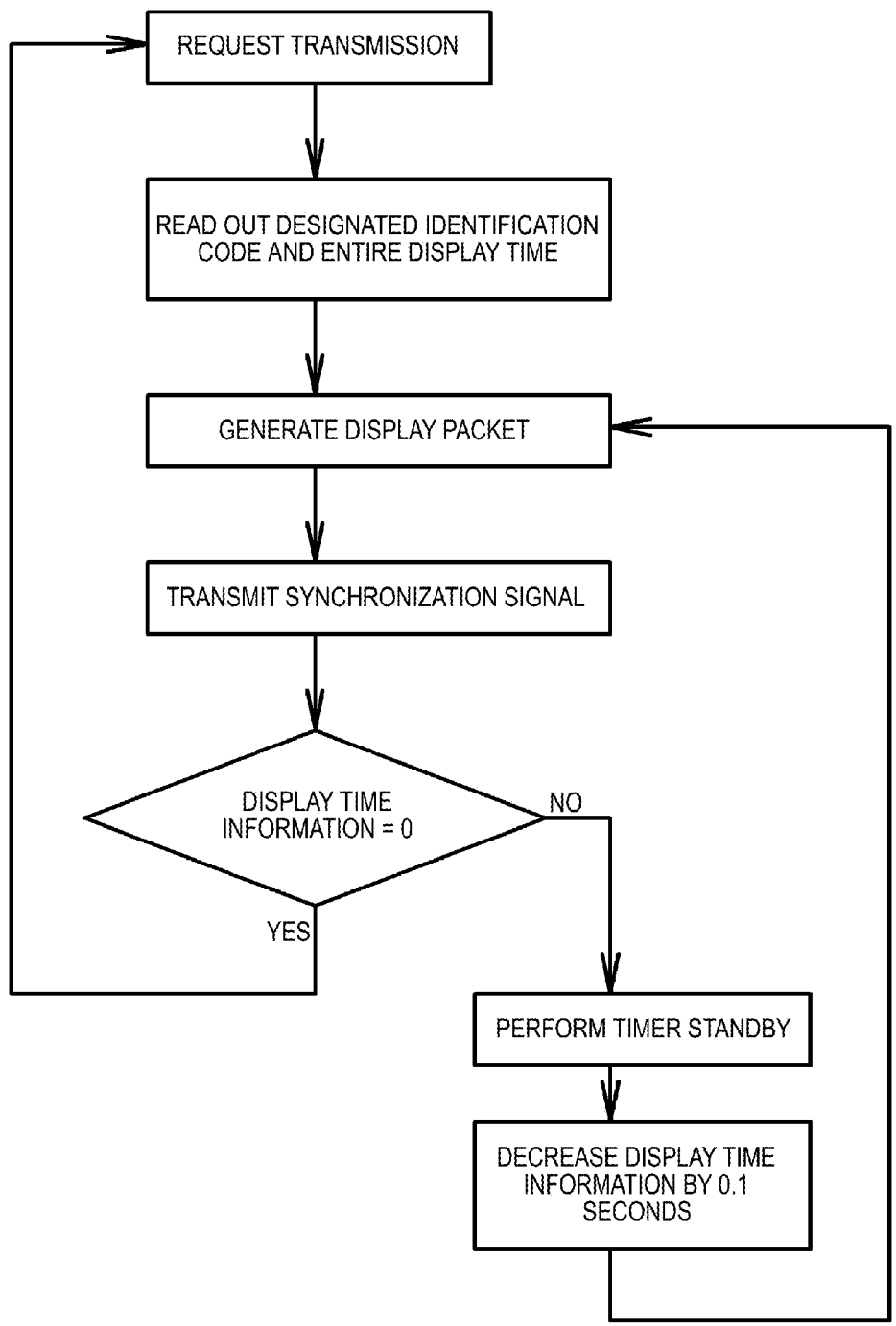
FIG. 31 is a diagram illustrating the flow of a transmission process of a transmission apparatus according to Embodiment 13.
Figure 32:
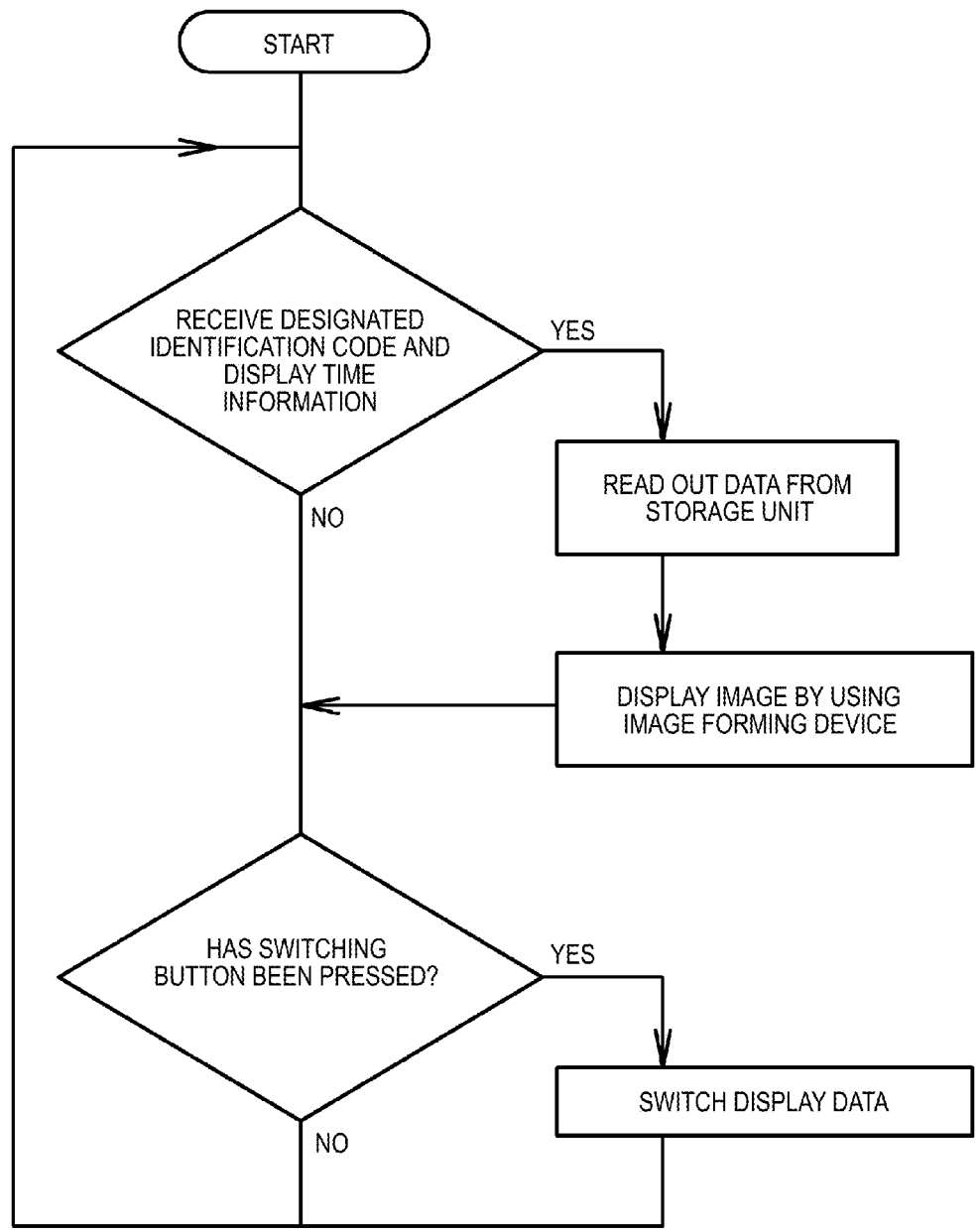
FIG. 32 is a diagram illustrating the flow of a reception process of a display apparatus according to Embodiment 13.

A block diagram illustrating the system configuration of a transmission apparatus (transmission unit) 651 according to Embodiment 13 and a block diagram illustrating the system configuration of a control device 618 of the display apparatus are shown in FIGS. 30A and 30B. A diagram illustrating the flow of a transmission process of the transmission apparatus 651 according to Embodiment 13 is shown in FIG. 31, and a diagram illustrating the flow of a reception process of the control device 618 according to Embodiment 13 is shown in FIG. 32.

Figures 33A, 33B:
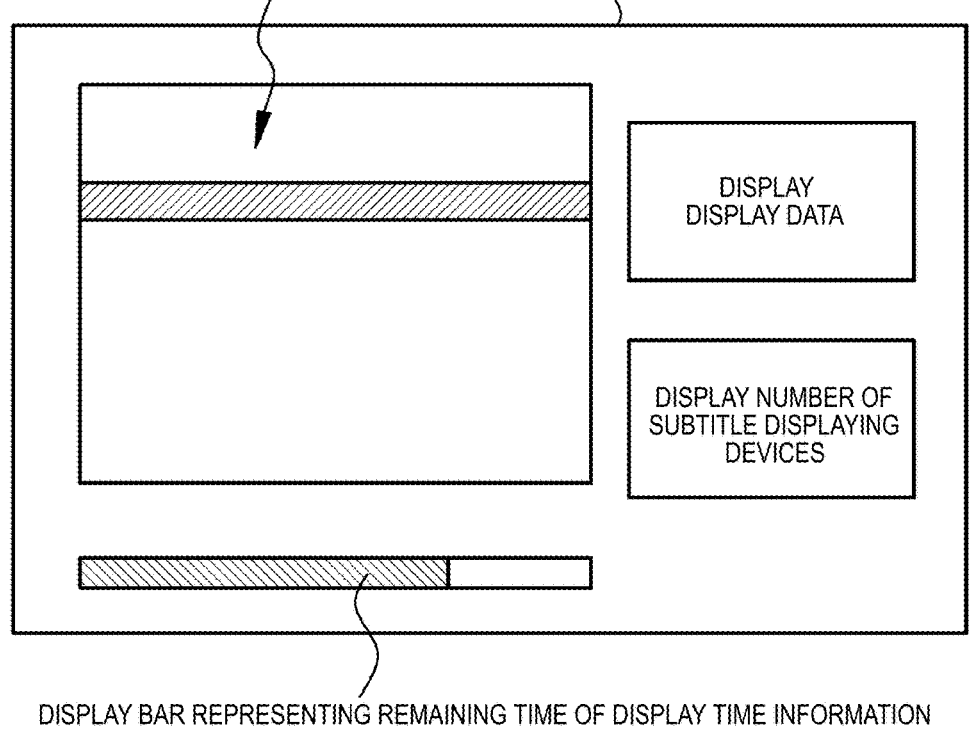
FIGS. 33A and 33B are diagrams schematically illustrating a designated identification code, a data group, a plurality of sets of data configuring the data group, and the entire display time as the contents displayed in the display apparatus configuring a transmission apparatus according to Embodiment 13.

The transmission apparatus 651 formed by employing a known circuit configuration, for example, includes a personal computer 652 and a display apparatus 653 that is formed by a known liquid crystal display device. In this display apparatus 653, as illustrated in FIGS. 33A and 33B, for example, a designated identification code, a plurality of sets of text data configuring a data group, an entire display time of each set of text data, and luminance information are displayed. In this display apparatus 653, an area used for displaying display data (different-size display data or different-language display data) configuring the text data is arranged, and an area used for displaying the number of reception display devices that receive various information from the transmission apparatus 651 is also arranged. Furthermore, an area that is used for displaying the ratio of the display time information $T_{Inf}$ to the entire display time $T_{total}$ by using a crossbar is arranged. In the "area used for displaying a designated identification code and the like", a portion to which diagonal lines are applied represents a row in which a cursor is placed and the display color thereof is reversed.

Immediately prior to the start of a conversation of an actor in a play, a designated identification code and display time information are transmitted to the control device 618 from the outside at a predetermined time interval. Here, the time corresponding to the display time information corresponds to the predetermined time in the display apparatus according to the third embodiment of the present disclosure. To be more specific, by designating a row in which a designated identification code, a plurality of sets of text data configuring a data group, and an entire display time of each set of text data are displayed in the display apparatus 653 by an operator operating a pointing device or a keyboard (not shown in the figure) that is included in the personal computer 652, the personal computer 652 reads out the designated identification code and the entire display time that have been designated, generates a display packet by acquiring the display time information, and transmits the designated identification code and the display time information together with a synchronization signal toward the control device 618 of the display apparatus. Examples of the pointing device include a joystick, a pointing stick (track point), a touch pad, a touch panel, a stylus pen, a data glove, a track ball, a pen table, a mouse, a light pen, and a joy pad.

To be more specific, as described above, the display time information $T_{Inf}$ can be represented as "$T_{Inf}(m)=T_{total}-(m-1)\times T_{int}$" by using the entire display time $T_{total}$ and the predetermined time interval $T_{int}$. Then, the designated identification code and the display time information $T_{Inf}$ are transmitted from the outside (the transmission apparatus 651) to the control device 618 are the predetermined time interval $T_{int}$. For example, assuming that $T_{total}=10.0$ seconds, and $T_{int}=0.1$ seconds, the display time information $T_{Inf}(m)$ when the designated identification code and the display time information are transmitted from the outside (the transmission apparatus 651) to the control device 618 at the first time (m=1) is $T_{Inf}(1)=10.0$ seconds.

Inside the transmission apparatus 651, it is checked whether $T_{Inf}=0$ (seconds), and in a case where $T_{Inf}$ is not 0 seconds, $T_{Inf}$ is decreased by $T_{int}$ (particularly, 0.1 second) as timer standby, and the designated identification code and the display time information $T_{Inf}(2)$ are transmitted again with $T_{Inf}(2)=9.9$ seconds after the elapse of $T_{int}$ (particularly, 0.1 seconds). This process is repeated until $T_{Inf}=0$ (seconds).

When receiving the designated identification code and the data identification code, the control device 618 reads out text data of which the designated identification code and the data identification code coincide with the designated identification code and the data identification code that have been received. Then, during a time corresponding to the received display time information $T_{Inf}$, an image on the basis of the text data is displayed in the image forming devices 111A and 111B. Here, in case where the display of the image is started in the image forming devices 111A and 111B, even when the same designated identification code and different display time information $T_{Inf}$ are transmitted from the outside (the transmission apparatus 651) to the control device 618 thereafter, the control device 618 ignores the designated identification code and the display time information $T_{Inf}$ and continues to display the image. In such an operation, a flag (reception completion flag) may be set in the control device 618. However, in a case where the control device 618 fails to receive the designated identification code and/or the display time information $T_{Inf}$ from the transmission apparatus 651 for any reason from the first time to the (m'−1)-th time and, for the first time, succeeds to receive the designated identification code and the display time information $T_{Inf}(m')$ from the transmission apparatus 651 at the m'-th time, during $T_{Inf}(m')=T_{total}-(m'-1)\times T_{int}$, an image on the basis of the text data is displayed in the image forming devices 111A and 111B.

As above, according to Embodiment 13, even in a case where the control device fails to receive the designated identification code and/or the display time information transmitted from the outside, again or repeatedly, the reception of the designated identification code and the display time information can be performed. Accordingly, the designated identification code and the display time information can be reliably received. As a result, even in a case where the designated identification code and the display time information are received, for example, by a plurality of the display apparatuses, the same image can be concurrently displayed in the plurality of the display apparatuses in a reliable manner, and the occurrence of a problem that it is difficult to display an image by using the display apparatus can be assuredly avoided.

According to Embodiment 13, the image can be further displayed by the image forming devices 111A and 111B in the state in which the luminance is controlled based on the luminance information. To be more specific, in addition to the designated identification code and the display time information, by transmitting the luminance information of an image to be displayed in the optical device from the outside (the transmission apparatus 651) to the display apparatus, the visibility of the displayed image can be improved. Alternatively, a configuration may be employed in which a light receiving sensor is further included, and the luminance of an image to be displayed in the optical device is controlled based on the luminance information of the environment (the ambience in which the display apparatus or the observation target is placed) acquired by the light receiving sensor. As examples of the light receiving sensor, particularly, there are a photodiode and a light receiving device for measuring the exposure that is included in the imaging device 17.

In addition, in Embodiment 13 (or in display apparatuses according to Embodiments 14 to 16 to be described later depending on the situations), a configuration may be employed in which a data group configured by a plurality of sets of text data used for displaying an image (for example, a subtitle) is stored in the storage unit included in the control device, a data identification code is attached to each set of text data configuring a data group, the control device receives the designated identification code and the display time information that are transmitted from the outside at a predetermined time interval and reads out text data of which the designated identification code and the data identification code coincide with the designated identification code and the data identification code that have been received, and, during a time corresponding to the received display time information, an image on the basis of the text data is displayed in the image forming device.

Embodiment 14

Embodiment 14 relates to a display apparatus according to the second configuration. The display apparatus and the image displaying device described in Embodiment 13 can be applied to Embodiment 14. However, in Embodiment 14, in order to set a distance between the observation target and the display apparatus, a switching button (see FIG. 30B) or a switch is arranged in the control device 618. By operating the switching button or the switch in accordance with the seat in which an observer (audience member) is seated, the distance from the display apparatus to the observation target is manually set. An example can be represented in which four types of distances including a "short distance", an "intermediate distance", a "long distance", and a "very long distance" can be set as the distance from the display apparatus to the observation target.

In the display apparatus according to Embodiment 14, similarly to Embodiment 13, a data group that is configured by a plurality of sets of text data is stored in the storage unit included in the control device 618, and a data identification code is attached to each set of text data that configures the data group.

However, differently from Embodiment 13, each set of the text data is configured by a plurality of sets of different-size display data having different display sizes. To be more specific, in Embodiment 14, the display data having different display sizes is image data in which text strings having different font sizes are configured as an image. In addition, the data structure of the one set of different-size display data may be the same as that illustrated in FIG. 29, and, similarly to Embodiment 13, a data identification code is attached to each set of the text data.

Also in Embodiment 14, similarly to Embodiment 13, a designated identification code is transmitted to the control device 618 from the outside (the transmission apparatus 651). Then, the control device 618 reads out one set of the different-size display data from the storage unit among a plurality of sets of the different-size display data out of text data of which the designated identification code and the data identification code coincide with the designated identification code and the data identification code that have been received depending on the distance between the observation target and the display apparatus, and more particularly, the distance from the display apparatus to the observation target that is set by operating the switching button or the switch arranged in the control device 618 and displays an image on the basis of the one set of the different-size display data in the image forming device.

Also in Embodiment 14, similarly to Embodiment 13, an image displaying method may be used in which the designated identification code and the display time information $T_{Inf}$ are transmitted to the control device 618 from the outside (the transmission apparatus 651) at a predetermined time interval $T_{int}$, and, during a time corresponding to the transmitted display time information $T_{Inf}$, the image is displayed in the image forming device.

In addition, a configuration may be employed in which distance information from the display apparatus to the observation target is transmitted from the outside to the display apparatus in a wireless manner. Alternatively, a configuration may be employed in which a distance measuring device measuring the distance from the display apparatus to the observation target is further included in the display apparatus, and the distance information is acquired by the distance measuring device. As the distance measuring device, for example, the imaging device 17 may be configured as an imaging device provided with an automatic focus function (an imaging device having a passive-type distance measuring device).

As above, in the display apparatus according to Embodiment 14, the control device reads out one set of different-size display data from the storage unit among a plurality of sets of different-size display data out of text data of which the designated identification code and the data identification code coincide with the designated identification code and the data identification code that have been received depending on the distance between the observation target and the display apparatus, and an image on the basis of the one set of different-size display data is displayed in the image forming device. Accordingly, it is difficult for an unbalance between the size of the observation target that is visually recognized and the size of the image to occur.

In addition, in the display apparatus according to Embodiment 14, a configuration may be employed in which a data group configured by a plurality of sets of text data is stored in the storage unit included in the control device, a data identification code is attached to each set of text data that configures the data group, each set of text data is configured by a plurality of sets of different-size display data having different display sizes, the control device receives the designated identification code transmitted from the outside and reads out one set of different-size display data from a plurality of sets of different-size display data out of text data of which the designated identification code and the data identification code coincide with the designated identification code and the data identification code that have been received depending on the distance between the observation target and the display apparatus, and an image on the basis of the one set of different-size display data is displayed by the image forming device.

In addition, the display apparatus described in Embodiment 13 and the display apparatus described in Embodiment 14 may be combined together. In other words, in the display apparatus according to Embodiment 13, a configuration may be employed in which each set of text data is configured by a plurality of sets of different-size display data having different display sizes, the control device reads out one set of different-size display data from the storage unit among a plurality of sets of different-size display data out of text data of which the designated identification code and the data identification code coincide with the designated identification code and the data identification code that have been transmitted depending on the distance between the observation target and the display apparatus, and an image on the basis of the one set of different-size display data is displayed by the image forming device.

Embodiment 15

Embodiment 15 relates to a display apparatus according to the third configuration. The display apparatus and the image displaying device described in Embodiment 13 can be applied to Embodiment 15. Also in the display apparatus according to Embodiment 15, similarly to Embodiment 13, a data group configured by a plurality of sets of text data is stored in the storage unit included in the control device 618, and a data identification code is attached to each set of text data that configures the data group.

However, differently from Embodiment 13, each set of text data is configured by a plurality of sets of different-language display data having different display languages. Examples of the languages include Chinese, Korean, English, and the like. To be more specific, in Embodiment 15, the display data having different display languages is image data in which a text string having a different language is configured as an image. In addition, the data structure of the one set of different-language display data may be the same as that illustrated in FIG. 29, and, similarly to Embodiment 13, a data identification code is attached to each set of the text data.

Also in Embodiment 15, similarly to Embodiment 13, a designated identification code is transmitted to the control device 618 from the outside (the transmission apparatus 651). Then, the control device 618 reads out one set of the different-language display data from the storage unit among a plurality of sets of different-language display data out of text data of which the designated identification code and the data identification code coincide with the designated identification code and the data identification code that have been transmitted and displays an image on the basis of the one set of the different-language display data in the image forming device. By arranging a switching button (see FIG. 30B) or a switch in the control device 618, a display language may be manually selected.

As above, in the display apparatus according to Embodiment 15, the control device reads out one set of different-language display data from the storage unit among a plurality of sets of different-language display data out of text data of which the designated identification code and the data identification code coincide with the designated identification code and the data identification code that have been transmitted, and an image on the basis of the one set of different-language display data is displayed in the image forming device. Accordingly, an image display in a language used by the observer (audience member) can be performed in an easy manner.

The display apparatus described in Embodiment 13 can be applied to Embodiment 15. To be more specific, in Embodiment 15, similarly to Embodiment 13, the control device 618 reads out one set of the different-language display data from the storage device among a plurality of sets of different-language display data out of text data of which the designated identification code and the data identification code coincide with the designated identification code and the data identification code that have been transmitted and displays an image on the basis of the one set of the different-language display data in the image forming device. In other words, the designated identification code and the display time information $T_{Inf}$ are transmitted to the control device 618 from the outside (the transmission apparatus 651) at a predetermined time interval $T_{int}$, and, during a time corresponding to the transmitted display time information $T_{Inf}$, the image is displayed in the image forming device.

In addition, the display apparatus described in Embodiment 15 and the display apparatus described in Embodiment 14 may be combined together. In other words, it may be configured such that each set of different-size display data is configured by a plurality of sets of different-language display data having different display languages, and the control device 618 selects one set of different-size display data from a plurality of sets of different-size display data out of text data of which the designated identification code and the data identification code coincide with the designated identification code and the data identification code that have been transmitted depending on the distance between the observation target and the display apparatus, reads out one set of different-language display data from the storage unit among a plurality of sets of different-language display data in the one set of different-size display data, and displays an image on the basis of the one set of the different-language display data in the image forming device. In such a case, the designated identification code and the display time information $T_{Inf}$ are transmitted to the control device 618 from the outside (the transmission apparatus 651) at a predetermined time interval $T_{int}$, and, during a time corresponding to the transmitted display time information $T_{Inf}$, the image is displayed in the image forming device.

In addition, in the display apparatus according to Embodiment 15, a configuration may be employed in which a data group configured by a plurality of sets of text data is stored in the storage unit included in the control device, a data identification code is attached to each set of text data that configures the data group, each set of text data is configured by a plurality of sets of different-language display data having different display languages, the control device receives the designated identification code transmitted from the outside and reads out one set of different-language display data from the storage unit among a plurality of sets of different-language display data out of text data of which the designated identification code and the data identification code coincide with the designated identification code and the data identification code that have been received, and an image on the basis of the one set of different-language display data is displayed by the image forming device.

In addition, the display apparatus described in Embodiment 13 and the display apparatus described in Embodiment 15 may be combined together. In other words, in the display apparatus according to Embodiment 13, a configuration may be employed in which each set of text data is configured by a plurality of sets of different-language display data having different display languages, the control device reads out one set of different-language display data from the storage unit among a plurality of sets of different-language display data out of text data of which the designated identification code and the data identification code coincide with the designated identification code and the data identification code that have been transmitted, and an image on the basis of the one set of different-language display data is displayed by the image forming device.

In addition, the display apparatus described in Embodiment 14 and the display apparatus described in Embodiment 15 may be combined together. In other words, in the display apparatus according to Embodiment 14, a configuration may be employed in which each set of different-size display data is configured by a plurality of sets of different-language display data having different display sizes, the control device selects one set of different-size display data from a plurality of sets of different-size display data out of text data of which the designated identification code and the data identification code coincide with the designated identification code and the data identification code that have been transmitted depending on the distance between the observation target and the display apparatus and reads out one set of different-language display data from the storage unit among a plurality of sets of different-language display data in the one set of different-size display data, and an image on the basis of the one set of different-language display data is displayed by the image forming device.

In addition, the display apparatus described in Embodiment 13 and the display apparatuses described in Embodiments 14 and 15 may be combined together. In other words, in the display apparatus according to Embodiment 13, a configuration may be employed in which each set of different-size display data is configured by a plurality of sets of different-language display data having different display languages, the control device selects one set of different-size display data from a plurality of sets of different-size display data out of text data of which the designated identification code and the data identification code coincide with the designated identification code and the data identification code that have been transmitted depending on the distance between the observation target and the display apparatus and reads out one set of different-language display data from the storage unit among a plurality of sets of different-language display data in the one different-size display data, and an image on the basis of the one set of different-language display data is displayed by the image forming device.

Embodiment 16

Embodiment 16 relates to a display apparatus according to the fourth configuration. The display apparatus and the image displaying device described in Embodiment 13 can be applied to Embodiment 16.

Also in the display apparatus according to Embodiment 16, similarly to Embodiment 13, a data group configured by a plurality of sets of text data is stored in the storage unit included in the control device 618, and a data identification code is attached to each set of text data that configures the data group. In addition, each set of text data has a data structure similar to that described in Embodiment 13, and similarly to Embodiment 13, a data identification code is attached thereto.

Also in Embodiment 16, similarly to Embodiment 13, a designated identification code is transmitted to the control device 618 from the outside (the transmission apparatus 651). Then, the control device 618 reads out text data of which the designated identification code and the data identification code coincide with the designated identification code and the data identification code that have been transmitted from the storage unit and performs data processing depending on the distance between the observation target and the display apparatus, whereby an image on the basis of the text data is displayed by the image forming device, for example, in the state in which the convergence angle is controlled. In addition, image processing may be performed for text data input to the image forming device that configures at least one image displaying device based on the distance from the display apparatus to the observation target. In Embodiment 16, image processing is performed for the text data input to the image forming devices that configure both the image displaying devices.

In addition, in the display apparatus according to Embodiment 16, a configuration may be employed in which a data group configured by a plurality of sets of text data is stored in the storage unit included in the control device, a data identification code is attached to each set of text data that configures the data group, the control device receives the designated identification code transmitted from the outside and reads text data of which the designated identification code and the data identification code coincide with the designated identification code and the data identification code that have been received from the storage unit, and performs data processing depending on the distance between the observation target and the display apparatus, and an image on the basis of the text data is displayed by the image forming device, for example, in the state in which the convergence angle is controlled.

The display apparatus described in Embodiment 13 can be applied to Embodiment 16. To be more specific, in Embodiment 16, similarly to Embodiment 13, the control device 618 reads out text data of which the designated identification code and the data identification code coincide with the designated identification code and the data identification code that have been transmitted from the storage unit and displays an image on the basis of the text data in the image forming device. However, the designated identification code and the display time information $T_{Inf}$ are transmitted to the control device 618 from the outside (the transmission apparatus 651) at a predetermined time interval $T_{int}$, and, during a time corresponding to the transmitted display time information $T_{Inf}$, the image is displayed in the image forming device.

In addition, the display apparatus described in Embodiment 14 and the display apparatus described in Embodiment 16 may be combined together. In other words, in the display apparatus described in Embodiment 14, it may be configured such that each set of text data is configured by a plurality of sets of different-size display data having different display sizes, and the control device reads out one set of different-size display data from the storage unit among a plurality of sets of different-size display data out of text data of which the designated identification code and the data identification code coincide with the designated identification code and the data identification code that have been transmitted depending on the distance between the observation target and the display apparatus and performs data processing based on the distance between the observation target and the display apparatus, and an image on the basis of the one set of the different-size display data is displayed by the image forming device, for example, in the state in which the convergence angle is controlled.

In addition, the display apparatus described in Embodiment 14 and the display apparatuses described in Embodiments 15 and 16 may be combined together. In other words, in the display apparatus described in Embodiment 14, it may be configured such that each set of different-size display data is configured by a plurality of sets of different-language display data having different display languages, and the control device selects one set of different-size display data from a plurality of sets of different-size display data out of the text data of which the designated identification code and the data identification code coincide with the designated identification code and the data identification code that have been transmitted depending on the distance between the observation target and the display apparatus and reads out one set of different language display data from the storage unit among a plurality of sets of different-language display data in the one different-size display data, and performs data processing based on the distance between the observation target and the display apparatus, and an image on the basis of the one set of the different-language display data is displayed in the image forming device, for example, in the state in which the convergence angle is controlled.

In addition, the display apparatus described in Embodiment 15 and the display apparatus described in Embodiment 16 may be combined together. In other words, in the display apparatus described in Embodiment 15, it may be configured such that each set of text data is configured by a plurality of sets of different-language display data having different display languages, and the control device reads out one set of different-language display data from the storage unit among a plurality of sets of different-language display data out of text data of which the designated identification code and the data identification code coincide with the designated identification code and the data identification code that have been transmitted depending on the distance between the observation target and the display apparatus and performs data processing based on the distance between the observation target and the display apparatus, and an image on the basis of the one set of the different-language display data is displayed by the image forming device, for example, in the state in which the convergence angle is controlled.

As above, although the preferred embodiments of the present disclosure have been described, the present disclosure is not limited thereto. The configurations and the structures of the display apparatuses and the image displaying devices described in the embodiments are examples and may be appropriately changed, and the display apparatus can be used as a display apparatus that displays a text or an image. In addition, the configurations and the structures of the movement device, the rotary movement device, the liquid lens, and the liquid prism are examples and may be appropriately changed. The display apparatus described in Embodiment 1 and the display apparatus described in Embodiment 6 may be combined together. In some cases, the display apparatus according to the second or third embodiment of the present disclosure may be a signal eye type in which one image displaying device is included. In addition, for example, a surface relief-type hologram (see U.S. Patent No. 20040062505 A1) may be arranged on the light guiding plate. In the optical device 320 according to Embodiment 8 or 9, the diffraction grating device may be configured by a transmissive-type diffraction grating device, or it may be configured such that one of the first diffraction unit and the second diffraction unit is configured by a reflective-type diffraction grating device, and the other thereof is configured by a transmissive-type diffraction grating device. Alternatively, the diffraction grating device may be configured by a reflective-type blazed diffraction grating device.

Figure 34:
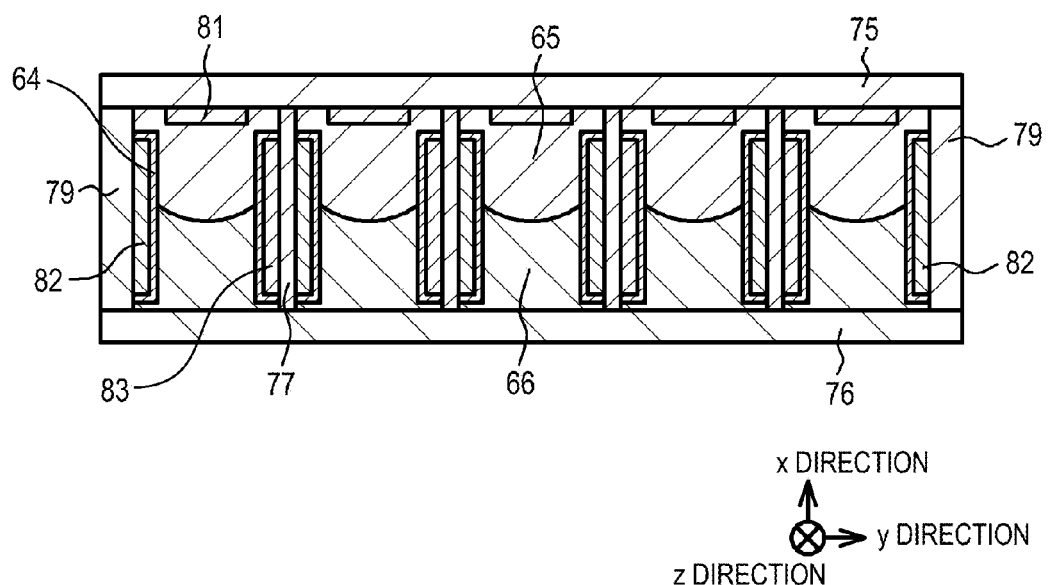
FIG. 34 is a schematic cross-sectional view of a Fresnel lens-type liquid lens that is used for changing the focus of an optical system.
Figure 35:
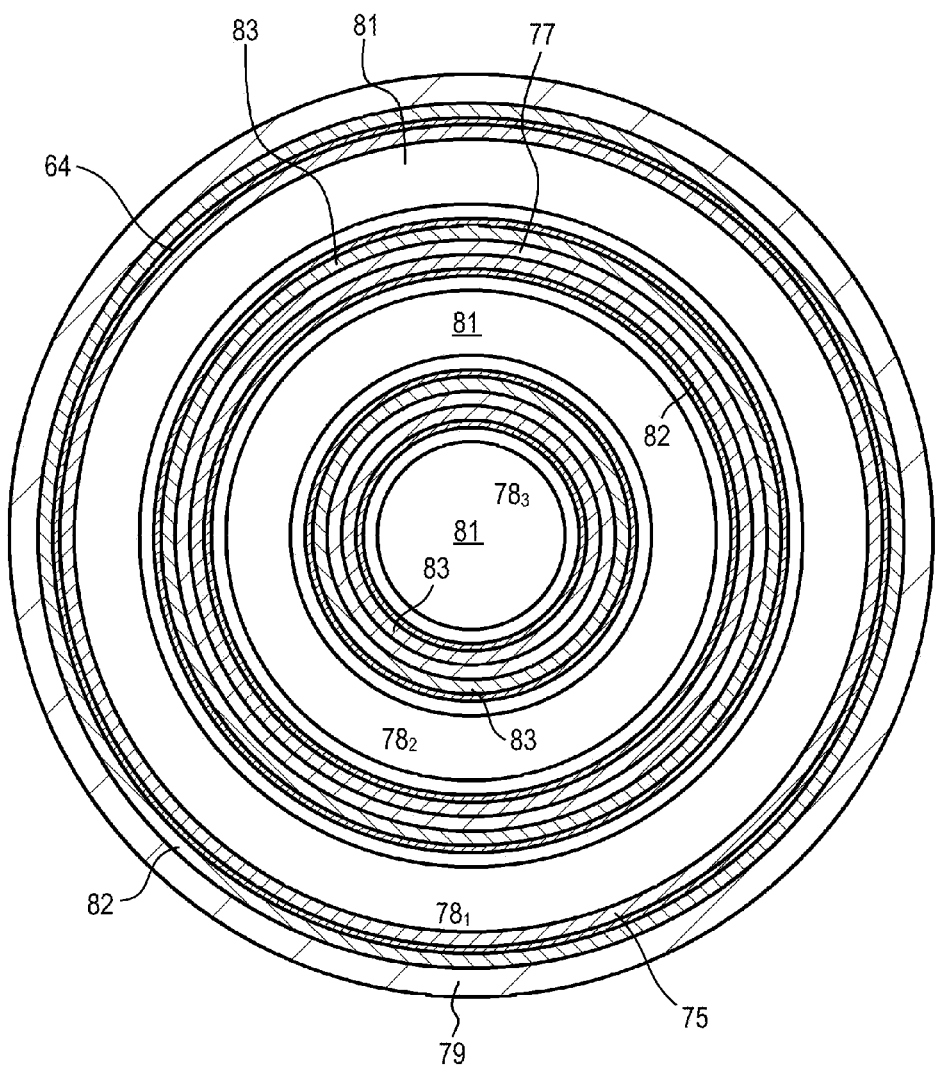
FIG. 35 is a schematic plan view of a Fresnel lens-type liquid lens that is used for changing the focus of an optical system.

Simultaneously with the adjustment of the convergence angle, for example, in order to match the focus of the optical systems 112 or 254 to the point "A" shown in FIG. 7, in other words, in order to allow the focal distance of the optical systems 112 and 254 to be changeable, the optical systems 112 and 254 may be configured by liquid lenses. A schematic cross-sectional view of such a liquid lens is illustrated in FIG. 34, and a plan view thereof is illustrated in FIG. 35. The liquid lens is configured by a Fresnel lens, and ring-shaped lens chambers are concentrically arranged.

In other words, the liquid lens includes (A) a housing that includes: a so-called endless outer wall member 79 that does not have an end portion; a top panel 75 that is mounted on the top face of the outer wall member 79; and a bottom panel 76 that is mounted on the bottom face of the outer wall member 79 and (B) (N−1) partition wall members 77 that do not have an end portion and are concentrically arranged in the outer wall member 79. Here, the outer shape of the housing is a circle. In addition, a center lens chamber that is surrounded by (N−1) ring-shaped lens chambers and the (N−1)-th partition wall member 77 is included. In the example illustrated in the figure, N=3. Each lens chamber 78 ($78_1$, $78_2$, or $78_3$) is occupied by the first liquid 65 and the second liquid 66 that configure the liquid lens.

The first lens chamber (ring-shaped lens chamber) $78_1$ is configured by the outer wall member 79, the first partition wall member 77, the top panel 75, and the bottom panel 76. In addition, the first electrode 81 is disposed on the inner face of a part of the top panel 75 that configures the first lens chamber $78_1$, the second electrode 82 is disposed on the inner face of a part of the outer wall member 79 that configures the first lens chamber $78_1$, and the third electrode 83 is disposed on the inner face of a part of the first partition wall member 77 that configures the first lens chamber $78_1$.

The (n+1)-th lens chamber (ring-shape lens chamber) $78_{(n+1)}$ is configured by the n-th (here, n=1, 2, ..., N−2) partition wall member 77, the (n+1)-th partition wall member 77, the top panel 75, and the bottom panel 76. In addition, the first electrode 81 is disposed on the inner face of a part of the top panel 75 that configures the (n+1)-th lens chamber $78_{(n+1)}$, the second electrode 82 is disposed on the inner face of apart of n-th partition wall member 77 that configures the (n+1)-th lens chamber $78_{(n+1)}$, and the third electrode 83 is disposed on the inner face of a part of (n+1)-th partition wall member 77 that configures the (n+1)-th lens chamber $78_{(n+1)}$.

The first electrode 81 is disposed on the inner face of a part of the top panel 75 that configures the center lens chamber $78_3$ corresponding to the N-th lens chamber $78_N$, and the third electrode 83 is disposed on the inner face of a part of the (N−1)-th partition wall member 77 that configures the center lens chamber $78_3$.

In the example illustrated in the figure, the first electrode 81 is disposed for each lens chamber. However, one electrode as the first electrode 81 may be disposed on the inner face of the top panel 75.

In this liquid lens, similarly to Embodiment 3, a water-repellency treatment is performed for the surface of each of the outer wall member 79 and the partition wall member 77 in which at least the interface between the first liquid 65 and the second liquid 66 is located. Light is incident from the bottom panel 76, and the light is output from the top panel 75. In each lens chamber $78_1$, $78_2$, or $78_3$, by configuring the voltages applied to the second electrode 82 and the third electrode 83 to be different from each other, the optical power of the liquid lens is changed. Alternatively, in each lens chamber $78_1$, $78_2$, or $78_3$, by configuring the voltages applied to the second electrode 82 and the third electrode 83 to be different, a Fresnel lens is configured by the liquid lenses as a whole.

The present disclosure contains subject matter related to that disclosed in Japanese Priority Patent Application JP 2010-182973 filed in the Japan Patent Office on Aug. 18, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
a glass-type frame configured to be mounted to a head of an observer;
an image displaying device attached to the glass-type frame, the image displaying device comprising:
an image forming device,
an optical system, and
a movement device responsive to a control signal to move an optical axis of the image forming device and an optical axis of the optical system in a horizontal direction to adjust a convergence angle of a virtual image provided by the image forming device; and
a control device configured to provide the control signal to the movement device to adjust the convergence angle of the virtual image based on observation position information of the observer, wherein the observation position information of the observer permits adjustment of the convergence angle of the virtual image provided by the image forming device relative to a convergence angle of an observation target.

2. The display apparatus according to claim 1, wherein observation position information regarding the observation position of the observer is given to the display apparatus in advance.

3. The display apparatus according to claim 1, wherein, in addition to an image signal input to the image forming device, observation position information regarding the observation position of the observer is transmitted to the display apparatus from outside the display apparatus.

4. The display apparatus according to claim 1, wherein the convergence angle is further adjusted by controlling an image signal input to the image forming device that configures the image displaying device.

5. A display apparatus comprising:
a glass-type frame configured to be mounted to a head of an observer;
an image displaying device attached to the glass-type frame, the image displaying device comprising:
an image forming device,
an optical system, and
a rotary movement device responsive to a control signal to rotate the image forming device and the optical system, to adjust a convergence angle of a virtual image provided by the image forming device; and
a control device configured to provide the control signal to the rotary movement device to adjust the convergence angle based on observation position information of the observer, wherein the observation position information of the observer permits adjustment of the convergence angle of the virtual image provided by the image forming device relative to a convergence angle of an observation target.

6. The display apparatus according to claim 5, wherein observation position information regarding the observation position of the observer is given to the display apparatus in advance.

7. The display apparatus according to claim 5, wherein, in addition to an image signal input to the image forming device, observation position information regarding the observation position of the observer is transmitted to the display apparatus from outside the display apparatus.

8. The display apparatus according to claim 5, wherein the convergence angle is adjusted by controlling an image signal input to the image forming device that configures the image displaying device.

9. A display apparatus comprising an image displaying device, the image displaying device comprising:
an image forming device,
a lens,
a movement device responsive to a control signal to relatively move an optical axis of the image forming device and an optical axis of the lens, and
a control device configured to provide the control signal to the movement device to adjust a convergence angle of a virtual image provided by the image forming device based on observation position information of the observer, wherein the observation position information of the observer permits adjustment of the convergence angle of the virtual image provided by the image forming device relative to a convergence angle of an observation target.

* * * * *